(12) United States Patent
Oh

(10) Patent No.: US 10,546,410 B2
(45) Date of Patent: *Jan. 28, 2020

(54) METHOD FOR INTER-SCENE TRANSITIONS

(71) Applicant: EveryScape, Inc., Newton, MA (US)

(72) Inventor: Byong Mok Oh, Los Altos, CA (US)

(73) Assignee: Smarter Systems, Inc., Newton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/421,104

(22) Filed: May 23, 2019

(65) Prior Publication Data
US 2019/0279412 A1    Sep. 12, 2019

Related U.S. Application Data

(63) Continuation of application No. 16/042,309, filed on Jul. 23, 2018, now Pat. No. 10,304,233, which is a continuation of application No. 14/969,669, filed on Dec. 15, 2015, now Pat. No. 10,032,306, which is a continuation of application No. 14/090,654, filed on
(Continued)

(51) Int. Cl.
| | |
|---|---|
| *G06T 13/80* | (2011.01) |
| *G06T 3/20* | (2006.01) |
| *G06T 19/00* | (2011.01) |
| *G06T 3/60* | (2006.01) |
| *G06T 15/20* | (2011.01) |
| *G06T 3/00* | (2006.01) |

(52) U.S. Cl.
CPC ............ *G06T 13/80* (2013.01); *G06T 3/0012* (2013.01); *G06T 3/20* (2013.01); *G06T 3/60* (2013.01); *G06T 15/20* (2013.01); *G06T 15/205* (2013.01); *G06T 19/003* (2013.01); *G06T 2210/44* (2013.01); *G06T 2215/12* (2013.01)

(58) Field of Classification Search
None
See application file for complete search history.

(56) References Cited

U.S. PATENT DOCUMENTS

| | | | |
|---|---|---|---|
| 6,246,412 B1 * | 6/2001 | Shum | G06T 15/10 345/419 |
| 6,573,899 B2 * | 6/2003 | Aono | G06T 11/203 345/467 |

(Continued)

*Primary Examiner* — Frank S Chen
(74) *Attorney, Agent, or Firm* — Sunstein Kann Murphy & Timbers, LLP

(57) ABSTRACT

A method and system for creating a transition between a first scene and a second scene on a computer system display, simulating motion. The method includes determining a transformation that maps the first scene into the second scene. Motion between the scenes is simulated by displaying transitional images that include a transitional scene based on a transitional object in the first scene and in the second scene. The rendering of the transitional object evolves according to specified transitional parameters as the transitional images are displayed. A viewer receives a sense of the connectedness of the scenes from the transitional images. Virtual tours of broad areas, such as cityscapes, can be created using inter-scene transitions among a complex network of pairs of scenes.

20 Claims, 71 Drawing Sheets

Related U.S. Application Data

Nov. 26, 2013, now abandoned, which is a continuation of application No. 11/271,159, filed on Nov. 11, 2005, now abandoned.

(60) Provisional application No. 60/712,356, filed on Aug. 30, 2005, provisional application No. 60/627,335, filed on Nov. 12, 2004.

(56) References Cited

U.S. PATENT DOCUMENTS

| | | | |
|---|---|---|---|
| 7,120,293 B2* | 10/2006 | Schoelkopf | G06T 11/001 382/162 |
| 7,424,218 B2* | 9/2008 | Baudisch | G03B 13/02 348/218.1 |
| 2005/0025347 A1* | 2/2005 | Makram-Ebeid | A61B 6/08 382/128 |
| 2005/0078178 A1* | 4/2005 | Brown | H04N 7/181 348/139 |
| 2006/0087519 A1* | 4/2006 | Berger | G06T 11/60 345/619 |

* cited by examiner

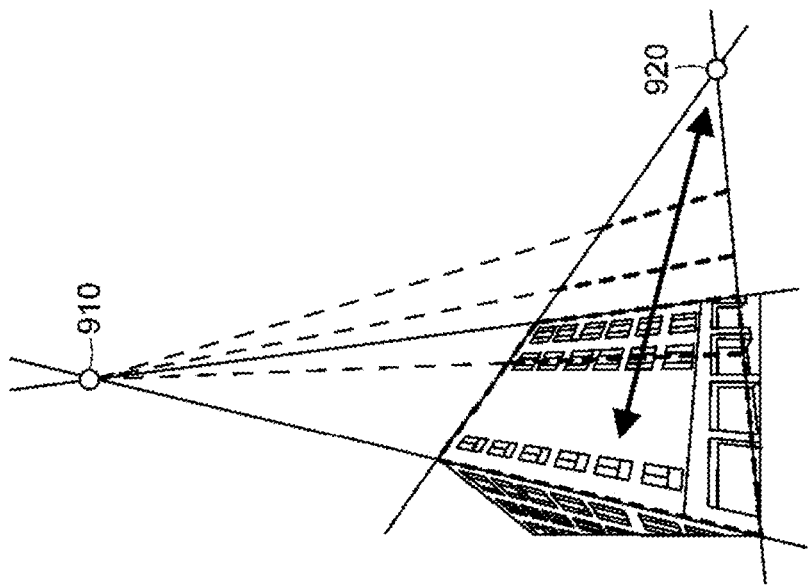
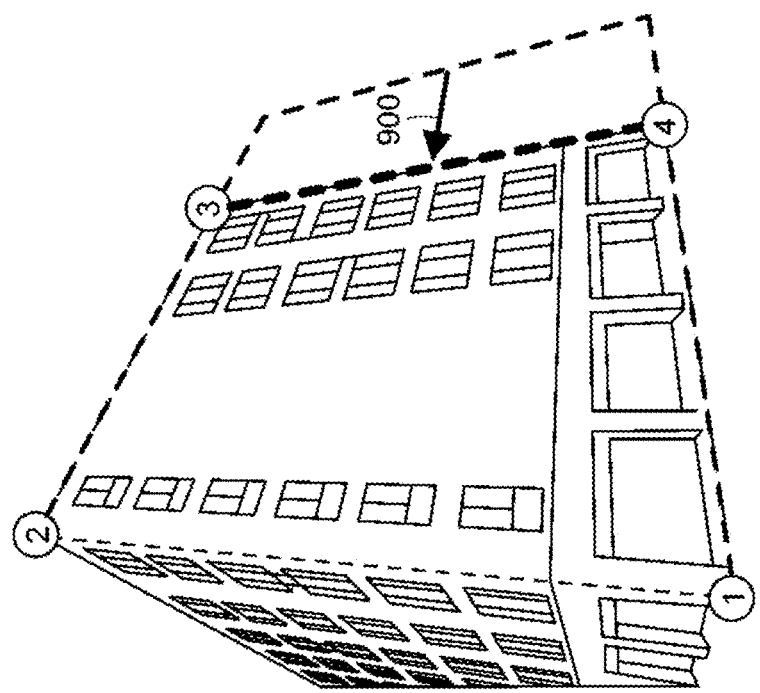
FIG. 9

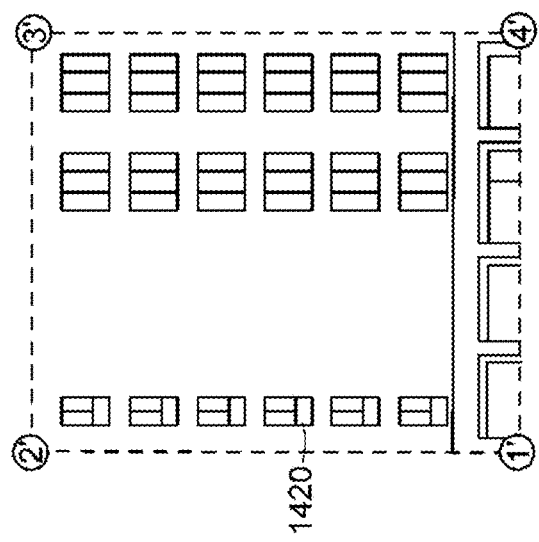
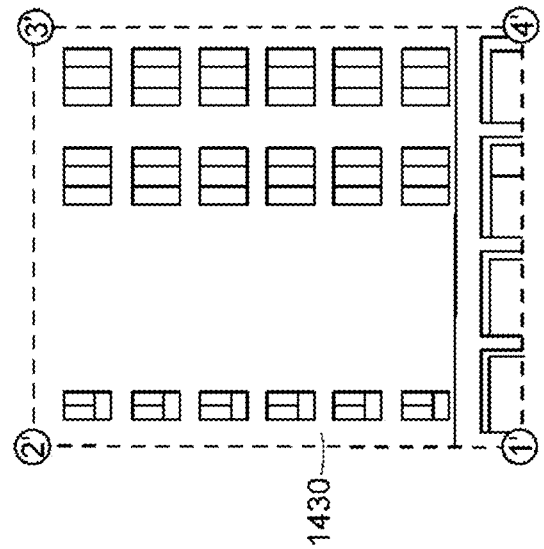
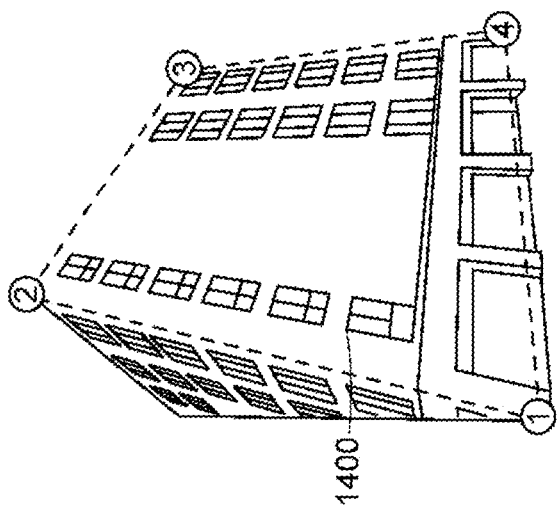
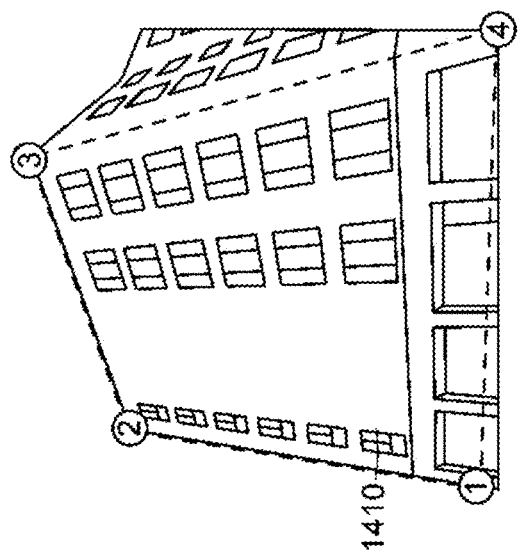
FIG. 14

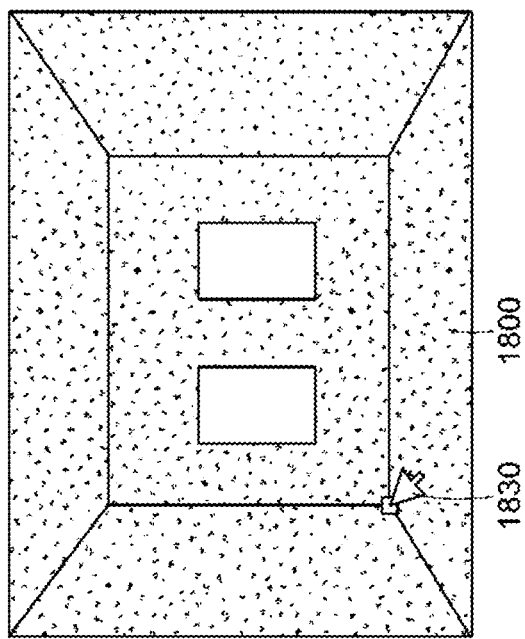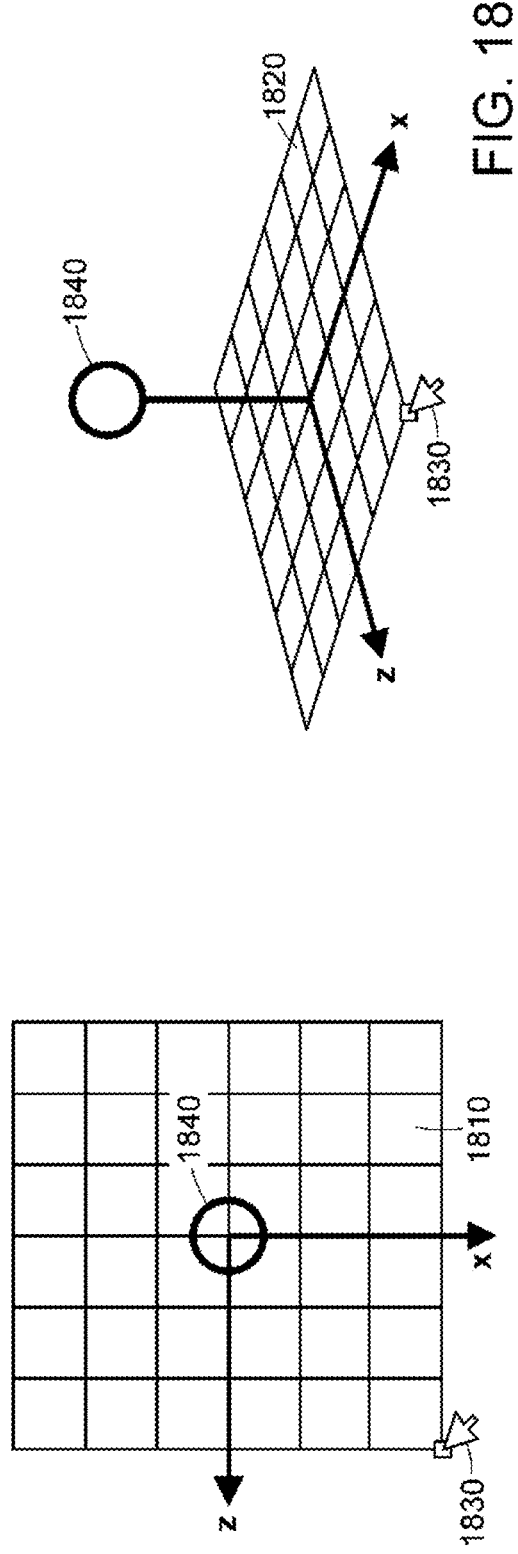
FIG. 18

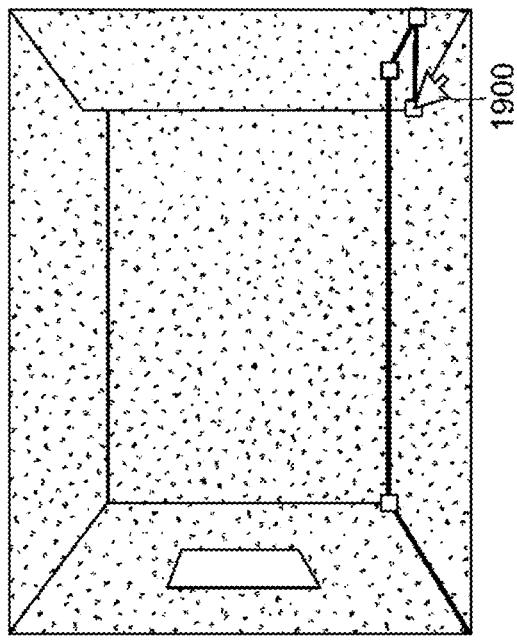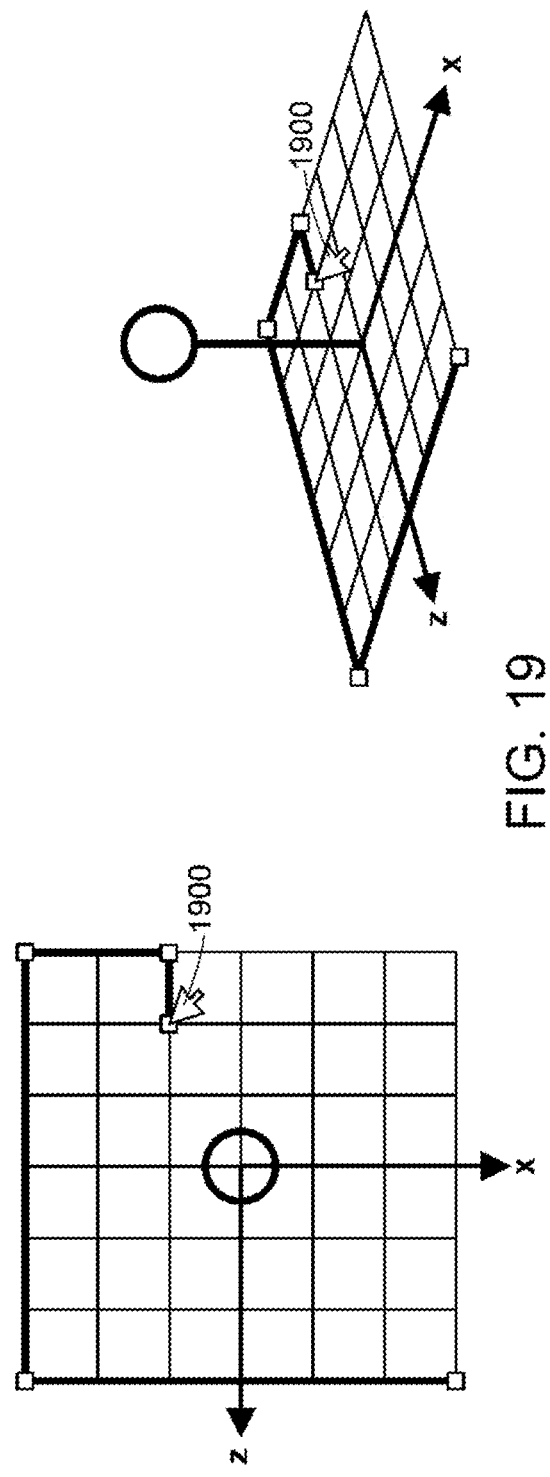
FIG. 19

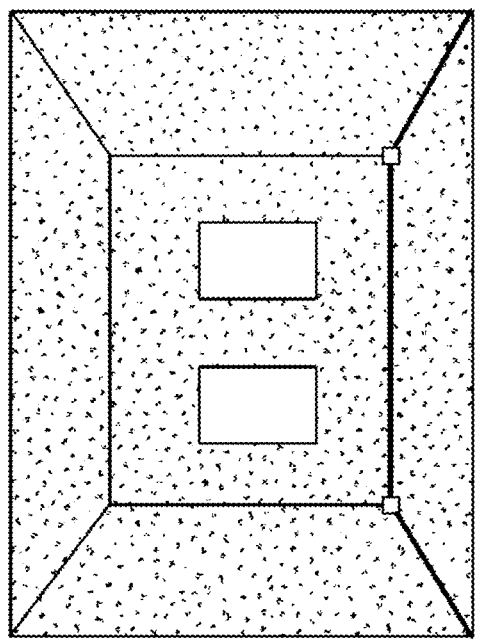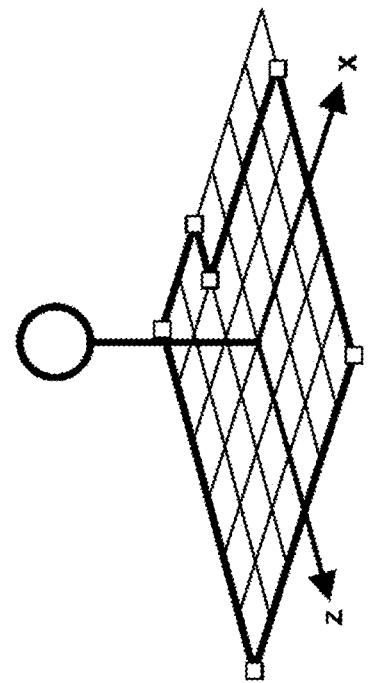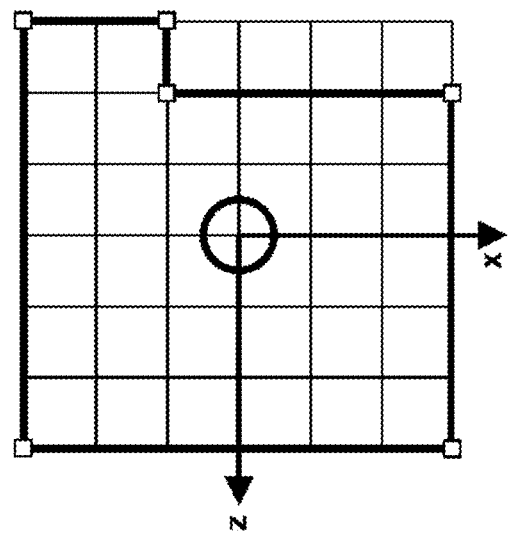
FIG. 20

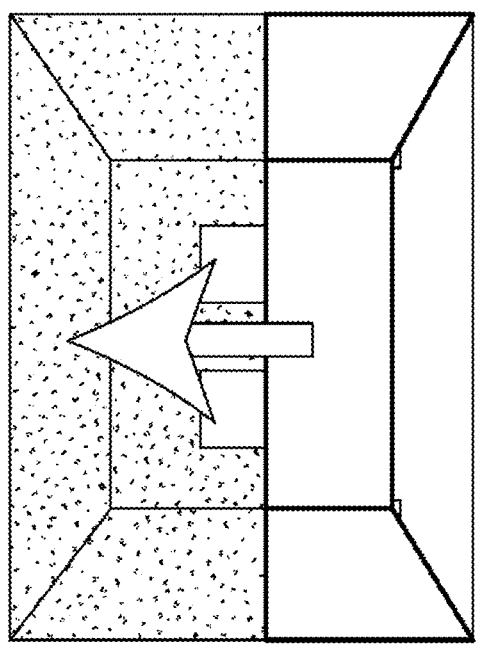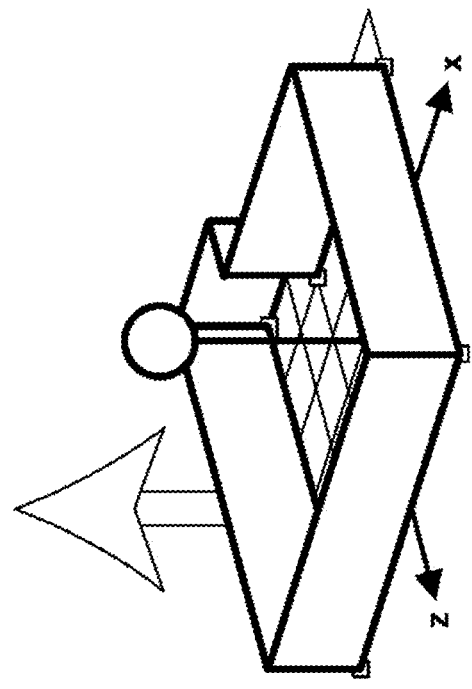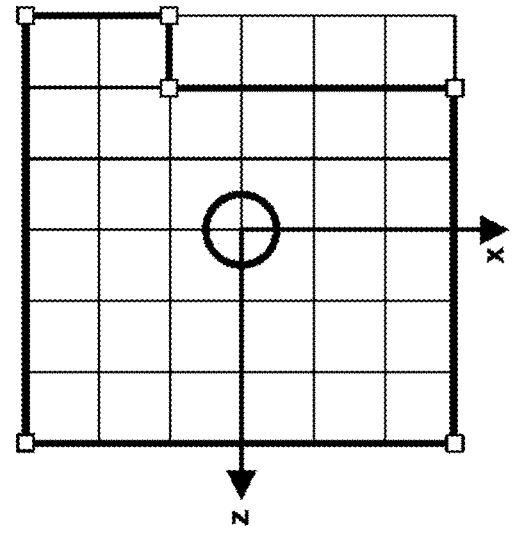
FIG. 21

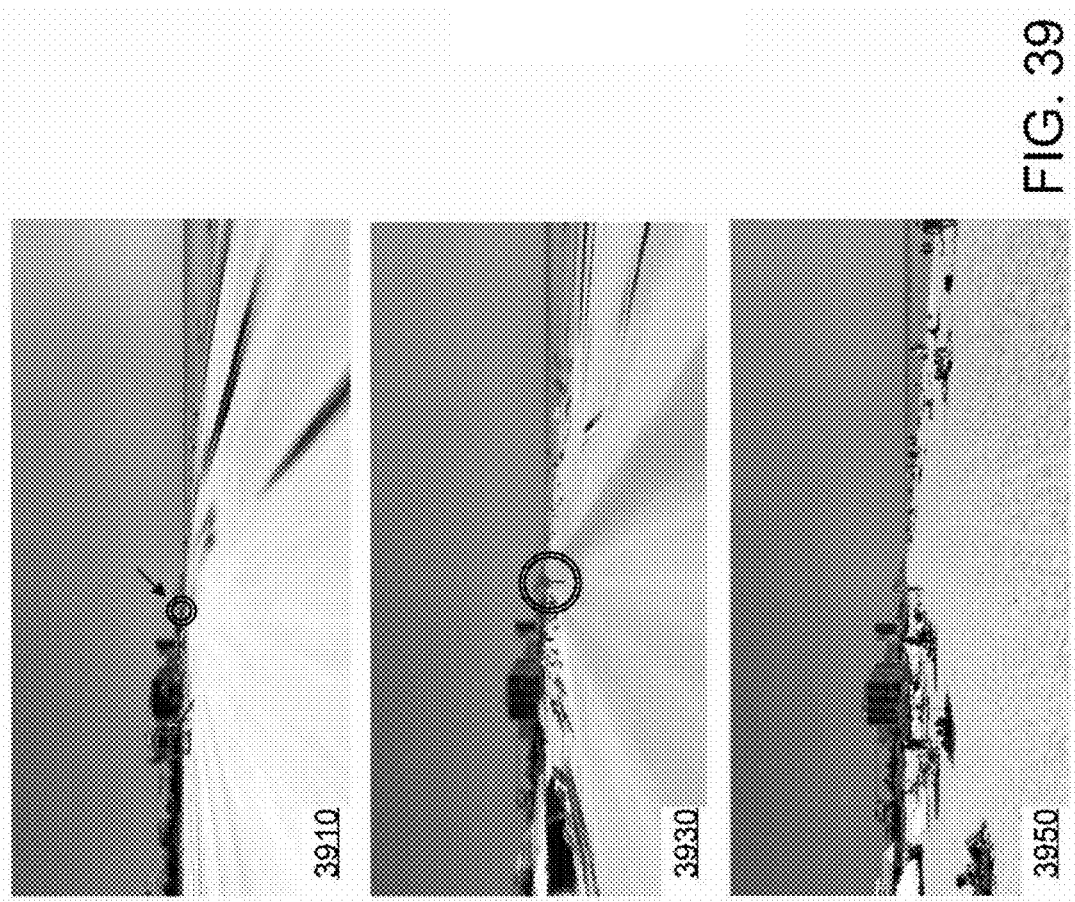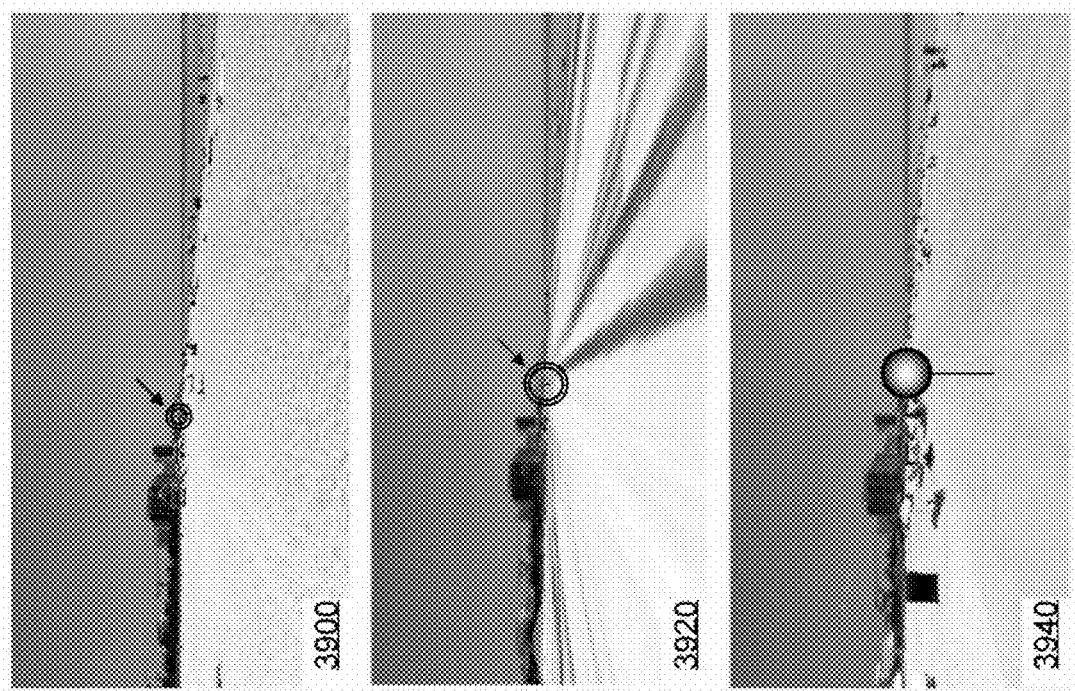
FIG. 39

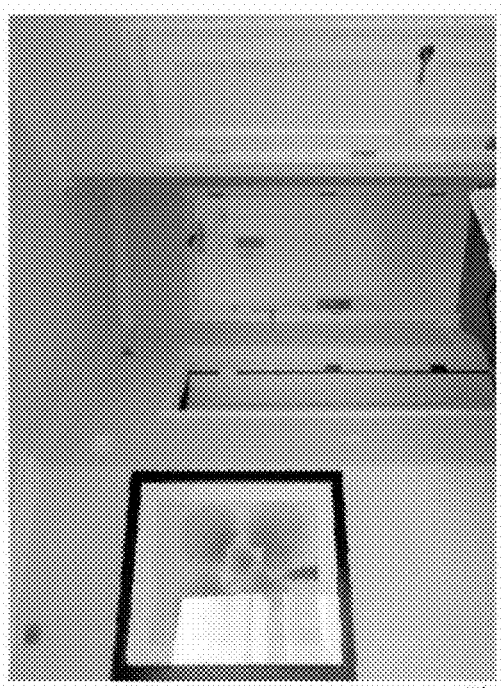
4210
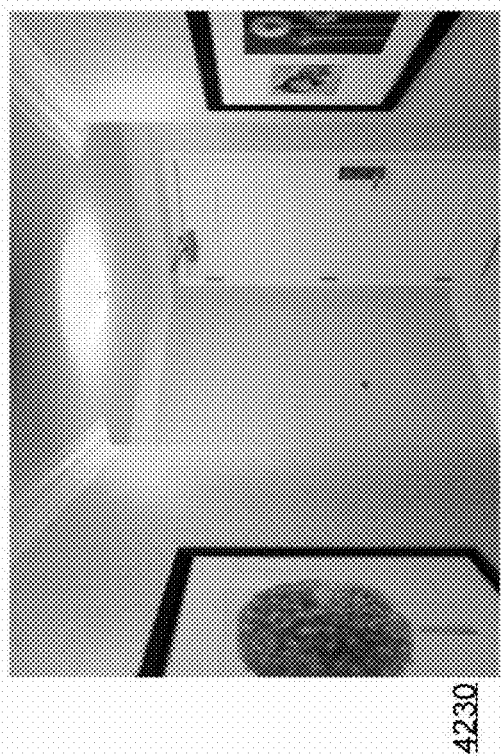
4230
4200
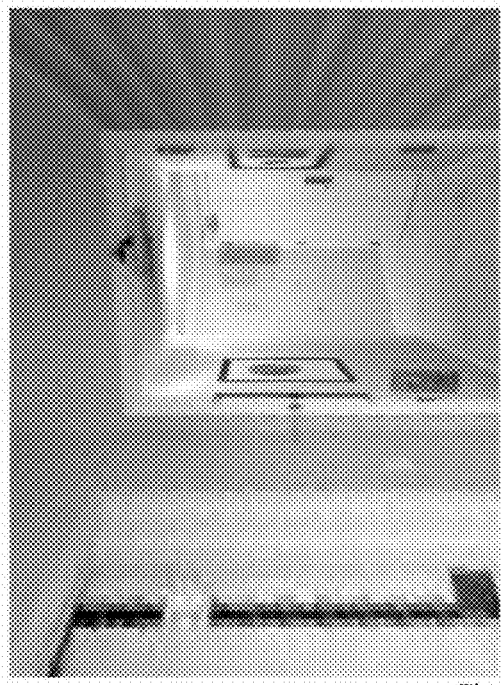
4220
FIG. 42

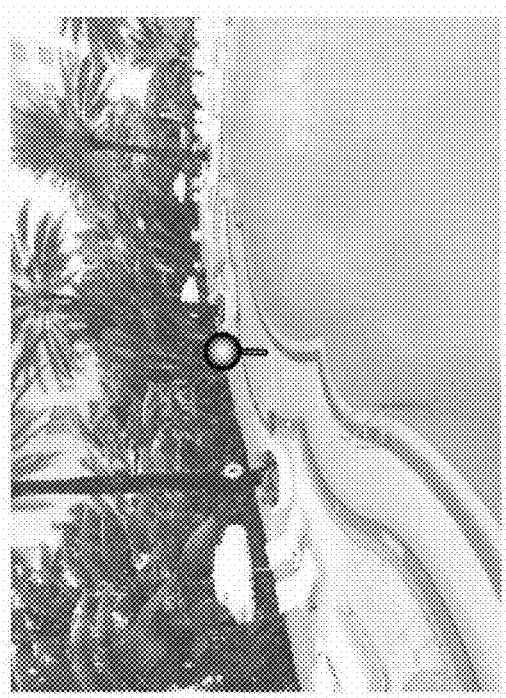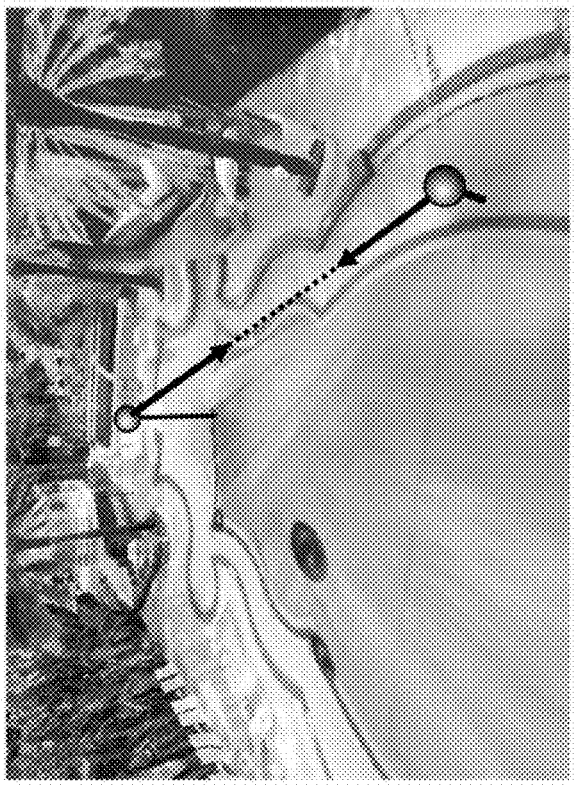
FIG. 44

FIG. 71

METHOD FOR INTER-SCENE TRANSITIONS

This application is a continuation of, and therefore claims priority to, U.S. patent application Ser. No. 16/042,309 (the '309 application—U.S. Pat. No. 10,304,233), filed Jul. 23, 2018, entitled "Method for Inter-Scene Transitions," the disclosure of which is incorporated herein by reference. The '309 application is a continuation of, and therefore claims priority to, U.S. patent application Ser. No. 14/969,669 (the '669 application—U.S. Pat. No. 10,032,306), filed Dec. 15, 2015, entitled "Method for Inter-Scene Transitions", the disclosure of which is incorporated herein by reference. The '669 application is a continuation of, and therefore claims priority from, U.S. patent application Ser. No. 14/090,654 (the '654 application—Abandoned), filed Nov. 26, 2013, entitled "Method for Inter-Scene Transitions", the disclosure of which is incorporated herein by reference. The '654 application is a continuation of, and therefore claims priority from, U.S. patent application Ser. No. 11/271,159 (the '159 application—Abandoned), filed Nov. 11, 2005, entitled "Method for Inter-Scene Transitions", the disclosure of which is incorporated herein by reference. The '159 application claims priority from U.S. provisional patent application Ser. No. 60/712,356 (the '356 application), filed Aug. 30, 2005, entitled "Method for Inter-Scene Transitions", the disclosure of which is incorporated herein by reference. The '159 application also claims priority from U.S. provisional patent application Ser. No. 60/627,335, filed Nov. 12, 2004, entitled "Method for Inter-Scene Transitions," which is incorporated herein by reference.

TECHNICAL FIELD

The invention relates to computer graphics methods and systems and, in particular, to methods and systems for creating smooth transitions between two or more related images or panoramas on a computer display.

BACKGROUND

Virtual tours have become a frequently used technique for providing viewers with information about scenes of interest. Such tours can provide a photorealistic, interactive and immersive experience of a scene or collection of scenes. These tours can incorporate one or more of a wide variety of graphic display techniques in representing the scenes.

One effective technique for presenting information as part of these tours is display of a panorama or panoramic image. Panoramic viewers can display images with wide fields of view, while maintaining detail across the entire picture. Several steps are required for creation and display of these panoramas: image capture, image "stitching", and panorama display (or viewing). The first step is capturing an image of the scene 100, which is also known as the acquisition step. Multiple photographs are typically taken from various angles from a single position 110 in space, as shown in FIG. 1. Regular cameras and equipment may be used and specialized hardware is not usually required. The photographic images taken are then "stitched" together using stitching techniques, as are known in the art, to provide a substantially seamless view of a scene from a given position. FIG. 2 shows an example of a scene in two panoramic formats: a sphere map 200, 220 and a cube map 210, 230. The unwrapped stitched image 200 maps onto a spherical geometry 220, and the panorama virtually replicates the photography acquisition position when viewed from the center of the sphere. The process works similarly with cube map panoramas. Other types of panoramic projections may be employed, but the process is similar. Note that images may be thought of as partial panoramas. The final step is display of or viewing the panorama, as illustrated in FIG. 3. The stitched together images are viewed interactively using panorama-viewing techniques, as are known in the art. In FIG. 3, the acquisition position 310 in virtual space in the center of the sphere is shown for a spherical panorama 300. Also shown is the pin-hole camera projection frustum 320 that represents one portion of the panoramic image that may be viewed on the display.

Current panoramic virtual tours have significant limitations. The inherent nature of panoramas (including regular photographs and images), is that panoramas are taken from a single acquisition position, and, thus, the images are static. To describe a broader area, i.e., beyond a view from a point in space, panoramic virtual tours typically employ a "periscope view"—the end user "pops" into a point in space, looks around, and then instantaneously "pops" into another position in space to navigate through a wider area. Assuming a simple case of two panoramic scenes, even when the acquisition positions are very close, it is often difficult for the viewer to mentally connect the two scenes. The two panoramas are not inherently capable of describing how the panoramas are connected and oriented with respect to each other. With these limitations, it is difficult for the viewer to understand the space, sense of orientation, and scale of a wider area with current virtual tours.

SUMMARY OF THE INVENTION

In a first embodiment of the invention, there is provided a method for creating a transition between a first scene and a second scene simulating motion in a computer system having a display. The first scene is observed from a first viewpoint and includes a feature. The second scene is observed from a second viewpoint and includes a second feature. The method includes first graphically identifying on the display the feature in the first scene and the feature in the second scene and determining a transformation mapping the first scene into the second scene using the two features. Then, one or more transitional images are created that include at least one transitional scene based on the feature in the first scene and on the feature in the second scene, such that there is simulated motion from the first scene to the second scene.

In another embodiment of the invention, a method is provided for displaying a transition between a first scene and a second scene simulating motion on a computer system display. The first scene is observed from a first viewpoint and includes a first feature, and the second scene is observed from a second viewpoint and includes a second feature. The method includes displaying a navigational icon embedded in the first scene. When the navigational icon is activated, at least one transitional image is displayed that includes at least one transitional scene based on the first feature and on the second feature, such that there is simulated motion from the first scene to the second scene.

In a further embodiment of the invention, a method is provided for displaying a transition between a first scene and a selected scene simulating motion on a computer system display. The first scene is observed from a first viewpoint and includes a first feature, and the selected scene is observed from a second viewpoint and includes a second feature. The method includes displaying the first scene; receiving an indication of the location of the selected scene.

When the location of the selected location is received, at least one transitional image is displayed that includes at least one transitional scene based on the first feature and on the second feature, such that there is simulated motion from the first scene to the selected scene. In specific embodiment of the invention, the indication may be received from search engine output, or a user selection from a list or activation of an icon anywhere on a display, etc.

In a further embodiment of the invention, a method is provided for displaying a transition between a first scene and a second scene and between the second scene and a third scene simulating motion on a computer system display. The first scene is observed from a first viewpoint and includes a first feature; the second scene is observed from a second viewpoint and includes a second feature; and the third scene is observed from a third viewpoint and includes a third feature. The method includes:

providing a first transitional image that includes at least one transitional scene based on the first feature and on the second feature, such that there is simulated motion from the first scene to the second scene; and providing a second transitional image that includes at least one transitional scene based on the second feature and on the third feature, such that there is simulated motion from the second viewpoint to the third viewpoint. The first transitional image and the second transitional image are formed without determining the absolute positions and orientations in a frame of reference of each of the first, second and third scenes.

In another embodiment of the invention, a method is provided for displaying a transition between a first scene and a selected scene simulating motion on a computer system display. The first scene is observed from a first viewpoint and includes a first feature; a second scene is observed from a second viewpoint and includes a second feature; and the selected scene is observed from a selected scene viewpoint. The method includes: displaying the first scene; receiving an indication of the location of the selected scene viewpoint; and determining a route from the first viewpoint to the selected scene viewpoint, where the route includes the second viewpoint. When the indication of the location of the selected scene viewpoint is received, a transitional image is displayed that includes at least one transitional scene based on the first feature and on the second feature, such that there is simulated motion from the first scene to the second scene.

BRIEF DESCRIPTION OF THE DRAWINGS

The foregoing features of the invention will be more readily understood by reference to the following detailed description, taken with reference to the accompanying drawings in which:

FIG. 9 illustrates interactive edge selection and movement according to an embodiment of the invention;

FIG. 14 illustrates corresponding features from the panoramas of FIG. 13 in image and in world space;

FIG. 18 shows three representations of an interior to illustrate creation of transitional objects using 3D geometry and texture mapping, according to an embodiment of the invention;

FIG. 19 illustrates the process of identifying a footprint for the process of FIG. 18;

FIG. 20 shows the completed footprint started in FIG. 19;

FIG. 21 illustrates extruding the footprint of FIGS. 19-20;

FIGS. 38-39 provide an example of an inter-scene transition using morphing according to an embodiment of the invention;

FIGS. 40-42 provide an example of an inter-scene transition for two scenes where exact features do not correspond, according to an embodiment of the invention;

FIGS. 43-44 provide an example of an inter-scene transition for two scenes without rectangular features to correspond, according to an embodiment of the invention

FIG. 71 shows an example of a list where selection of an item causes motion to a scene, according to an embodiment of the invention.

DETAILED DESCRIPTION OF SPECIFIC EMBODIMENTS

Note that as used in this description and the accompanying claims, the following terms shall have the meanings indicated, unless the context otherwise requires: The term "perspective view" shall mean a 2D view of an image in a world plane projected on an image plane. The image plane will frequently be a display surface, but in general, may be any plane. A "perspective rectangle" shall mean a 2D polygon in a perspective view which is a projection of a rectangle in world space onto the image plane. A "transitional parameter" shall mean a measure of the contribution of a first image versus a second image to a transitional object formed from a combination of the first image and the second image. For example, if the transitional object is derived from alpha blending the first image and the second image, the transitional parameter measures the degree of transparency and opacity of the contribution of each image to the transitional object. An "active element" shall mean an icon displayed in an image such that selection of the icon by an input device initiates an action. A "navigational icon" shall mean an active element icon displayed in an image such that selection of the icon by an input device causes a displayed image of a scene to update.

In broad overview, embodiments of the invention provide a system and a method that simulate smooth motion between images of two or more connected locations or scenes. Simulated motion provides a sense of orientation and an understanding of the space to users navigating through a series of images of locations. To navigate from one image to another, a user may select a portion of a first scene that connects to a second scene. The view is then transitioned to the second scene. This type of navigation may be disorienting if the second scene simply replaces the first scene—there is no sense of motion between the scenes to emphasize the geographic connection between them. Instead, motion between the two scenes may be simulated to provide the viewer a better sense of the relationships between the two scenes, including a sense of space and orientation.

Figure 1:
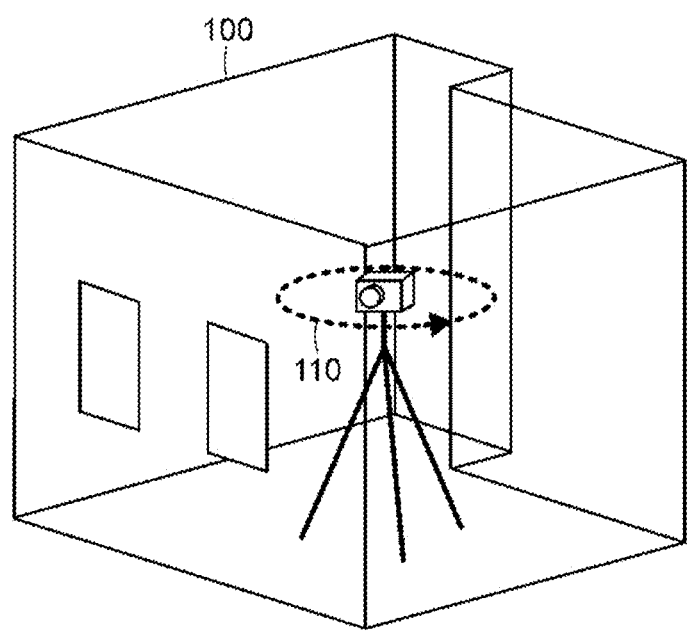
FIG. 1 illustrates capturing images to form a panorama.
Figure 2:
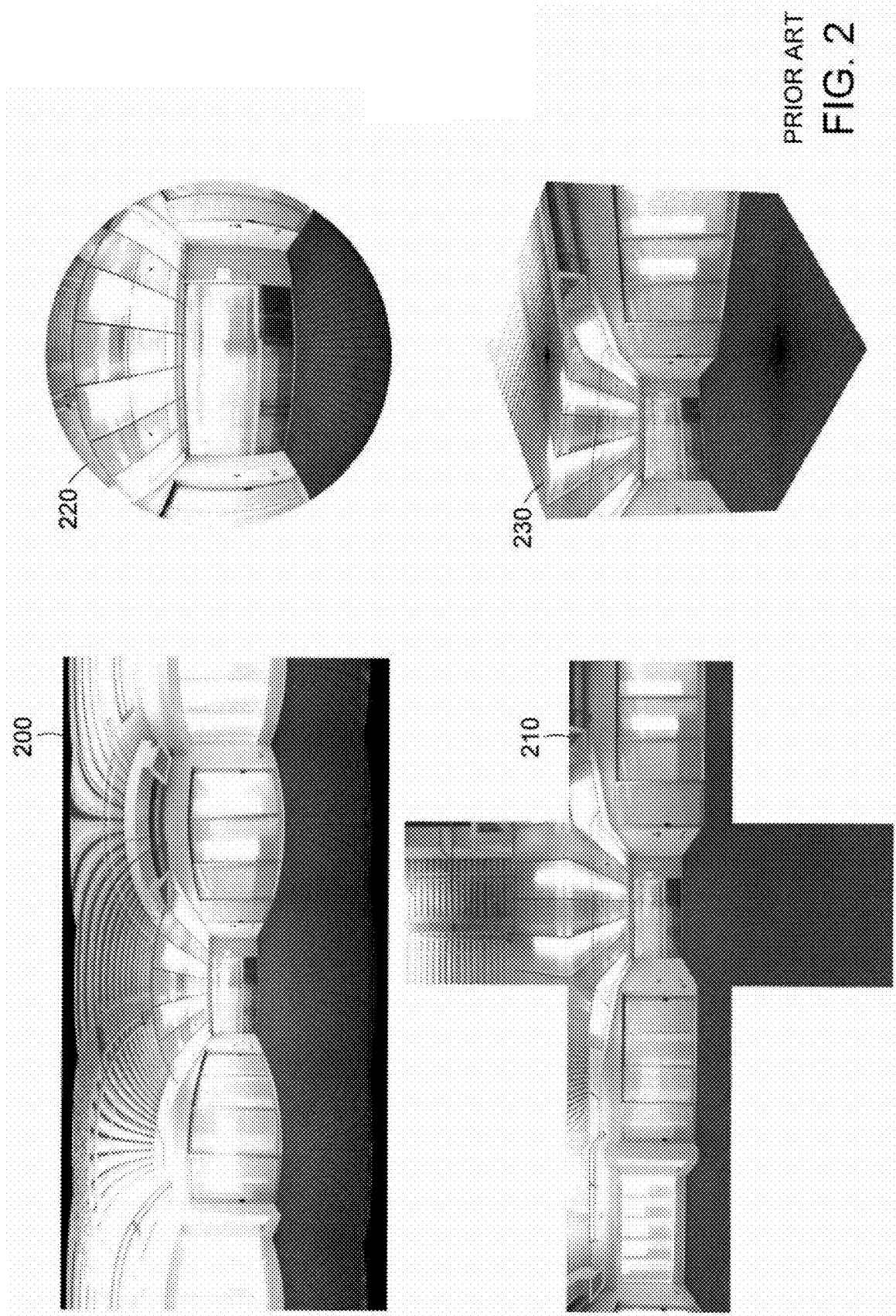
FIG. 2 shows an example of a scene in two panoramic formats—a sphere map panorama and a cube map panorama.
Figure 3:
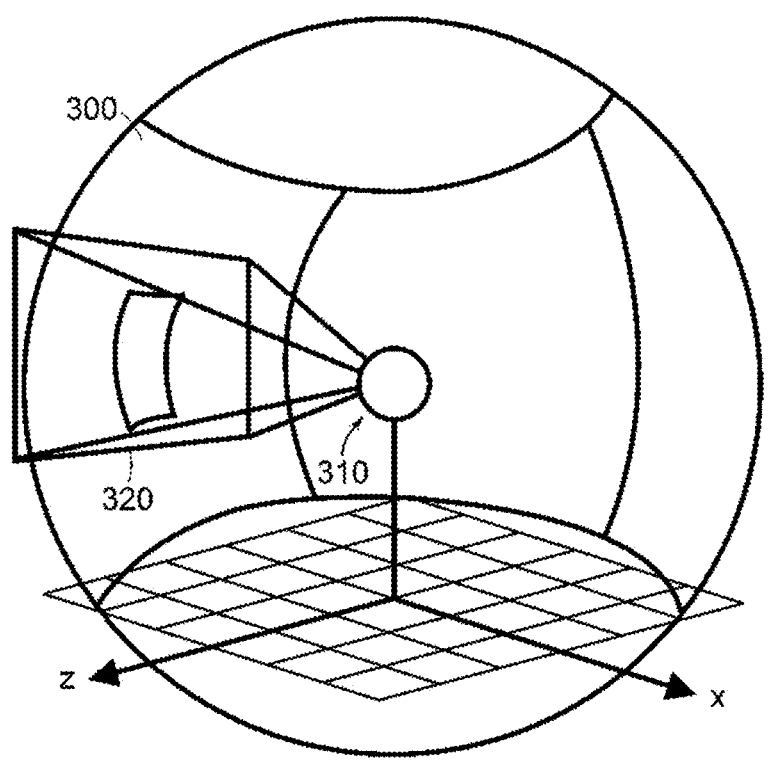
FIG. 3 illustrates viewing a spherical panorama.
Figure 4:
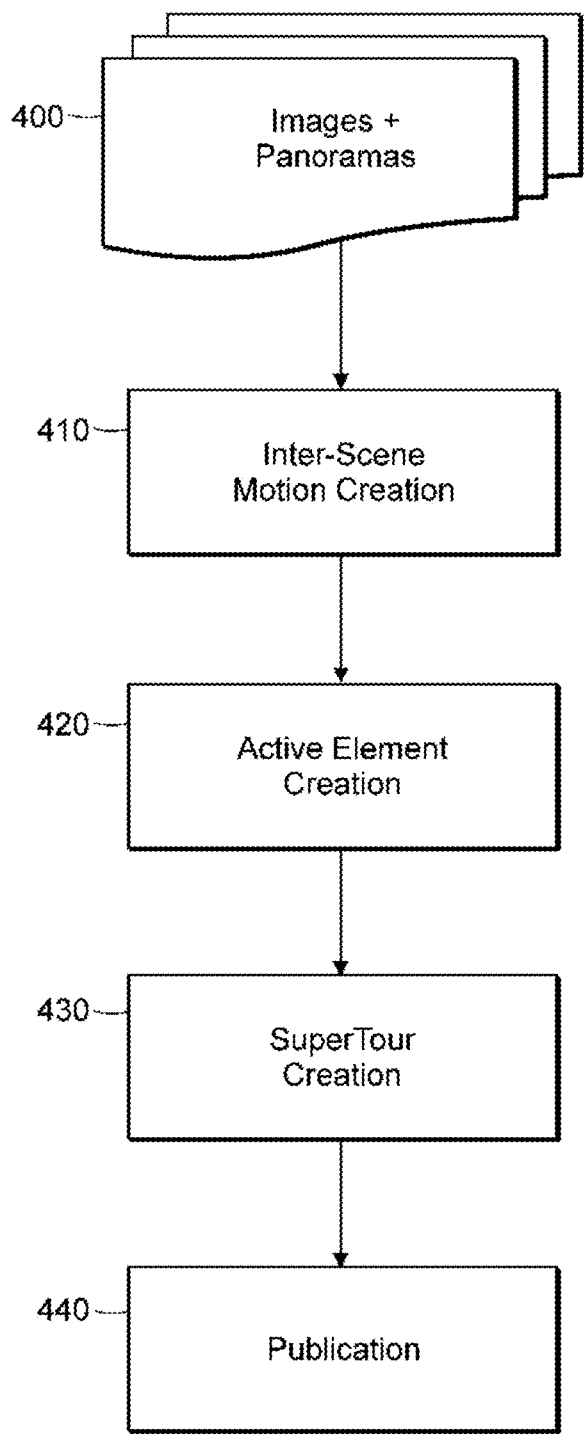
FIG. 4 shows an overview flow diagram for a method of creating a supertour, according to an embodiment of the invention.

In further embodiments of the invention, this concept of simulating motion between images can be extended to create a connected network of multiple image pairs forming a tour of a space, such as a neighborhood, a boulevard, or even a town or city. Such a network of scenes will be called below a "supertour." The term "supertour" is used for convenience in description and not by way of limitation: the network of images may extend from two images to an arbitrarily large number of images. An overview flow diagram for a method of creating a supertour is shown in FIG. 4. Once input photographs and panoramas, also known as "source images," of a desired supertour location have been acquired 400, the supertour may be created a pair of source images at a time through inter-scene motion creation 410. Once transitions between scenes have been created, active elements may be added to the scenes to provide enhanced user interactivity 420, e.g., a navigational icon may be included to activate a transition to the next space, or a virtual informational kiosk may provide amplifying information about a location upon activation. Next, scene viewers, inter-scene motion generators and active elements may be coupled 430 together with maps, etc, to create a connected and complex virtual experience of a captured space. The supertour content may then be published 440 for viewing by an end user. Illustrative embodiments of these steps are provided below.

One method of providing a sense of connection between scenes uses techniques known as zooming and fading. From an initial panorama or image, the viewer orients towards the second scene (panorama or image), zooms in by varying the field-of-view ("FOV") of a virtual camera, then fades out of the first panorama, then fades into the second panorama. This technique, may provide some sense of orientation, but is very dependent on the scene—how closely the panoramic images have been acquired, whether the scenes contain substantial amounts of common visual features, and the complexity of visibility and occlusions among the objects within the scene. Otherwise, zooming and fading works no better than "popping" into the destination panorama without the zoom-fade effects. Furthermore, zooming into an image cannot properly simulate moving in three-dimensional space. Note that zooming into a flat image is the same as "having a closer look" at an image, and does not simulate motion in 3D space. Realistic motion heavily depends on the parallax effect as relative positions between objects and camera changes.

Another method of providing a simulation of motion between two images is to create a physical movie of the motion between images, which is played when a user chooses to move between two scenes. Capturing an actual movie between positions in physical space could be done using a video camera, and other camera positioning equipment. This approach of using movies is particularly useful for transitioning between images on Web pages. Because most Web browsers include software that is capable of playing streaming video or other digital movie or video formats, no additional software is needed to display such movies. Creating actual physical movies for transitions between scenes can be time consuming and expensive to acquire, especially for large environments, e.g. cityscapes. The movies also require significant data and post processing. Because of differences in points-of-view, it is typically necessary to create separate movies for each direction in which motion between images or panoramas is desired. Thus, for movement between two images, two movies are needed—one movie for movement from the first image to the second, and a different movie for movement from the second image to the first. This further complicates the acquisition process, since accurate connections of the bidirectional movies are important in creating seamless movies and images/panoramas. Specialized equipment as well as a crew of people are necessary for such endeavors.

Another method of simulating motion between two images involves creating a three-dimensional model that represents the path between two images. Once such a three-dimensional model exists, motion between the images can be simulated by moving the position of a virtual camera in the three-dimensional model. This approach provides a high degree of flexibility, permitting a user to view the area represented by the model from any vantage point. Techniques such as those illustrated in U.S. patent application Ser. No. 10/780,500, entitled "Modeling and Editing Image Panoramas," which is incorporated herein by reference, may be used to create three dimensional models from panoramic images. However, these techniques create visual artifacts and seams, since photo-textured models have static texture maps.

Figure 5:
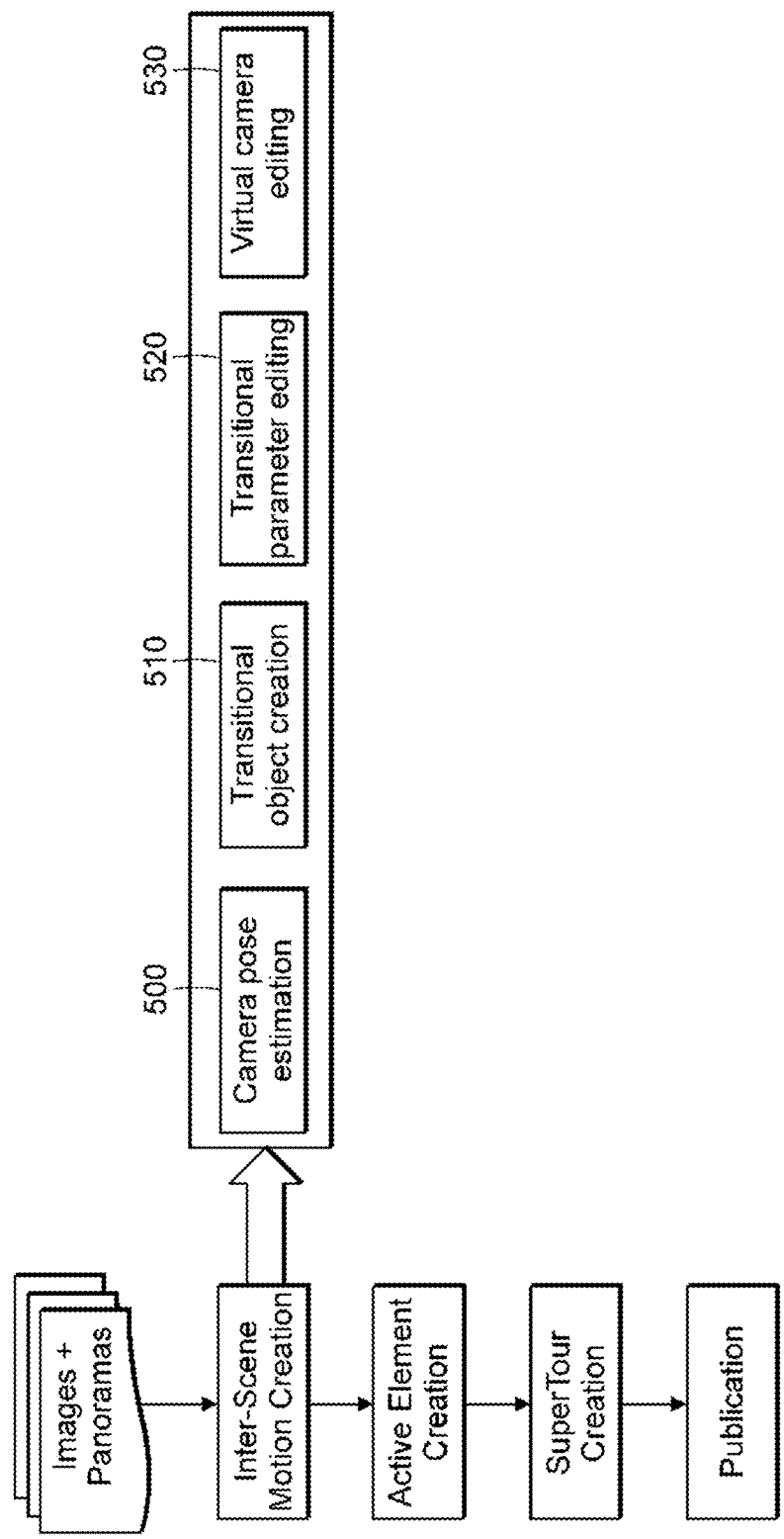
FIG. 5 shows an overview flow diagram for a method of creating inter-scene motion, according to an embodiment of the invention.

In various embodiments of the present invention, a method and a system are provided for generating a substantially seamless transition between two scenes—a "first scene" and a "second scene"—simulating motion on a computer display screen. The first scene is observed from a first viewpoint and the second scene is observed from a second viewpoint. These scenes may be a single source image or a panoramic source image or any portion thereof. Images may include virtually any type of digitized graphical content including photographs, pictures, sketches, paintings, etc. FIG. 5 shows a flow diagram for inter-scene motion creation 410 according to an embodiment of the invention. Inter-scene motion creation may include four components: camera pose estimation 500, transitional object creation 510, transitional parameter editing 520, and virtual camera editing 530. Note that these steps need not be performed sequentially and one or more steps may be repeated as many times are desired. Further, all steps may not need to be performed in each instance.

The first step 500—acquisition camera pose estimation—determines relative acquisition positions of the first and second scenes in 3D space (i.e., a world space). More technically, the pose estimation step determines the camera extrinsics—the position and orientation of the acquisition camera. To simulate 3D motion from one point in space to another, it is necessary to compute relative distances and orientations of the source images with respect to each other. Typically, to compute the pair-wise pose estimation, correspondences between common features in the source images are established, automatically or with human intervention. With appropriate levels of corresponded features, the relative camera extrinsics may be computed. In a specific embodiment of the invention, planar rectangular feature correspondences between the scenes are used to estimate the pose. In another specific embodiment of the invention, a perspective rectangle tool ("PRT") is provided, as described below, to facilitate tracing of rectangular features in an image. Note that this step established a transformation that maps the first scene into the second scene and that, in embodiments of the invention, a variety of techniques, as are known in the art, may be used to determine this transformation. Note that the source images may show the same physical location or different physical locations and features within the source images that are corresponded need not be the same feature or at the same location.

Transitional objects are then created 510. Once the relative positions of the first and second scenes are determined, then a path for a virtual camera is selected from the first scene to the second scene. The camera path may be any arbitrary path, but, by default, the camera path may be a straight line. To simulate motion, "transitional objects" are created. Transitional scenes incorporating these transitional objects are displayed to simulate motion from the first scene to the second scene. These transitional objects are typically objects in the transitional scenes that are formed by combining a portion or feature of the first scene and a portion or feature of a second scene. The combining operators are what we call transitional parameters, described in detail below. In a specific embodiment of the invention, three-dimensional geometry with projective texture mapping may be used to create transitional objects. The projective textures are either from the first source image, or the second source image, or a blend of both. When the transition to the second scene has been achieved, the transitional scenes including the transitional objects disappear, and the user sees only the second scene. For example, transitional objects in a beach scene may include people, beach umbrellas, the beach, and/or the sky. As the virtual camera travels to the second scene, the people, the beach, the sky and the umbrellas pass by to correctly simulate a 3D motion in space.

Next, transitional parameters may be entered and adjusted 520. As the virtual camera travels from the first scene to the second scene, transitional parameters determine how the transitional objects in the transitional scenes vary in time, as the motion is simulated from the first scene to the second scene. Transitional parameters may include alpha blending (transparency), motion blurring, feature morphing, etc. In general, the transitional parameters may be thought as image processing filters (both 2D and 3D) that are applied over time during the flight of a virtual camera along a path.

Finally, the virtual camera path from the first scene to the second scene may be edited 530. In some embodiments of the invention, the virtual camera path may be linear by default from the acquisition point of the first scene to the acquisition point of the second scene. Alternatively, the virtual camera path may be determined to be an arbitrary path, e.g., a curved path. Further, the speed at which the path is traversed may vary. Furthermore, the viewing direction may point in any direction and may change during the transition from the first scene to the second scene.

Figure 6:
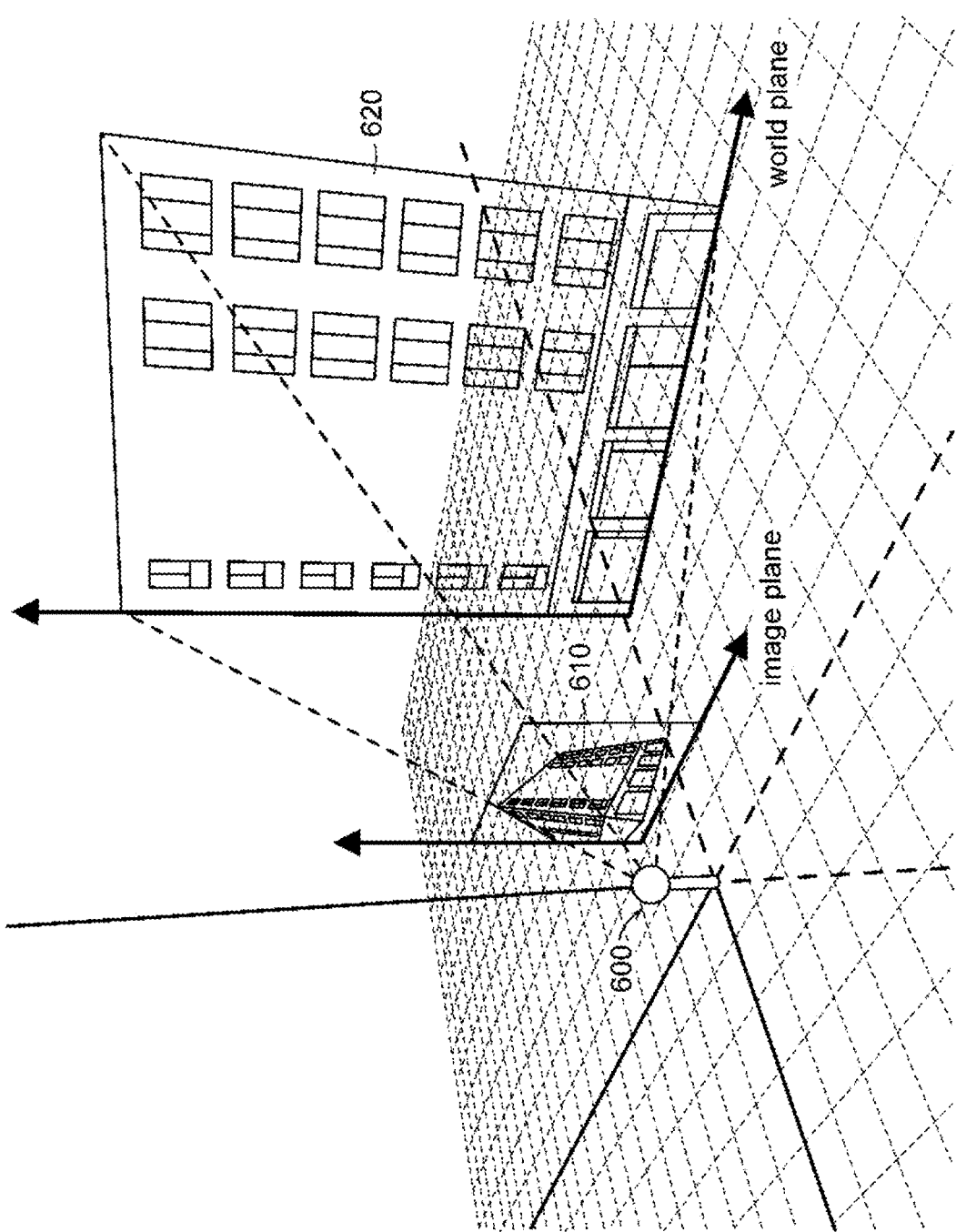
FIG. 6 illustrates the relationship between an image plane and its corresponding world plane, in an embodiment of the invention.
Figure 7:
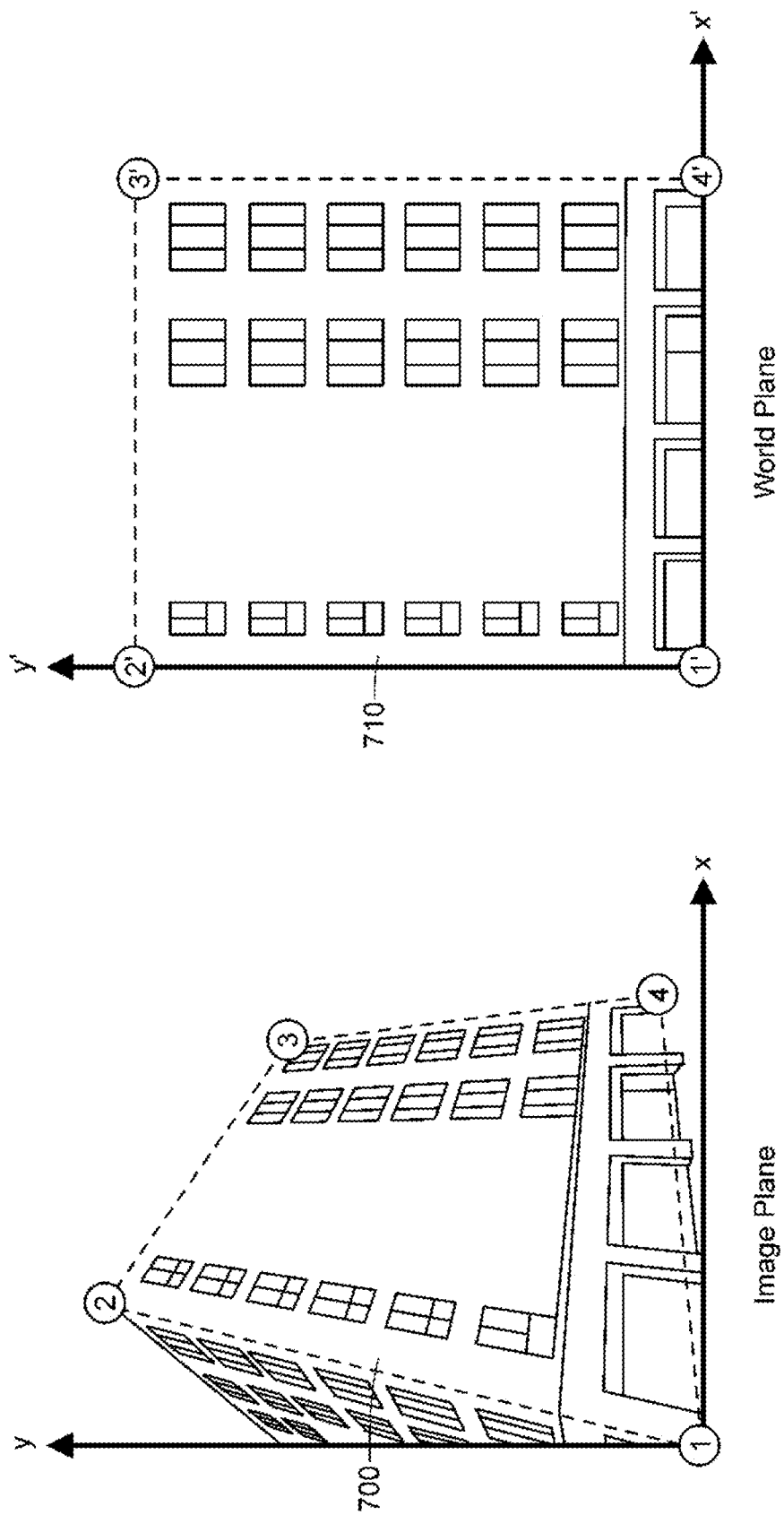
FIG. 7 illustrates the relationship between a feature in the image plane and its corresponding world plane image, in the illustration of FIG. 6.

In an embodiment of the invention, a "perspective rectangle tool" ("PRT"), enables a user to draw "exact" rectangular features on a source image (in perspective) using a constrained user interface. (By "exact," we mean the measure of each corner angle of the rectangle is 90 degrees in a world plane.) FIG. 6 illustrates an acquisition position 600, a source image on the image plane 610, and a projection of a rectangular feature onto a world plane 620. The source image on the image plane 610 is what we may see as a part of a panorama on a computer display from the acquisition position 600. FIG. 7 shows a close-up of the image plane and the world plane. Shown on the image plane is a rectangular feature (a building façade) with perspective 700 in x and y coordinates, and shown on a world plane is a rectified building façade 710 in x' and y' coordinates. Points 1-2-3-4 on the image plane 700 correspond to points 1'-2'-3'-4' on the world plane 710.

If we assume that the perspective rectangle on the image plane is an exact rectangle then we can compute a world plane where the corresponding rectangle is an exact rectangle. We describe next an embodiment of the invention where constraints are applied to the user interface such that the four points clicked on the image plane (via a pointing device on the display surface) will always create an exact perspective rectangle, therefore, enabling a world plane to be defined, in which the corresponding rectangle is a rectified exact rectangle.

Figure 8:
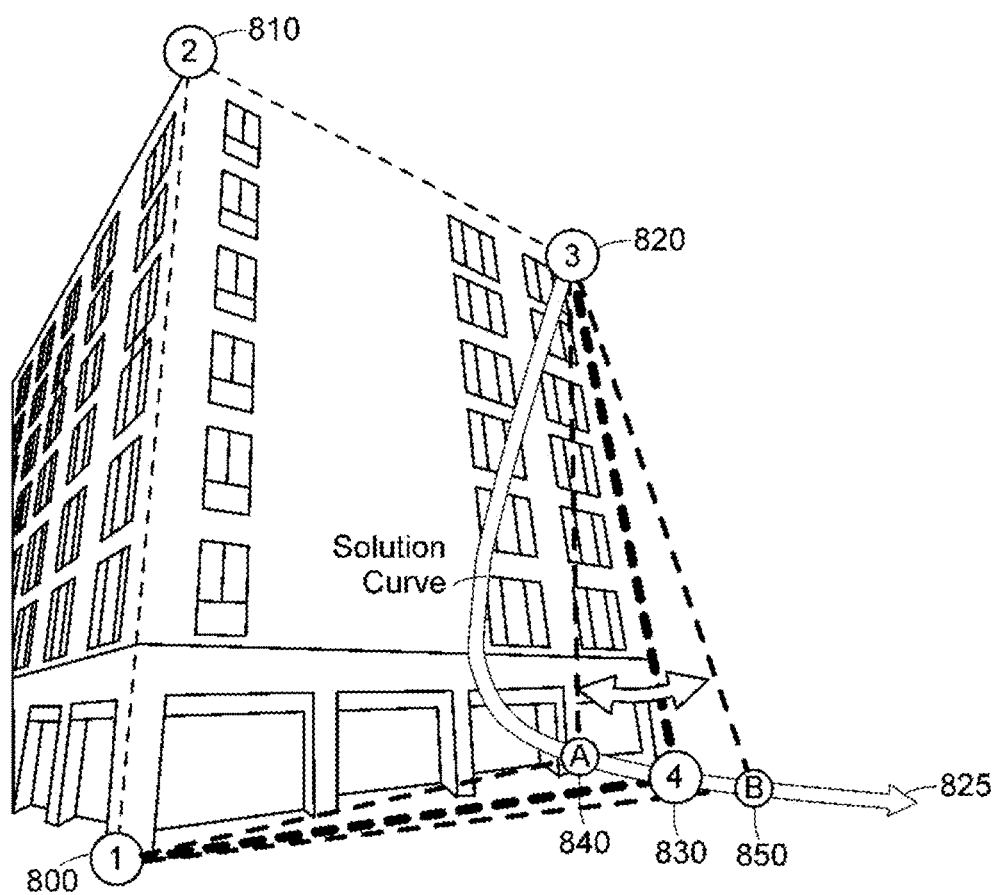
FIG. 8 illustrates selection of points of a perspective rectangle in the image plane according to an embodiment of the invention.

As shown in FIG. 8, the user first identifies three corners 800, 810, 820 of the building façade with a pointing device. The user interface constrains the user-identified fourth point to a solution curve 825. The resulting four-sided polygon is always an exact perspective rectangle, i.e. always a perfect rectangle with 90-degree corner angles as seen on the world plane. As the fourth point is moved, the user interface constrains the edges 1-4 and 3-4, such that the resulting four-cornered polygon in the image plane is maintained as a perspective rectangle. In the world plane, therefore, the four points correspond to a rectangle. In FIG. 8, points A and B on the solution curve (840 and 850, respectively) are also valid specifications of a perspective rectangle, but points A and B do not match the building facade of the source image. (PRT used as a feature correspondence tool between two source images is discussed below.).

Once the four corners of the rectangular feature have been established, any of the corners may be selected with a pointing device and edited. Similar constraints are applied such that any edits to the corner will maintain the exactness of the rectangle. Edges may also be edited as well while maintaining the exactness requirement. In a specific embodiment of the invention, as illustrated in FIG. 9, the user may interactively move one of the edges on the perspective rectangle (e.g., 900), and the edges will be constrained such that the polygon in the image plane will transform into a rectangle in world space. Moving the edge in the image plane may be seen as constraining the edge to the vanishing points, 910 and 920; in the case of the illustrated example, the edge is constrained to 910. In other specific embodiments of the invention, processes such as edge detection, corner detection, and the like may be provided to facilitate feature selection.

Figure 10:
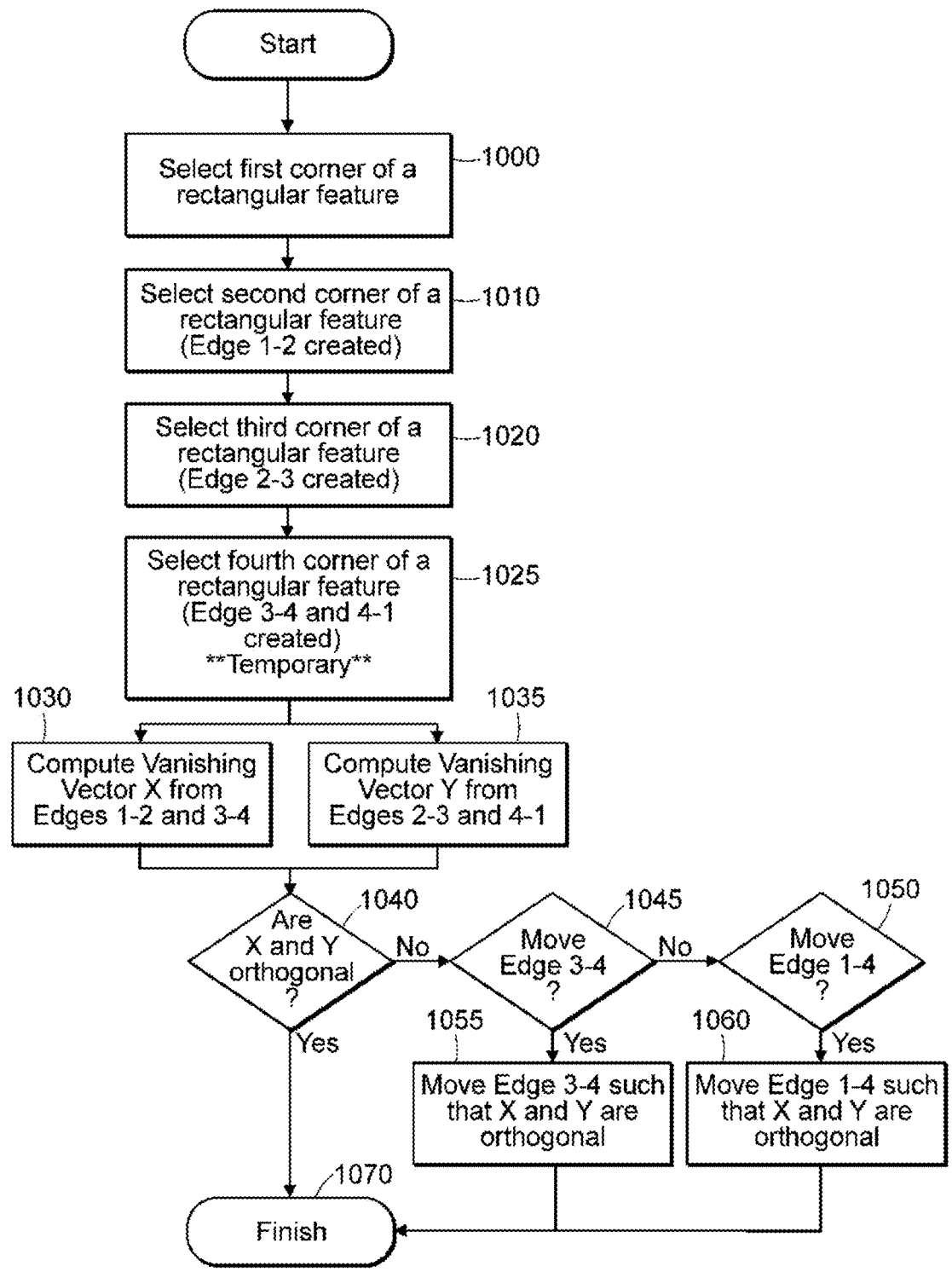
FIG. 10 is a flow diagram for the definition of a perspective rectangle according to an embodiment of the invention.
Figure 11:
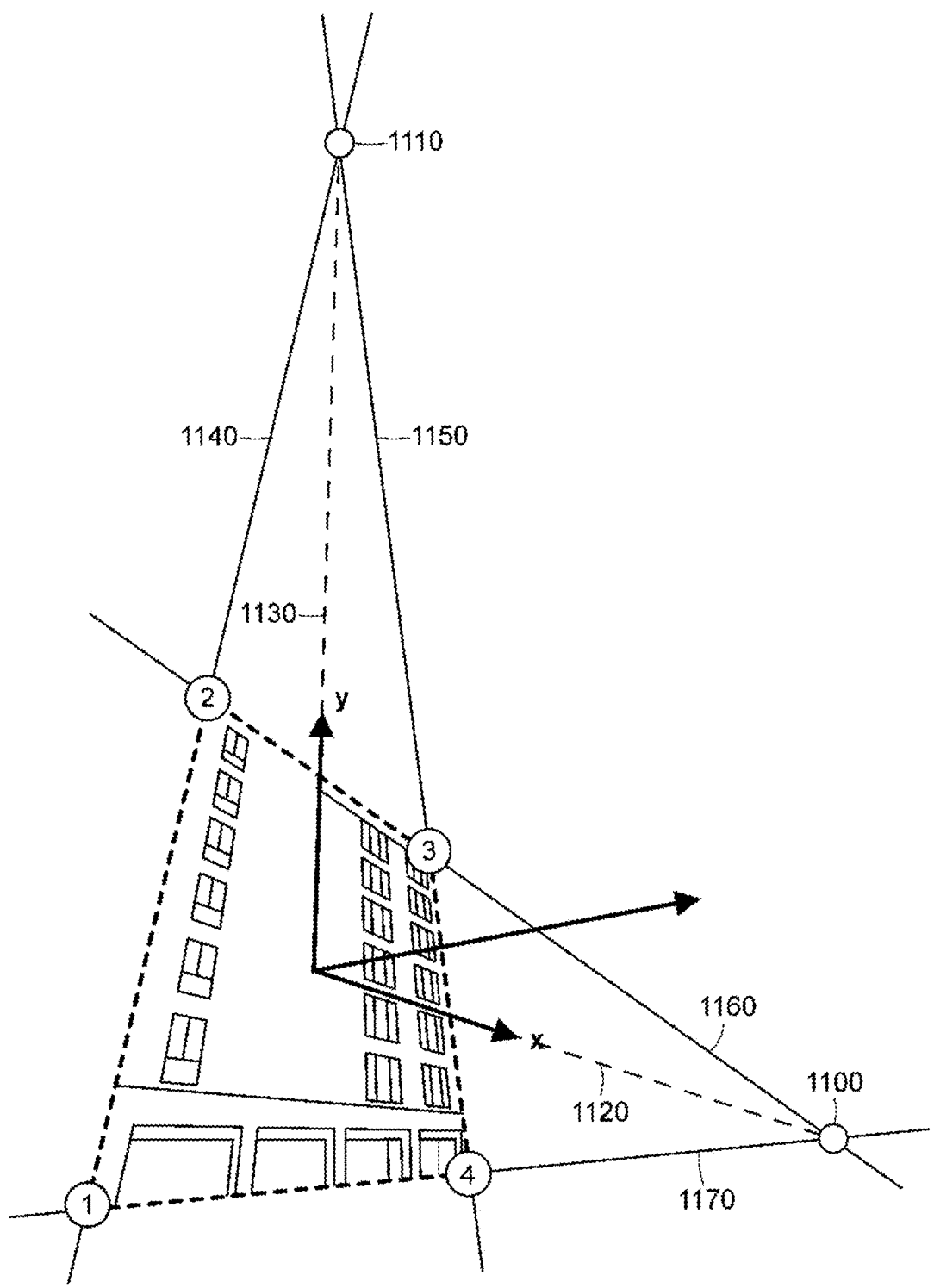
FIG. 11 illustrates generation of a normal vector to a perspective rectangle according to an embodiment of the invention.

A flow diagram of a process for determining a perspective rectangle is shown in FIG. 10. From points 1-2-3-4 of the perspective rectangle on the image plane (1000, 1010, 1020, 1025), a pair of vanishing vectors are derived (1030, 1035). Note that at this point, the user-specified point 1025 may not be on the solution curve. It is used to compute the closest point on the solution curve that maintains the exactness requirement. On FIG. 11, the vanishing points created are shown 1100, 1110 and, and the vanishing vectors, x 1120 and y 1130, are then calculated (vanishing vector computation is described below). Note that vanishing points only happen from the perspective of the camera. If the vectors are orthogonal, the perspective rectangle 1-2-3-4 defines a rectangle and its plane in world space and the process completes 1070. If the vanishing vectors are not orthogonal, an edge is selected to be moved to make the vectors orthogonal 1045, 1050. Once the edge to be moved is selected, a point of the polygon is moved to make the vectors orthogonal and the process completes 1070.

Figure 12:
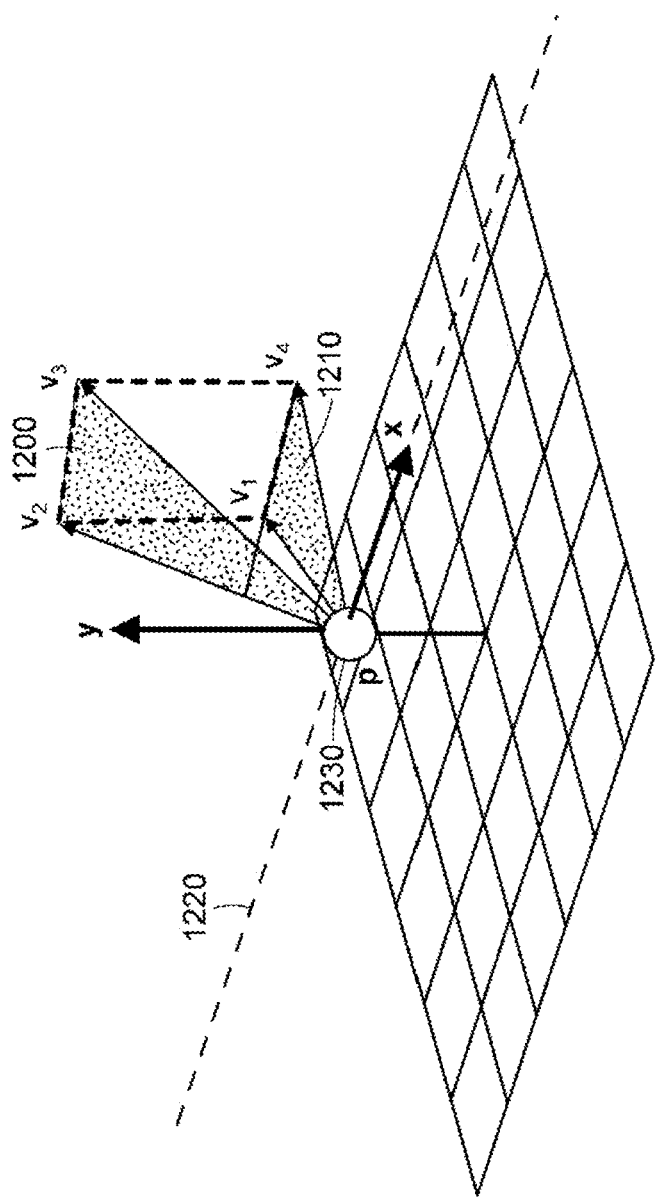
FIG. 12 illustrates computing a vanishing vector, according to an embodiment of the invention.

We now describe a 3D graphics-oriented technique to compute vanishing vectors (FIG. 12). First, from any default acquisition position, p 1230, create four points by drawing a line from p to the four corners of the perspective rectangle on the image plane, $v_1$, $v_2$, $v_3$, $v_4$. More technically, the image plane is defined as a plane that is orthogonal to the view direction from p, where p does not lie on the image plane, and the image plane lies in the half space in the viewing direction. Note that we also assume a pinhole camera is positioned at p, oriented towards the view direction, and has set intrinsics (i.e. the properties of the camera, including field of view, the center of projection). Therefore, $v_1$, $v_2$, $v_3$, $v_4$ are the corners of the perspective rectangle projected on to the image plane according to the camera intrinsics. To compute the vanishing vector x, we define two planes, one from three points p, $v_2$, $v_3$, and the other from three points p, $v_1$, $v_4$. An intersection of these two planes, 1200 and 1210, creates a line 1220 on which the vanishing vector x lies. To determine the direction on the line toward which the vanishing vector x points, we use a consistent winding order of the four points as specified by the user. The vanishing vector y may be computed similarly using planes p, $v_1$, $v_2$, and p, $v_3$, $v_4$.

In an embodiment of the invention, a corner (e.g. the fourth point) is moved via a pointing device with a click-and-drag command. As the user presses a button on the pointing device down, the fourth point is determined, and as the user drags around to determine where to place the fourth point, the vanishing vectors are computed and the edges 1-4 and 3-4 are placed such that the exactness constraint is valid.

As shown in 1045 and 1050, while moving the fourth point, a "control edge" is determined by the user. A "control edge" in this case is either edge 3-4 or 1-4. In a specific embodiment of the invention, different pointing device buttons are used to determine the control edge. Without loss of generality, if the control edge is defined as 3-4, then as the fourth point is moved using a pointing device, the control edge 3-4 is defined by drawing a line from point 3 to the current position of the pointing device. Point 4, which is on the solution curve, lies somewhere on this line. Vanishing vector y may be defined using the mentioned technique above, the two planes being p, $v_1$, $v_2$, and p, $v_3$, m, where m is the current mouse position on the image plane. To compute the orthogonal vanishing vector x, two planes are again intersected, the first plane being p, $v_2$, $v_3$, and the second plane being the dual of vector y. Each vector in 3D space has its dual: an orthogonal plane. The computed x and y are guaranteed to be orthogonal. Finally, intersecting the plane p, $v_3$, m with line defined by $v_1$+x computes the 3D position of $v_4$. Projecting the 3D point $v_4$ onto the image plane provides the exact position of point 4 while maintaining the exactness constraint.

Figure 13:
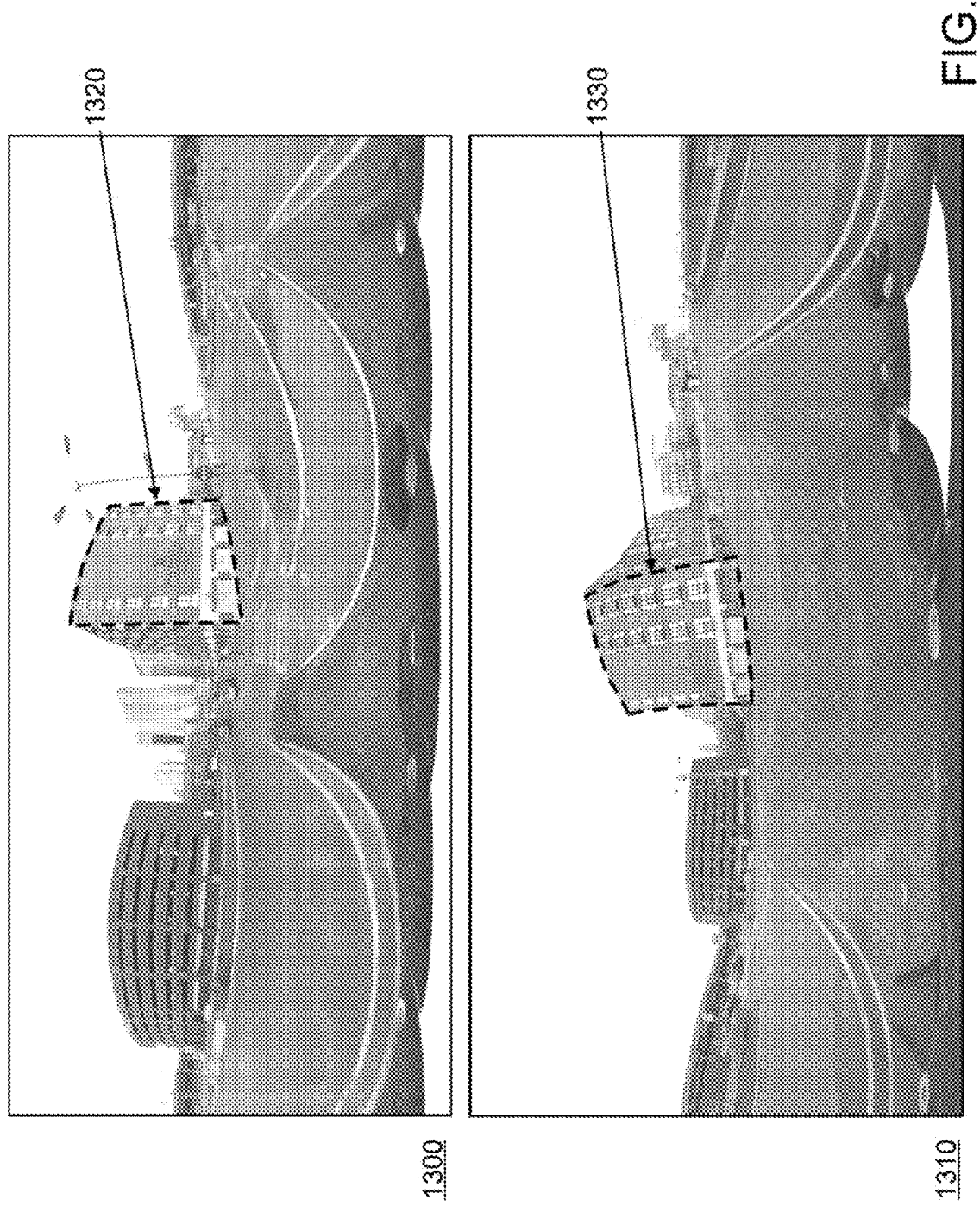
FIG. 13 shows two input source image spherical panoramas to illustrate the process for a perspective rectangle tool, according to an embodiment of the invention.

In a specific embodiment of the invention, acquisition camera pose estimation may be computed by corresponding rectangular features in a first scene and a second scene by using PRT. FIG. 13 shows the input source images, in this case two spherical panoramic images, 1300 and 1310, with the rectangular features of a building façade outlined, 1320 and 1330, respectively. In FIG. 14, the same facades 1400 and 1410 of the two input images are shown, as seen from a panorama viewer in the image plane (e.g. the straight lines are straight and are in proportion) that correspond to 1320 and 1330, respectively. The respective facades 1420 and 1430 are shown in a world plane view. Using PRT, the corresponding four corners of the feature are corresponded in matching order. PRT guarantees 1420 and 1430 to be exact rectangles.

Once corresponding features have been selected, a solution for the extrinsics of the acquisition points (camera pose) relative to each other may be computed. This solution involves maintaining the first scene static while rotating and translating the second scene, so that the rectangular feature in the second scene matches in direction, size and placement the corresponding feature in the first scene. From these operations, the relative positions and orientations of the two scenes in world space may be determined. Thus, the transformation mapping the first scene into the second scene using the rectangular features may be determined.

Figure 15:
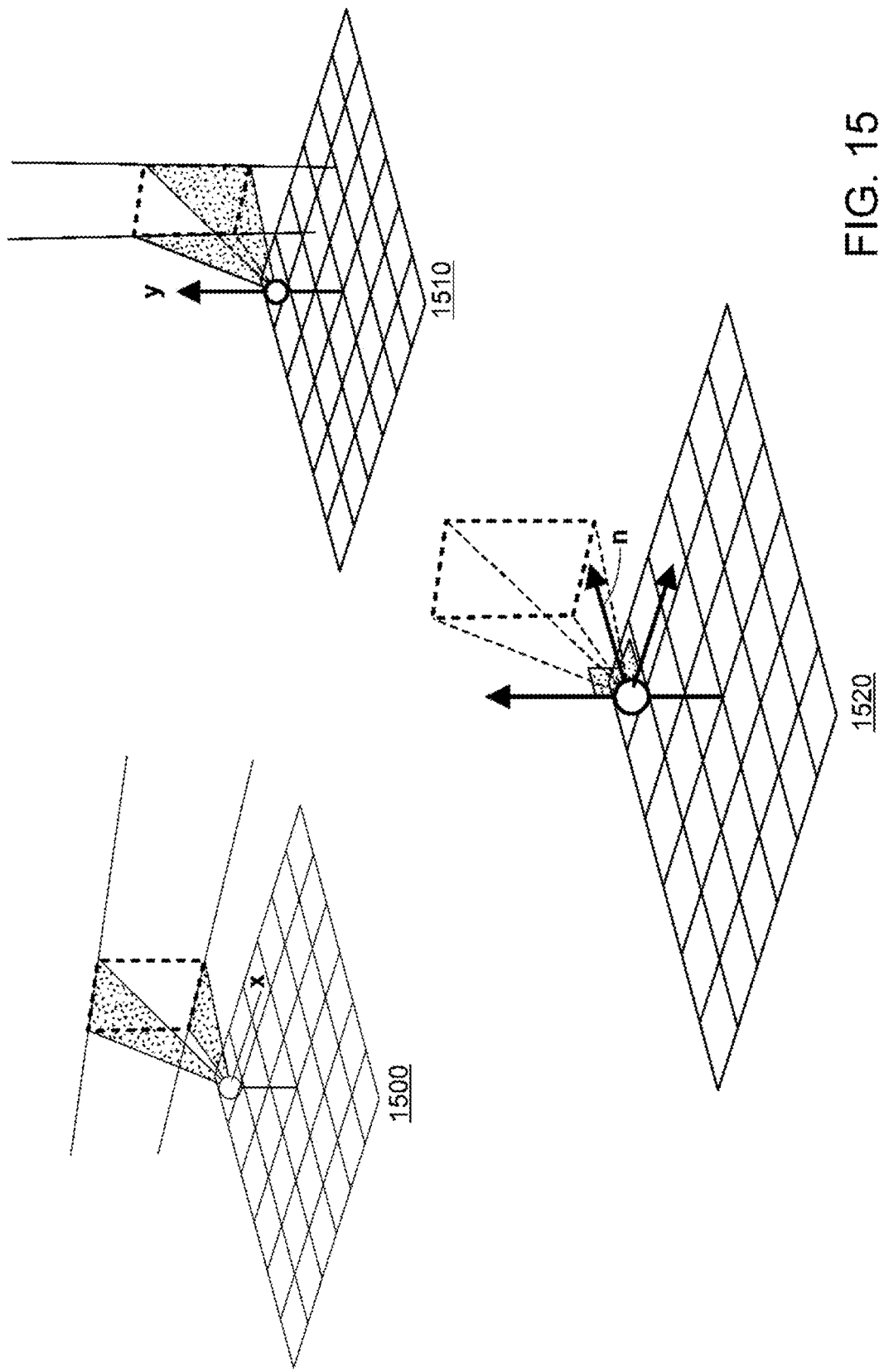
FIG. 15 illustrates computing the normal vector to a rectangle in world space prior to rotating one image to align the image to the direction of another image, for the embodiment of the invention of FIG. 13.

The rotation needed to align the second to the first scene is determined from the normals of the respective world planes. PRT defines first and second world planes from the corresponding rectangular features, and each plane has its dual, a normal. As discussed before, each rectangular feature in the world plane provides a pair of parallel lines that meet at a vanishing point (via PRT). Similarly to FIG. 12, a pair of vanishing vectors is determined from two orthogonal pair of parallel lines of the PRT. This is done for both corresponding features. As illustrated in FIG. 15, once the vanishing vectors, x and y, have been computed, 1500 and 1510, PRT guarantees orthogonality between x and y. A simple cross product computes a vector, n, which is the normal vector of the world plane. Both normal vectors are computed, the first world plane normal and the second world plane normal, respectively. With the normals of the two scenes determined, $n_1$ from the first scene's PRT feature and $n_2$ from the second scene's PRT, the second image may be rotated to align the direction of the two images by matching $n_2$ to $n_1$. By doing this rotation step, we are aligning the world planes parallel to each other.

Figure 16:
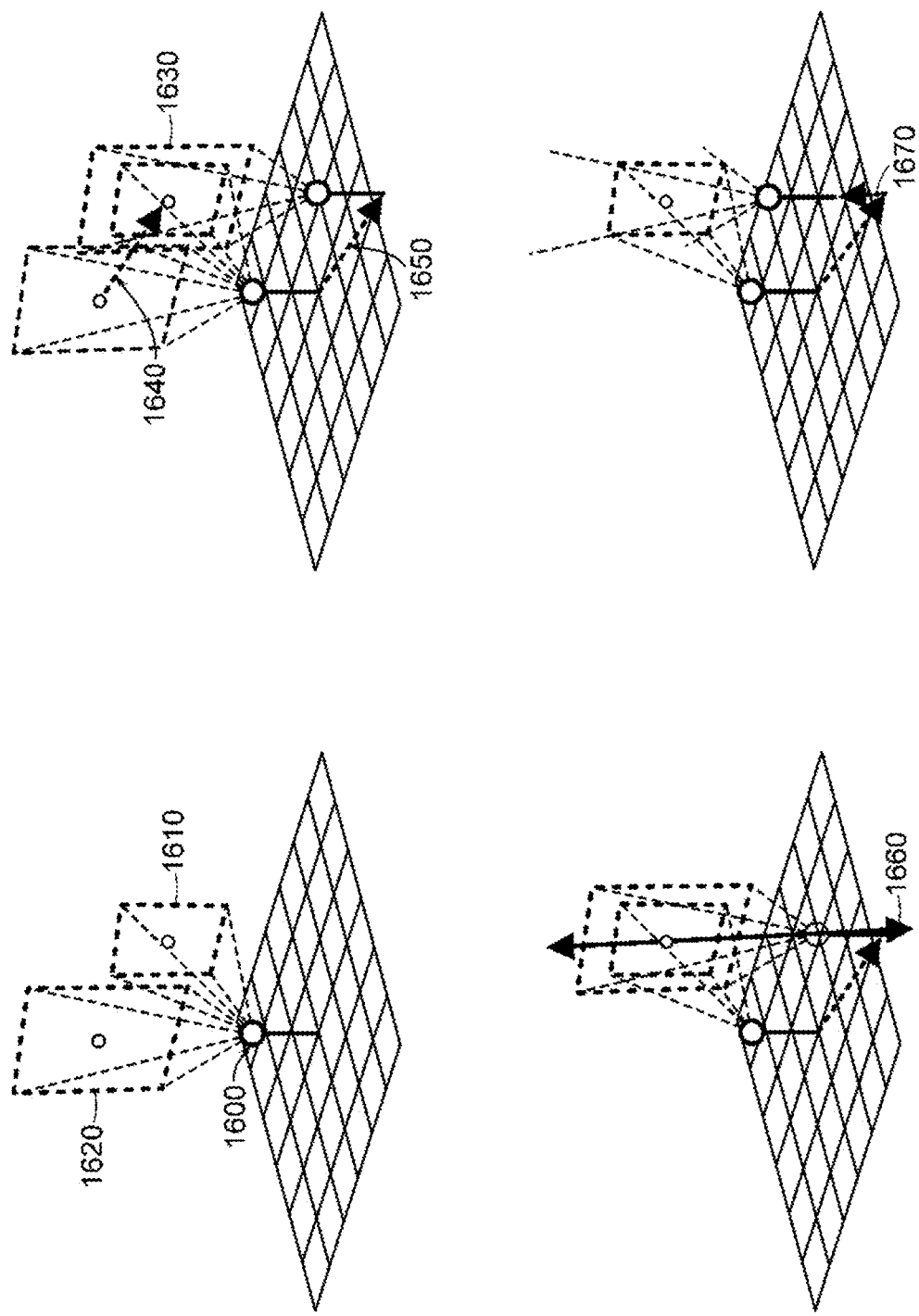
FIG. 16 shows translation of one image to complete the alignment of one image to another image in world space for the embodiment of the invention of FIG. 13.
Figure 17:
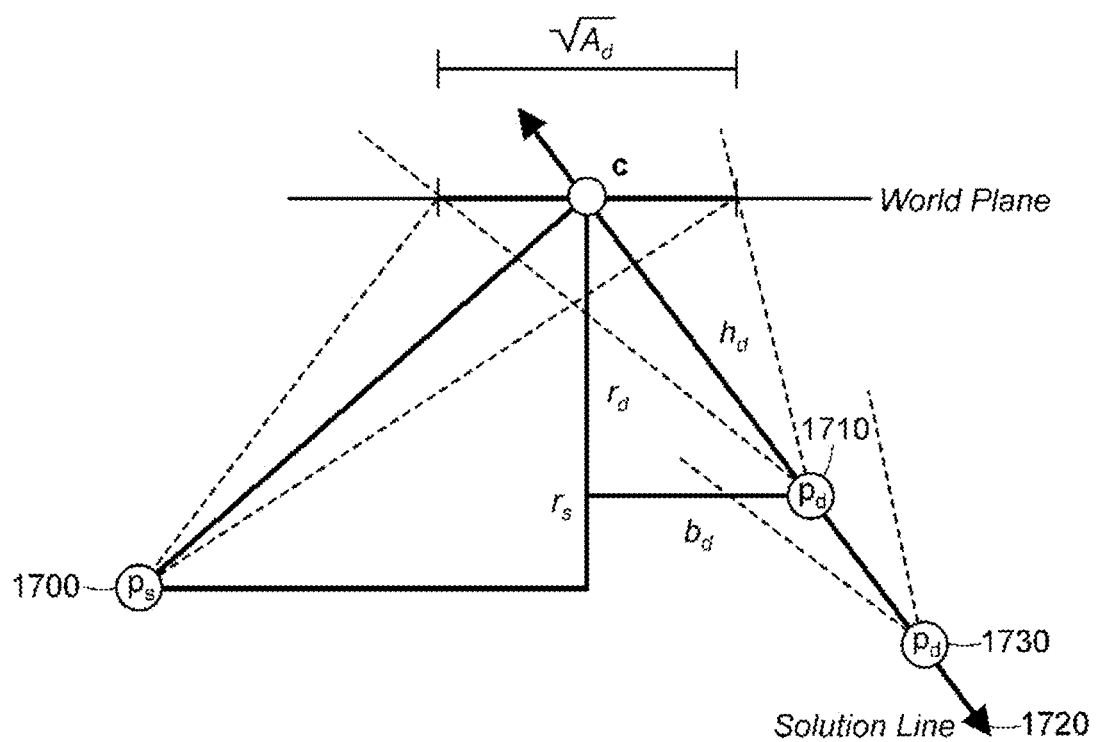
FIG. 17 illustrates the geometrical construct that determines the solution point for the translation of FIG. 16.

The translation step is a two-step process. The first step involves reducing the translation solution space to a one-dimensional problem; and the second step then computes the solution in the one-dimensional space (FIGS. 16 and 17). To do this, we first place the rotated scenes in a common coordinate system, i.e., the "world space," as shown in FIG. 16. Initially, we assume that the acquisition positions for both scenes are the same point. The rectangular features, as seen from a common viewpoint 1600, would seem to lie on the "same" plane (1610 and 1620), since their normals are the same in perspective—but the rectangles seem like to be situated at different places and have different sizes.

Next, the centroid of each PRT rectangle is computed. To compute the centroid, we first place the world planes at an arbitrary distance from the acquisition position. The four corners of the rectangle are then projected onto the plane. The four projected points, which are now specific points in 3D space, are averaged to compute the centroid. The centroid of the second PRT rectangle is then translated to match the centroid of the first PRT rectangle. As shown in FIG. 16, the rectangle that formerly was situated at 1620 is now translated to 1630. This translation, 1640, is applied also to the acquisition position of the second scene, 1650. After this step, both world planes are coplanar and share common centroids.

The line that goes through the centroid (now commonly shared point in space) to the new position of the viewpoint for the second panorama position is the one-dimensional solution space 1660. We call this the "solution line." Moving the second scene position along the solution line means the projected rectangle on the common world plane changes in size, i.e., area. The final step, a translation along the solution line, is illustrated 1670. The second translation, 1670, matches the areas of the PRT rectangles in the world plane.

The exact solution is now computed by matching the area of the rectangle of the second panorama to that of the first panorama. FIG. 17 illustrates the birds-eye view in detail of the translation 1670. The initial positions of the first scene and the second scene (right before 1670) are defined by $p_s$ 1700 and $p_d$ 1730, respectively. The first scene's position, $p_s$, remains static while $p_d$ is translated along the solution line, 1720. From the initial position $p_d$ 1730, the new position $p_d$ 1710 along the solution space, 1720, is determined such that the areas of the rectangle are the same. As $p_d$ 1730 gets closer to the centroid c, the area of the projected rectangle becomes smaller, and vice versa. Somewhere on the solution line lies the point 1710, where the areas of both projected rectangles are the same.

$$h_d = \sqrt{r_d^2 + b_d^2} \quad (1)$$

$$r_d = \frac{\sqrt{A_s}}{\sqrt{A_d}} r_s \quad (2)$$

Computing the distance $h_d$ determines the final translation position. Equation (1) shows the length of $h_d$, where it is the hypotenuse of a right triangle, and $r_d$ and $b_d$ are opposite and adjacent sides, respectively. Equation (2) shows how to compute the orthogonal distance to the normal plane $r_d$, where $A_d$ and $A_s$ are areas of the projected rectangles of second and first panoramas onto the world plane, respectively. By computing $h_d$, we are computing the distance from c to $p_d$, such that the projected areas of the first and second PRT rectangles are the same.

In another embodiment of the invention, multiple pairs of rectangles may be corresponded to further improve the alignment. This is done by using the weighted average of each solution position of the second panorama positions. There are two aspects of the user-specified rectangle to consider: the angle and the size of the user-specified rectangles. The final position of the second panorama is determined by:

$$\frac{\sum_i^k \sum_j^{s,d} (n_{i,j} \cdot v_{i,j}) A_{i,j} p_i}{\sum_i^k \sum_j^{s,d} (n_{i,j} \cdot v_{i,j}) A_{i,j}}, \quad (3)$$

where k is the number of corresponded rectangle pairs, variable j is for second panorama and first panorama rectangles, $n_{i,j}$ is the normal of the rectangle, $v_{i,j}$ is the unit view vector from the acquisition position to the center of the rectangle (in 3D space), $A_{i,j}$ is the solid angle of the projected rectangle subtended on a unit sphere, and $p_i$ is the solution position of the second panorama computed from our alignment algorithm.

More intuitively, $(n_{i,j} \cdot v_{i,j})$ considers the angle of the rectangle as seen from the acquisition position—the more grazing the angle, the less confidence that the user-specified rectangle is correct. The size of the rectangle is also considered, since with a larger relative rectangle, user errors are less likely.

In preferred embodiments of the invention, once the camera pose has been estimated, transitional objects may then be modeled. As mentioned above, transitional objects are transient objects created for simulating motion from a first scene to a second scene.

In a specific embodiment of the invention, three-dimensional geometry and projective texture mapping may be used to create transitional objects, similar to those described in U.S. patent application Ser. No. 10/780,500, entitled "Modeling and Editing Image Panoramas." In such techniques, a single merged texture map is used for each geometry, where the respective texture may be created from a blend of multiple source images. FIGS. 18-23 illustrate a sequence of steps for an embodiment of the invention, where 3D geometry is modeled and photo-textured using an extrusion tool.

Figure 22:
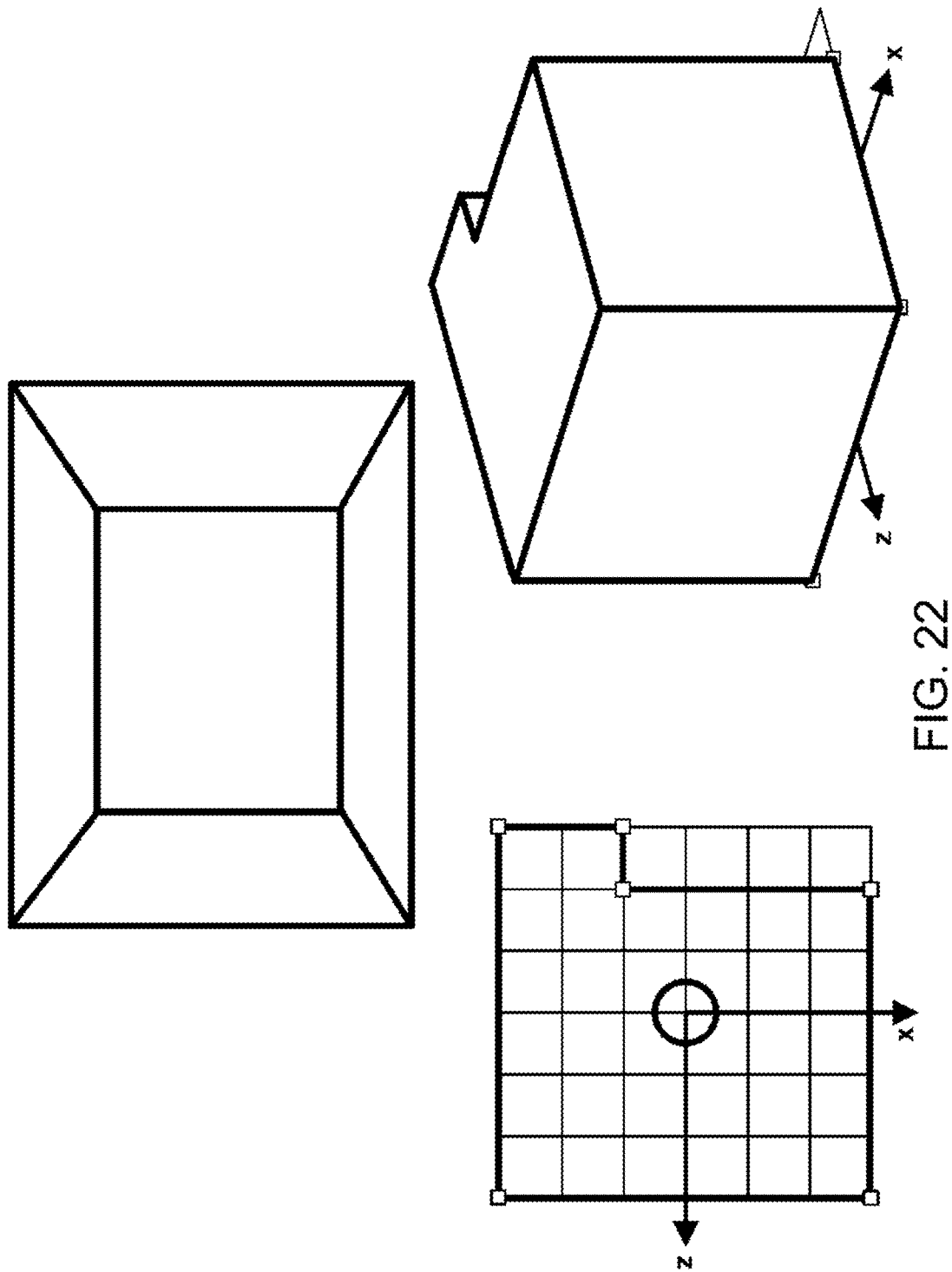
FIG. 22 shows completion of the extrusion process of FIG. 21.

In FIG. 18, three illustrations show different representations of the same scene 1800, 1810, 1820, which is an interior room. 1800 illustrates an image-plane view (i.e., the view of the scene through a panorama viewer). As shown, a pointing device is used to click and place a vertex 1830 on the bottom corner of the displayed scene. Similarly, 1810 is a top-down view in 3D space, and 1820 is the axonometric view; both of these views show the acquisition position for the scene, 1840. Both image-plane and axonometric views (1810 and 1820) also show the pointing device, 1830. (Note that the user interaction occurs once, but is shown in each representation.) In FIG. 19, as shown in the three representations 1900, the user clicks around and traces the footprint of the interior room. FIG. 20 shows a completed tracing of the footprint. The next step is the extrusion process, as shown in FIG. 21. Using the pointing device, the user extrudes (i.e., "raises") the "walls" from the footprint, until the walls meet the "ceiling" in the image-plane view (FIG. 22). Once the geometry has been created using the extrusion tool, the appropriate photo-textures may be copied and applied projectively from the source image (e.g. a panorama) to the newly created geometry. (See, for example, Mark Segal, et al. "Fast shadows and lighting effects using texture mapping". In Proceedings of SIGGRAPH 92, pages 249-252). In other embodiments of the invention, other geometry creation tools, as are known in the art, may be coupled with projective texture mapping to create photorealistic content.

In a specific embodiment of the invention, two textures may be stored for each geometry (or geometric element)—one texture from the first scene, and the other texture from the second scene. During the transition from the first scene to the second scene, these textures may also transition—i.e., alpha blending (i.e. transparency), morphing, motion blurring, and other types of image processing may be applied to the scenes, according to transitional parameters. (Transitional parameters are discussed in detail below.)

Figure 23:
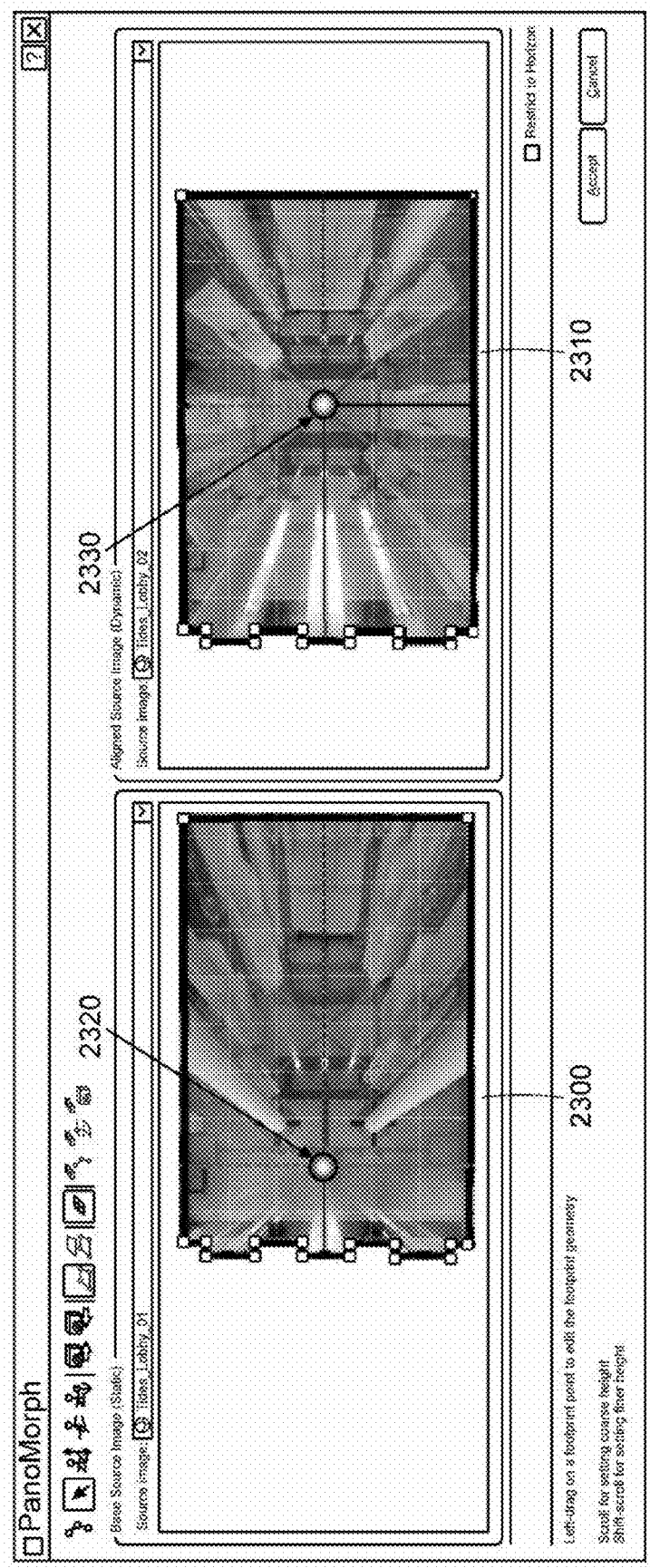
FIGS. 23-25 illustrate the process for a transitional object creation tool, according to an embodiment of the invention.
Figure 24:
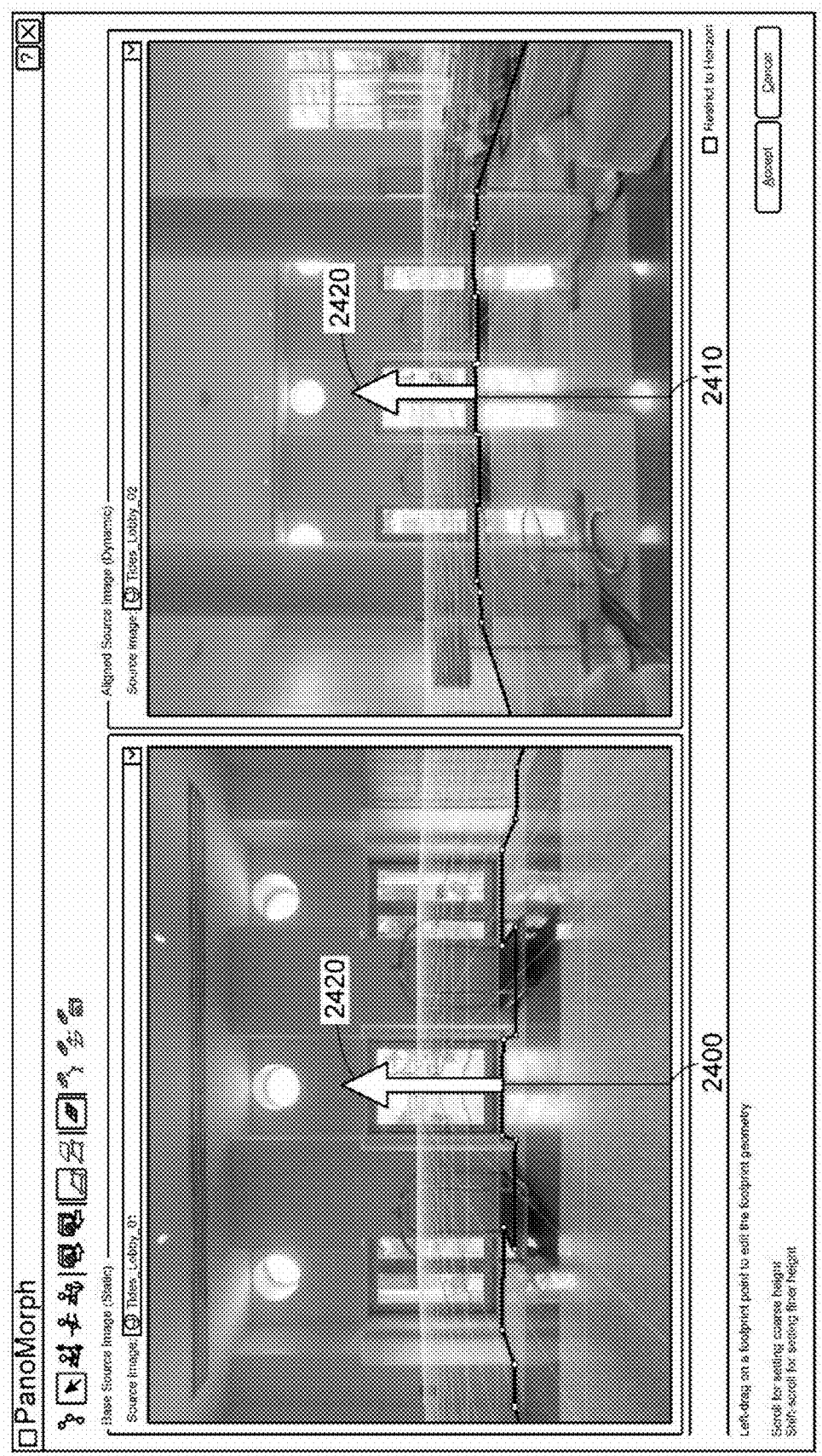
Figure 25:

FIGS. 23-25 show a transitional object creation tool for a specific embodiment of the invention. In FIG. 23, a first scene 2300, and a second scene 2310, which are room interiors, are shown with acquisition positions of the two scenes 2320, 2330. The footprint of the interior of both first and second scenes (2300 and 2310, respectively) are modeled as shown in FIG. 23, according to the extrusion process described above in connection with FIGS. 18-22. These scenes are for two viewpoints of the same world space. Pose estimation may be accomplished, as described above or according to another technique, as is known in the art. The user can point to on either side of the display window to trace the geometry of the transitional objects. Note that the photo-texture on each footprint as seen from a top-down view is naturally "stretched" from the acquisition position, since projective texture mapping is employed.

Figure 26:
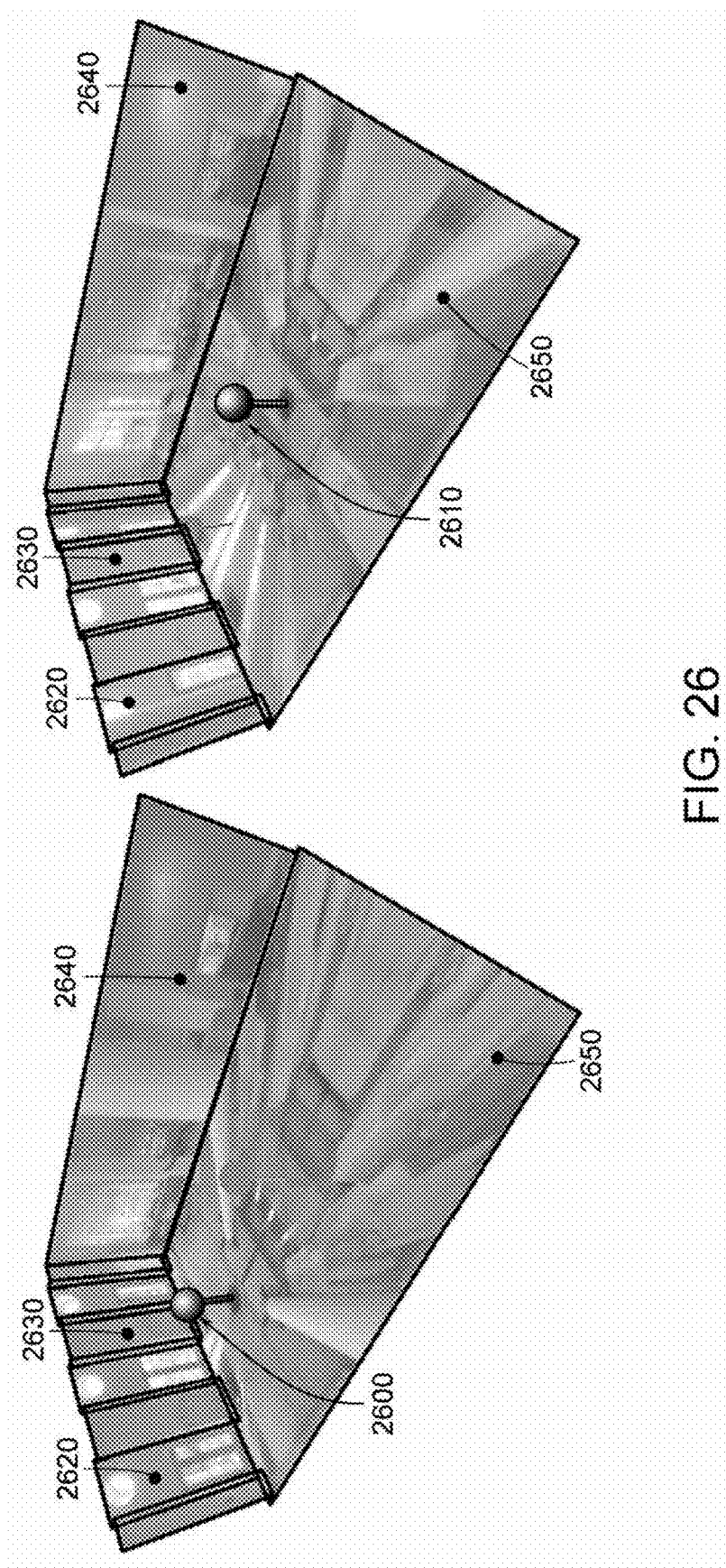
FIG. 26 is a third person's view of the output of the transitional object creation process of FIGS. 23-25.

FIG. 24 shows the two scenes as seen from the acquisition positions. Both scenes are viewed in a similar direction, i.e., toward the entrance doors of the room, and the traced footprint is visible in both scenes 2400, 2410. The extrusion direction 2420 is shown by the arrow, where the walls are extruded from the footprint. It is, again, important to note that the modeling may be done simultaneously for both scenes—the walls, floor and ceilings that are extruded may be automatically corresponded between the first and the second scene, as shown in FIG. 25. FIG. 25 shows several examples of automatic transitional object correspondences 2520, 2530, and 2540. FIG. 26 shows the two scenes from a third-person's viewpoint, which is now possible with the created geometry overlaid with projective texture maps from each scene. FIG. 26 includes the familiar "lollipop" icons 2600, 2610 that signify the acquisition positions relative to the created geometry, and the corresponding transitional objects 2620, 2630, 2640, 2650 are also shown.

The transitional object modeling tool may also be used for non-planar geometries. Various 3D primitives, such as cubes, spheres, cylinders, may also be modeled. Also, triangle meshes and analytical geometric descriptions may also be modeled coupled with projective texture mapping. Furthermore, transitional objects that do not have corresponding views may also be modeled (as is described below). Oftentimes, due to the complexity of scenes, each feature may not be visible in both scenes. In this case, the geometry may still be modeled, but there may only be a single texture, either from the first scene or from the second scene.

Figure 27:
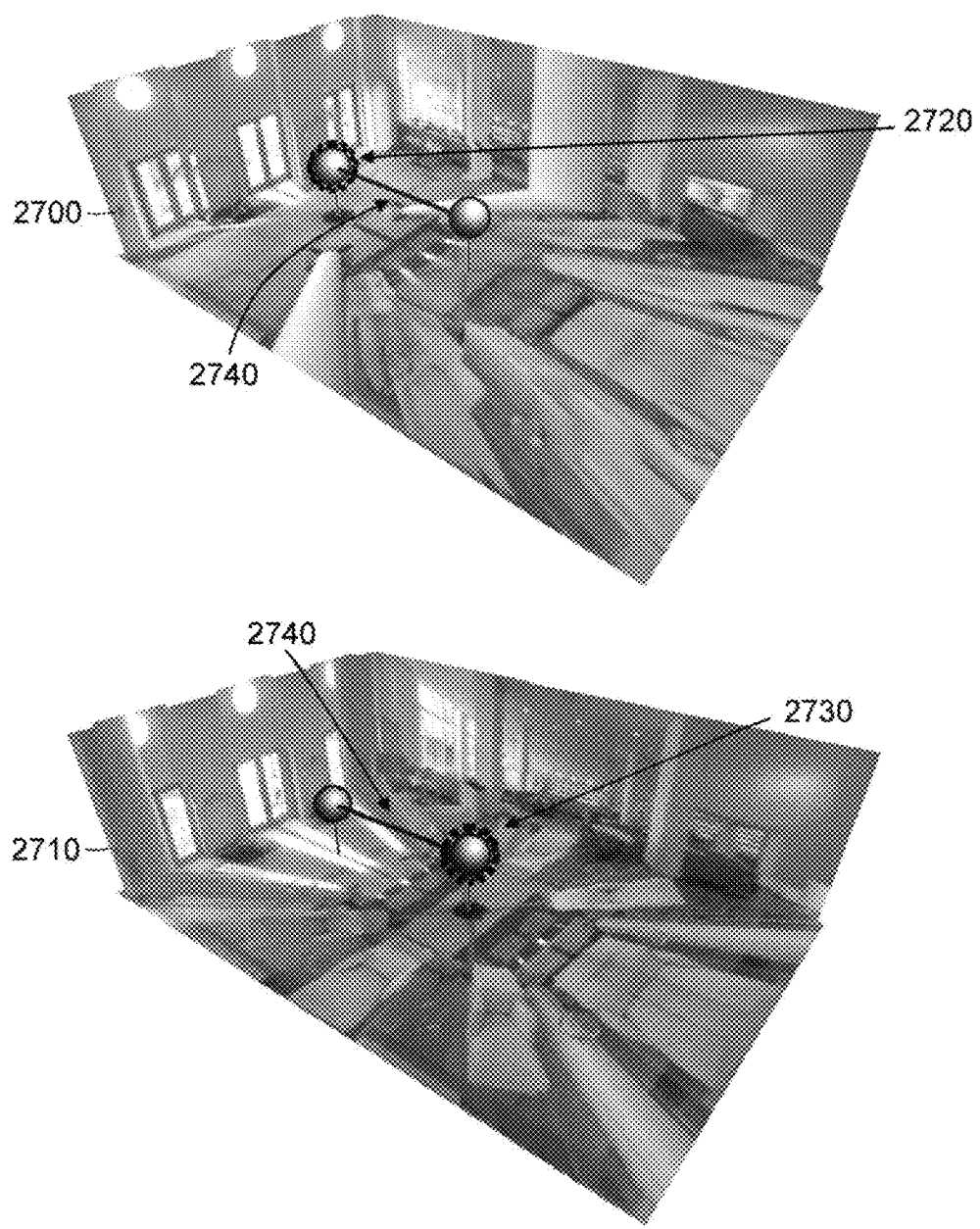
FIG. 27 illustrates modeling a transition from a first scene to a second scene using a virtual camera, according to an embodiment of the invention.

In a preferred embodiment of the invention, the transition from the first to the second scene is modeled using a "virtual camera." As shown in FIG. 27, once the relative camera pose has been computed, and the transitional objects created, we can now transition from the first scene 2700 to the second scene 2710. Note that although the geometry is the same in this case, the projective textures are different—2700 is the scene as seen from the first scene 2720, and 2710 is the scene as seen from the second scene 2730. The virtual camera path 2740 is linear by default. However, the camera path can be any curve, as described below.

Figure 28:
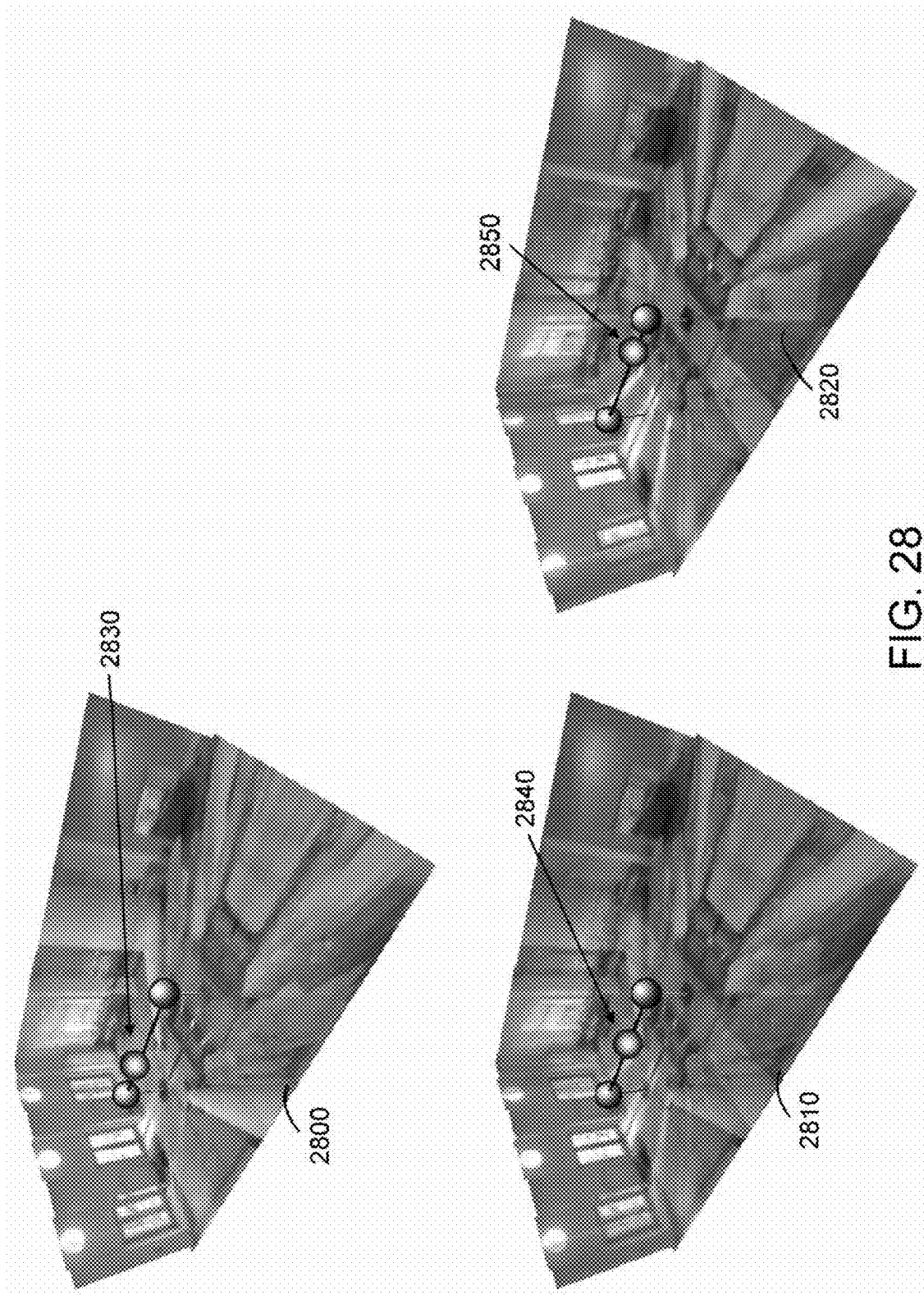
FIG. 28 shows point along the camera path, for the embodiment of FIG. 27.
Figure 29:
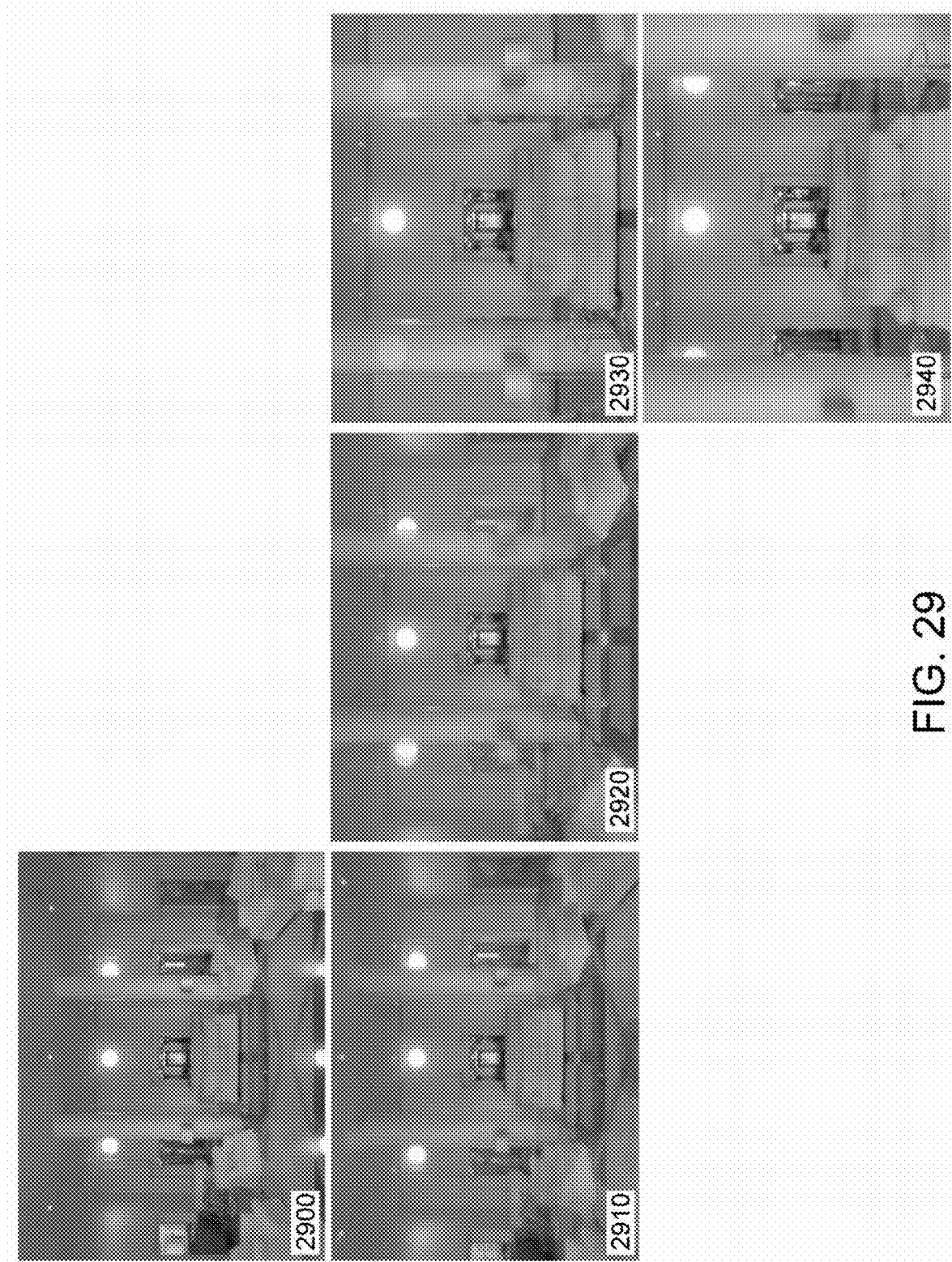
FIG. 29 shows the view at point along the path of FIG. 28.

FIG. 28 shows the points along the virtual camera's path as a transition is made from the first scene to the second scene (2830, 2840, 2850). Alpha blending the first and second scenes is used to illustrate the progression of transitional objects according to a transitional parameter, the degree of alpha-blending. When the virtual camera is 25% down the path (2800), the alpha blending transitional parameter is set at 75% from the first scene and 25% from the second scene. In 2810, the parameter is set at 50%-50%; and in 2820, the parameter is set 25%-75%. As will be discussed below, transitional parameters change as the virtual camera transitions from the first scene from the second scene. Thus, the transitional scenes displayed during the transition change accordingly. FIG. 29 shows the point of view from the virtual camera. 2900 corresponds to the virtual camera at the first scene, 2910 is 25% down the path, 2920 is 50% down the path, 2930 is 75% down the path, and 2940 corresponds to the virtual camera at the second scene.

Figure 30:
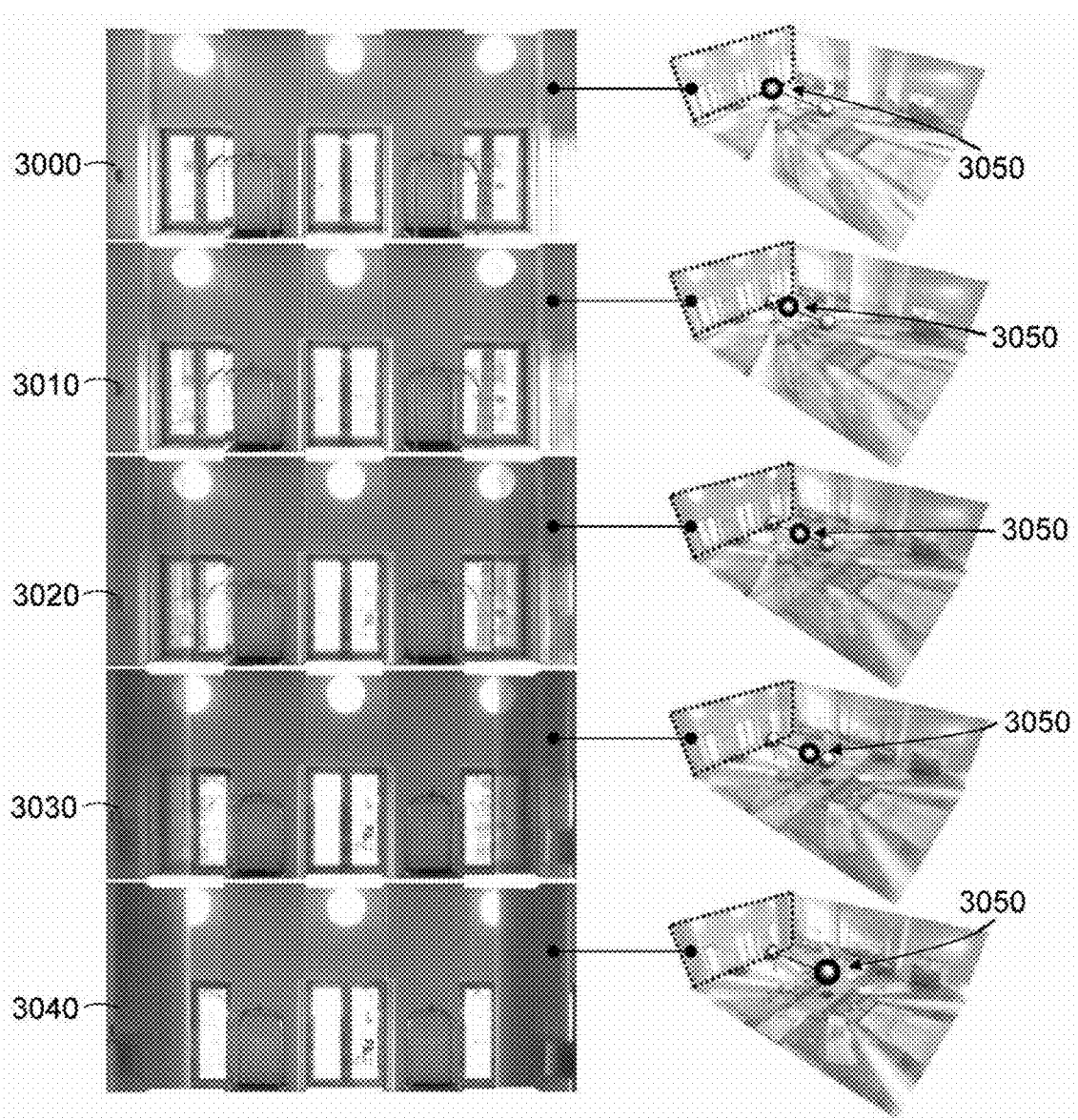
FIG. 30 shows a different transition sequence with different transitional objects for the room shown in FIGS. 27-29, according to an embodiment of the invention.

FIG. 30 shows the transition sequence for a different transitional object. 3000, 3010, 3020, 3030, 3040 are sequences corresponding to a wall geometry and textures that are behind the viewpoint of FIG. 29. The transitions of transitional objects occur regardless of where the direction in which the virtual camera is pointed. This means that the virtual camera can be looking in any direction (even behind) as it transitions along the path. Furthermore, the next set of transitions that may happen could be from the second scene back to the first scene, in which case, much of the existing transitional objects may be reused.

In a specific embodiment of the invention, a user interface provides for interactive editing of transitional parameters.

Figure 31:
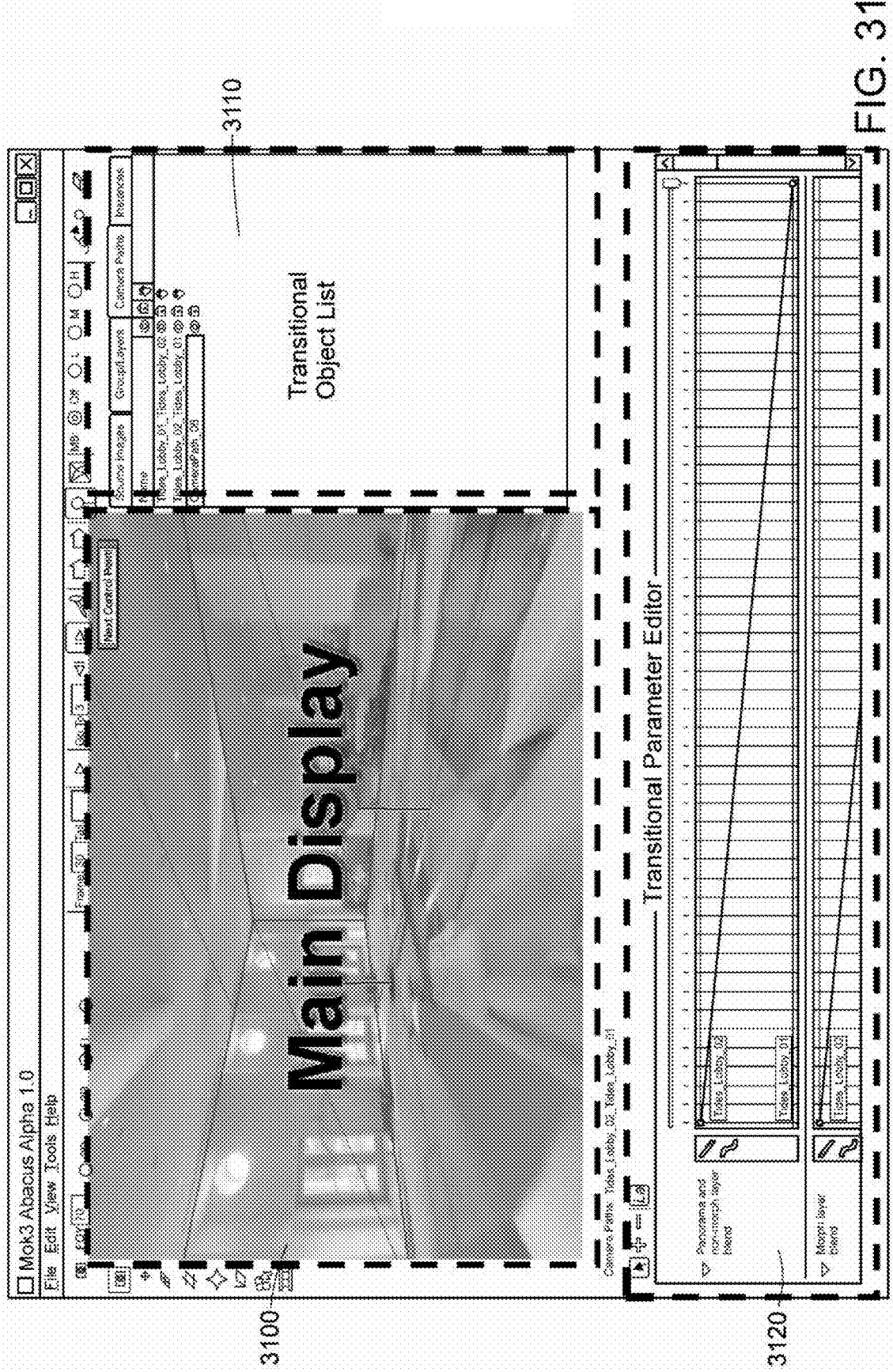
FIG. 31 shows an exemplary user interface for a transitional parameter editor according to an embodiment of the invention.

FIG. 31 shows the layout of an illustrative transitional parameter editor ("TPE"), according to an embodiment of the invention. 3100 shows the main display, which is an interactive panorama viewer in this instance, and a transitional object display list 3110. The user can navigate the 3D environment that contains the transitional objects interactively in a WYSIWYG fashion ("what you see is what you get"). The transitional object list displays the created transitional objects, and may be used for toggling selection, visibility, and other parameters. The bottom window pane 3120 shows transitional parameter graphs. These graphs show the parameter value at any point along a path for the virtual camera.

Figure 32:
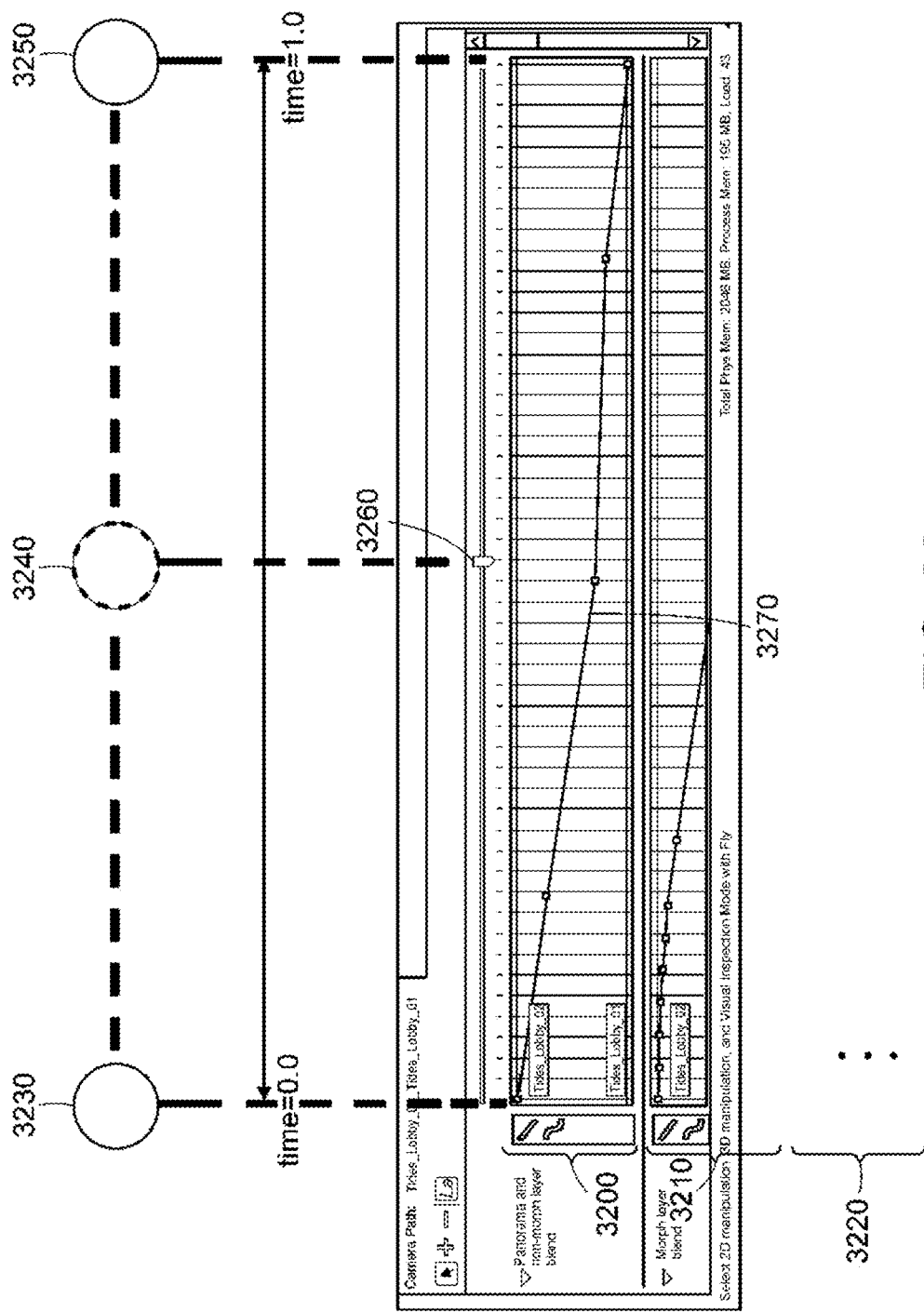
FIG. 32 shows a close-up view the transitional parameter editor of FIG. 31.
Figure 33:
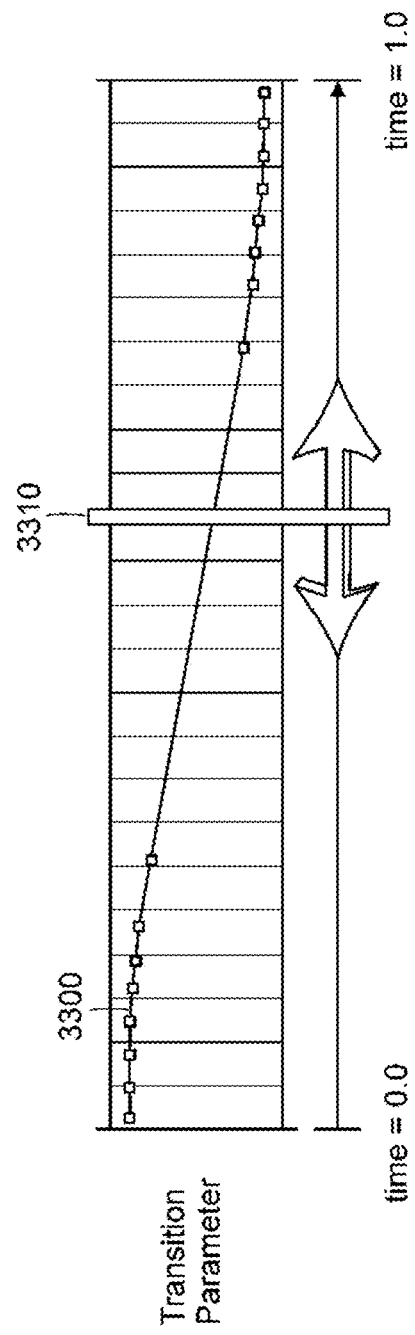
FIG. 33 illustrates moving the time point in the timeline for the transitional parameter editor of FIG. 31.

FIG. 32 shows a close up view of a TPE screen. As shown, transitional parameters are represented by 2D graphs 3200, 3210, and 3220. These parameters may correspond to alpha-blending, motion blurring, color saturation, morphing, etc. The horizontal axis is the time, where "time=0.0" represents the start time and "time=1.0" is the end time, during which the virtual camera moves along the predefined path from the first scene 3230 to the second scene 3250. The range may be a normalized range and the user can separately change the speed and acceleration of the camera at various points on the path. The vertical axis for each transitional parameter depends on the parameter. For instance, for alpha blending, the vertical axis ranges also from [0.0, 1.0], where 1.0 is when the transitional objects from the first scene are completely opaque and the transitional objects from the second scene are completely transparent, and 0.0 is the inverse. The graphical user interface is provided for the user to interactively and graphically adjust each parameter using a 2D curve 3270. The timeline slider, as shown on the vertical bar 3260, can be interactively dragged left or right to preview the transitional image that is displayed on the main display 3100. These "transitional images" rendered on the main display reflect what the virtual camera would see and how the transitional parameters affect the transition (again, WYSIWYG). FIG. 33 shows a close-up of a generic transitional parameter graph. The timeline slider 3310 that may be interactively dragged left or right, respectively moving forward or backward in time, is shown. The 2D curve 3300 on the transitional parameter graph specifies the value of the transitional parameter at a given time in the virtual camera's flight along a path. Vertices may be added, deleted and modified to change a transitional parameter at a given time.

Figure 34:
FIG. 34 shows the effects of motion blurring and saturation adjustment transitional parameters on a scene view, according to an embodiment of the invention.

In specific embodiments of the invention, transitional parameters may include: alpha blending, motion blurring, morphing, saturation change, camera speed, and camera XY-offset factors. Other transitional parameters may be defined as desired. In general, any type of image processing filter or algorithm for both 2D and 3D may be applied to the transitional images, and transitional parameters may be entered to control the filters or algorithms as a function of time (or position) along the path. FIG. 34 shows some effects of two transitional parameters: motion blurring and saturation adjustment. By applying a combination of transitional parameters, including alpha blending, motion blurring, morphing, etc., over time, a visually convincing simulation of movement between two scenes (images or panoramas) can be provided.

An intermediate image (or images) taken between two scenes (images or panoramas) may be used as a further source image in conjunction with these alpha blending, motion blurring, morphing, etc. techniques to improve the appearance of a transition between a first scene and a second scene. For example, on the path between a first panorama and a second panorama, there may be several ordinary images (i.e., images that are not necessarily panoramic) available. These images can be used as intermediate points for the alpha blending, motion blurring, morphing, etc., to create an even more visually convincing transition between the two panoramas.

Figure 35:
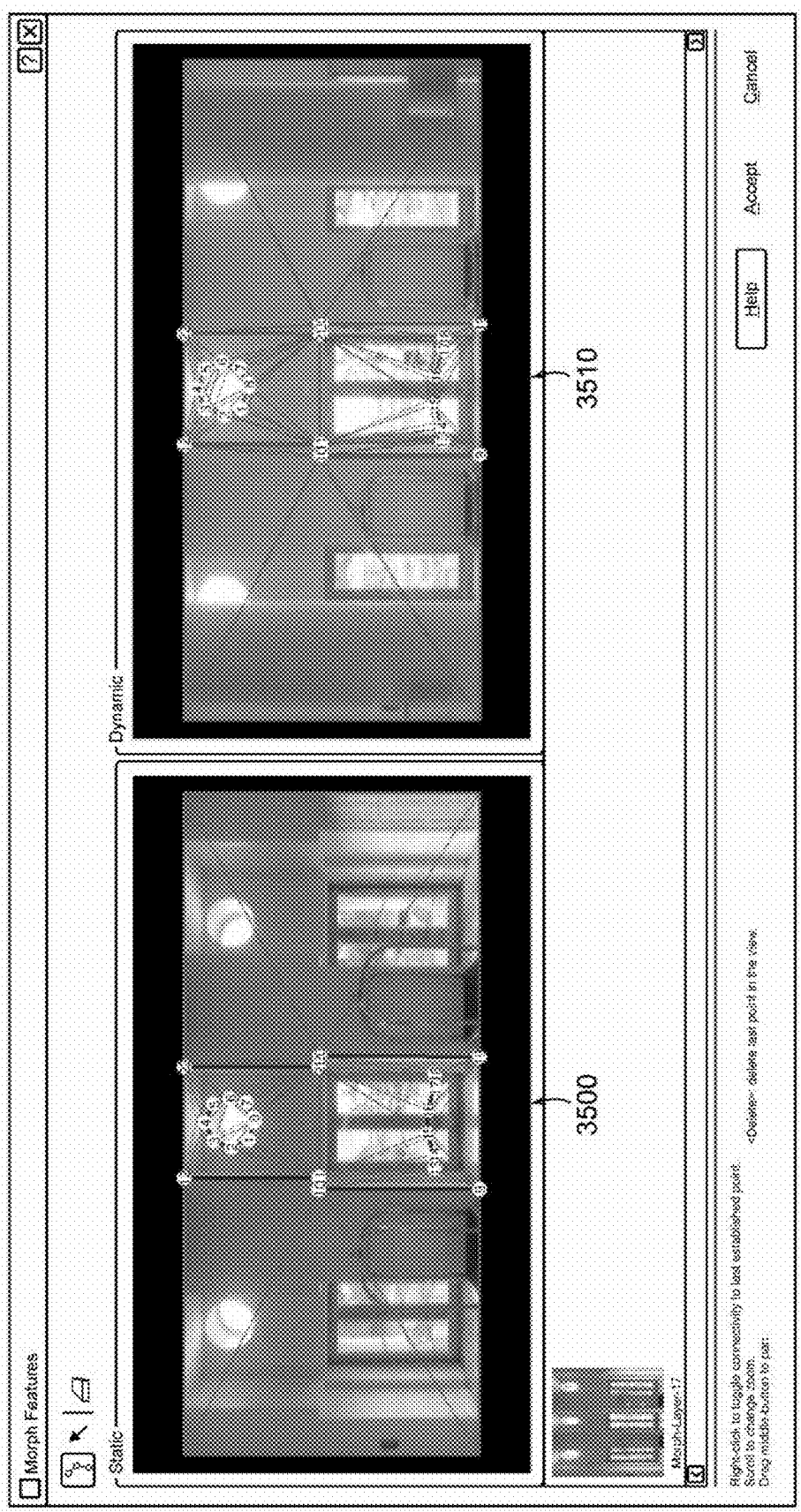
FIGS. 35-37 illustrate the morphing transitional parameter according to an embodiment of the invention.
Figure 36:
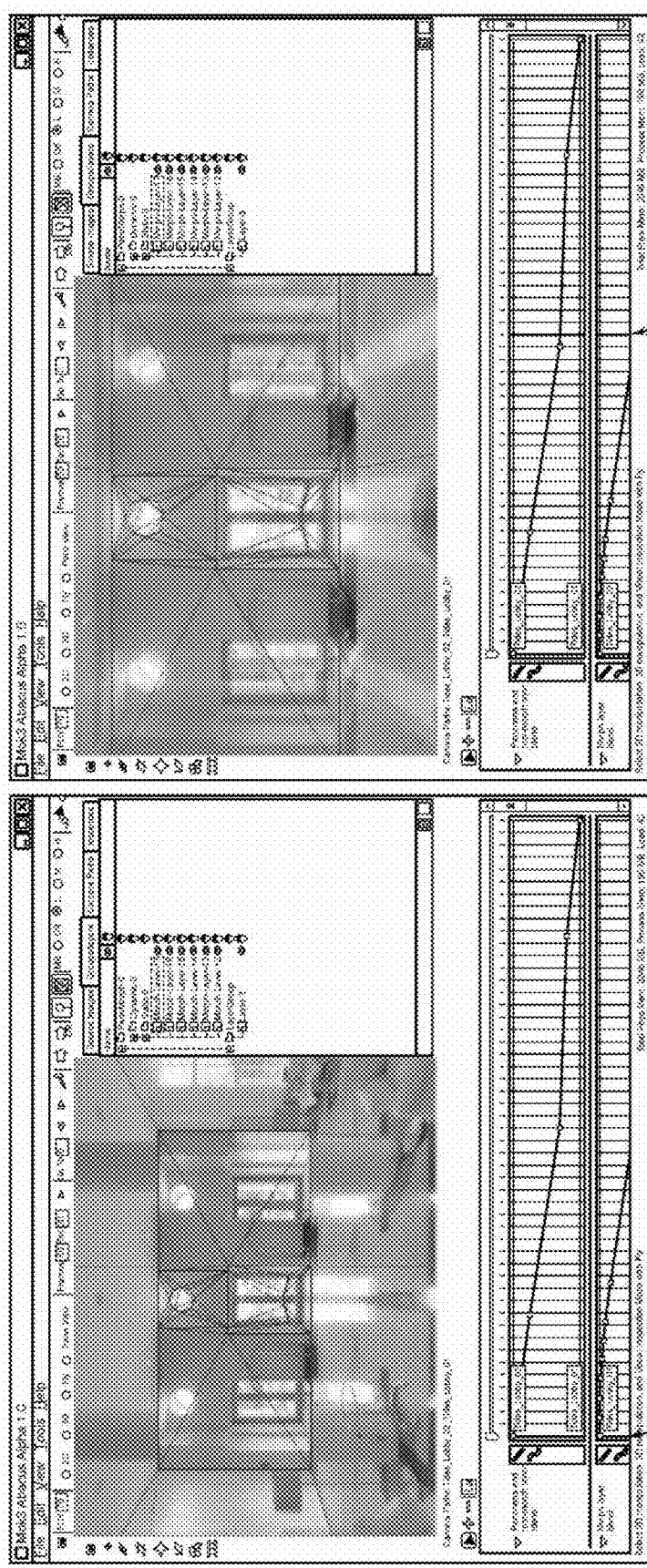
Figure 37:
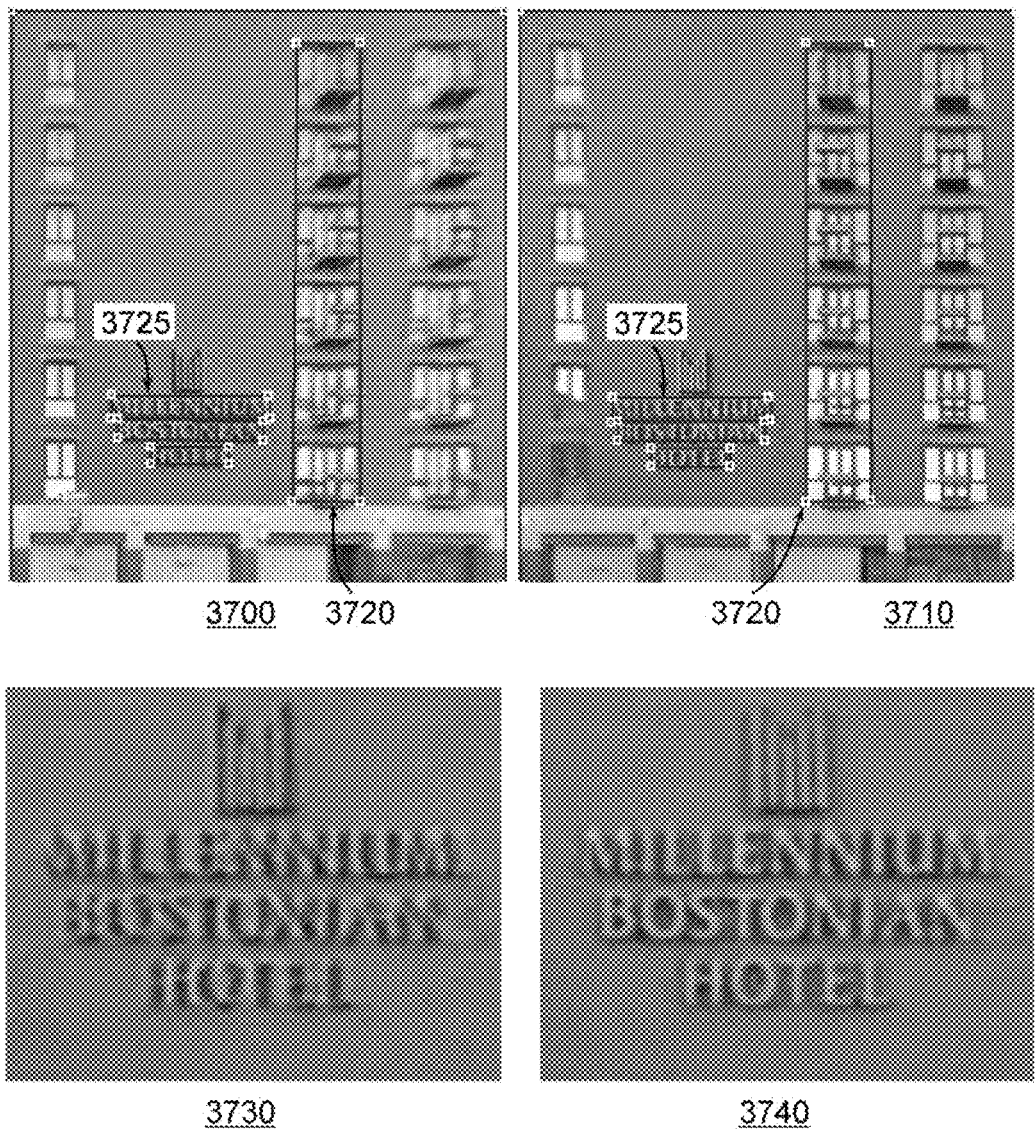

Morphing for a transitional object requires additional feature correspondences as compared to other techniques, such as alpha-blending, motion blurring, etc. FIG. 35, illustrates the features of a transitional object where morphing is employed, according to an embodiment of the invention. For each pair of projective texture maps that have been defined from creating the transitional object, the user can apply corresponding features. FIG. 35 shows the corresponding transitional object 3500, 3510 as seen from the first scene (left) and the second scene (right). The user can interactively point to the image to correspond features using points, lines, polylines, loops, etc, and the texture and geometry are then triangulated according to the additional features. (See, for example, Thaddeus Beier and Shawn Neely, "Feature-based Image Metamorphosis," In *Proceedings of SIGGRAPH* 1992, pages 35-42) Using the TPE's 2D graph for the morph transitional parameter, the user can then control the speed at which the morphing occurs from the first scene to the second scene interactively (both forward and backward in time). FIG. 36 shows two instances of a morphing transitional object and its triangulated geometry according to the user-specified morph features. 3600 shows the initial time step (the timeline slider at time=0.0), and 3610 shows when time=0.5. As the timeline slider is moved or automatically played, the morphing gradually occurs from the first scene to the second scene, transitioning both the texture as well as the corresponding geometry (in this case, a triangle mesh). FIG. 37 shows an example where morphing may be useful to minimize visual artifacts in the transition from the first scene to the second scene. 3730 shows a close-up of a transitional object when displayed without morph features— there are "ghosting" affects that make the text illegible. The ghosting artifact may arise, for example, from errors in pose estimation or in feature correspondence. Morphing can substantially fix many of the ghosting issues. 3700 and 3710 show rectified building façade textures from the first scene and the second scene, respectively; 3720 and 3725 are some morph corresponding features; and image 3740 shows the hotel name transitional object without the ghosting artifacts.

Examples of inter-scene transitions created with embodiments of the present invention are shown below for a variety of scene types. These examples show the importance of transitional parameters to alleviate the necessity of precision in pose estimation for traditional vision and computer graphics problems.

Figure 38:
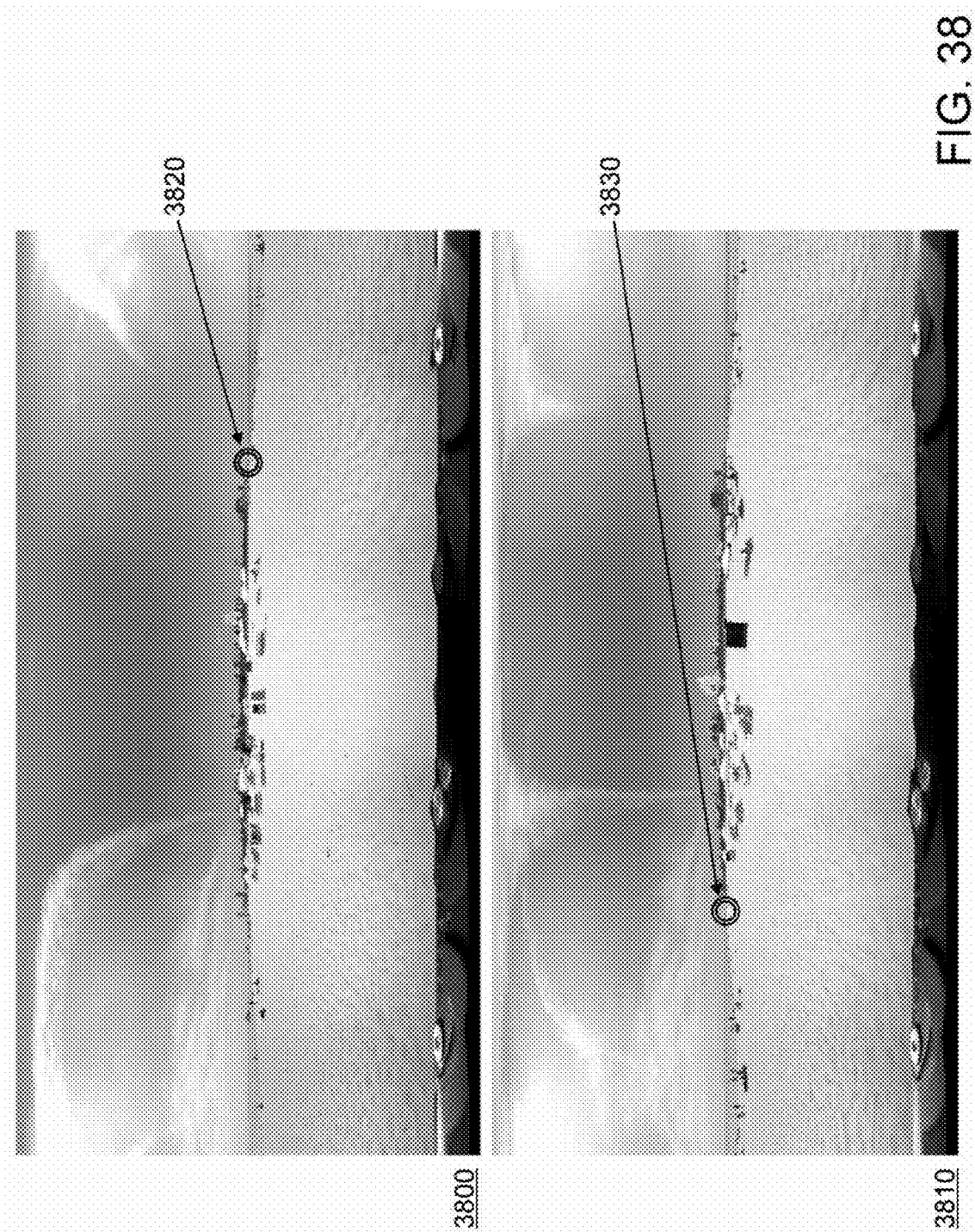

FIGS. 38-39 show a long-distance transition, where the first and second scenes do not share obvious features. FIG. 38 shows the two panoramas, as the first scene 3800, and as the second scene 3810. 3820 points to the position of the second scene panorama as shown in the first scene panorama; and 3830 points to the position of the first panorama as seen in the second scene panorama. As shown, although large features, such as buildings in the background, are visible, the actual pedestrian-scaled objects around both scenes are not visible from each other. FIG. 39 shows a sequence of frames (i.e., "transitional images") as the virtual camera moves from the first scene to the second scene (3900, 3910, 3920, 3930, 3940, and 3950). Circles in each frame signify the position of the second scene. To estimate the pose (camera extrinsics), the large features, such as the buildings were used. Although the resulting pose estimation computation did not guarantee high precision, a credible transition was still modeled. Applying various amounts of 3D motion blurring also helped minimize visual artifacts.

Figure 40:
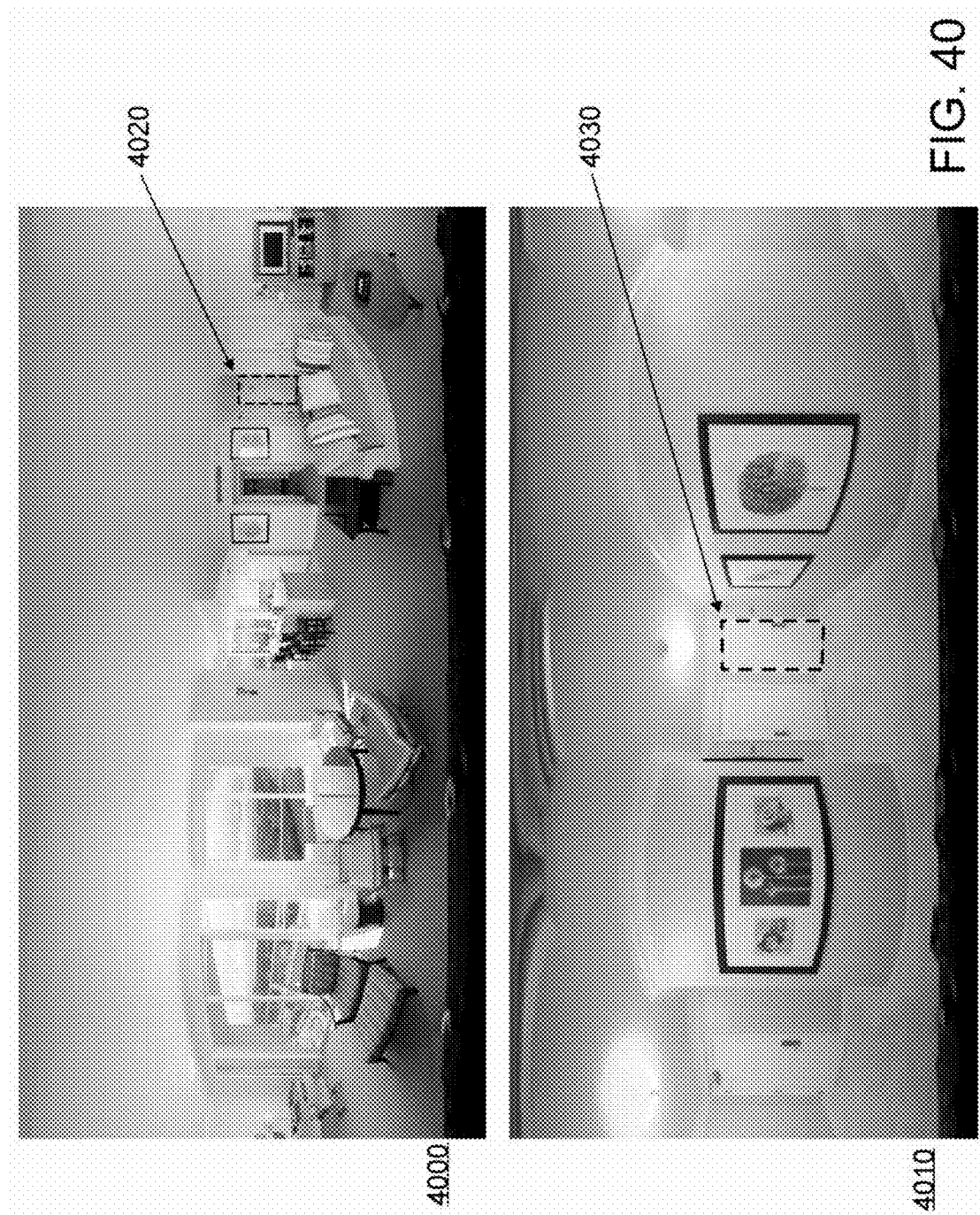
Figure 41:
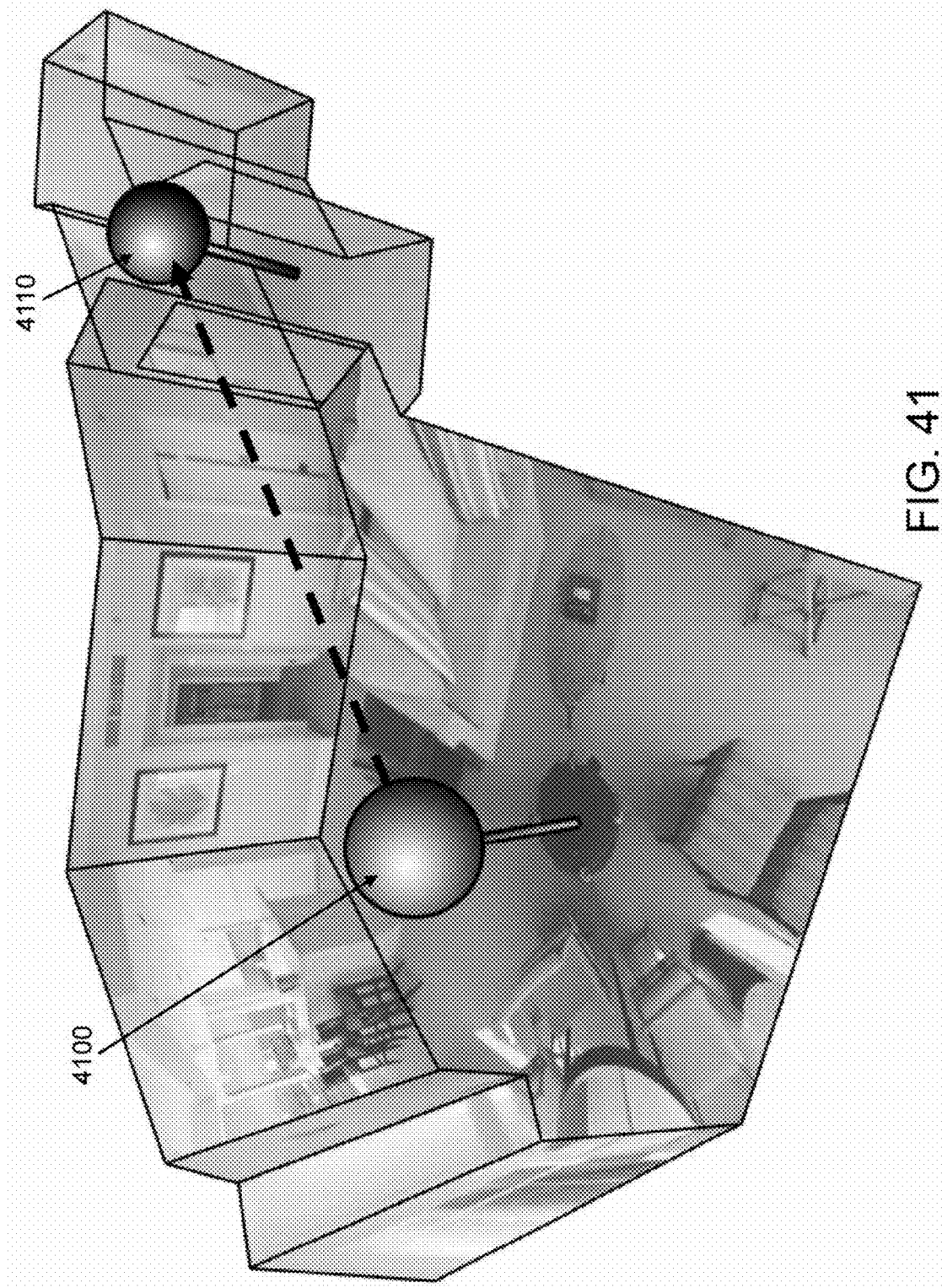

The next example is of two scenes that do not have exact features to correspond. FIG. 40 shows the first and second scene panoramas, 4000 and 4010. 4020 and 4030 shows a closed doorway through which the virtual camera will pass during the transition, i.e., the first and second scenes are on opposite sides of the door. For this example, the door was used as an approximate feature to correspond between the first scene and the second scene. FIG. 41 shows the 3D transitional objects that have been created and the first scene and second scene acquisition positions, 4100 and 4110 respectively. FIG. 42 shows the sequence of transitional images, 4200, 4210, 4220, and 4230. As shown, a smooth transition is created. The artist who created this transition also made the doorway transparent as the virtual camera passed through. Even with mirroring features (the door) used for estimating the pose, and none of the transitional objects having correspondences, the TPE's unique graphical interface enabled the artist to use the timeline slider and transitional parameter values to convincingly create this transition.

Figure 43:
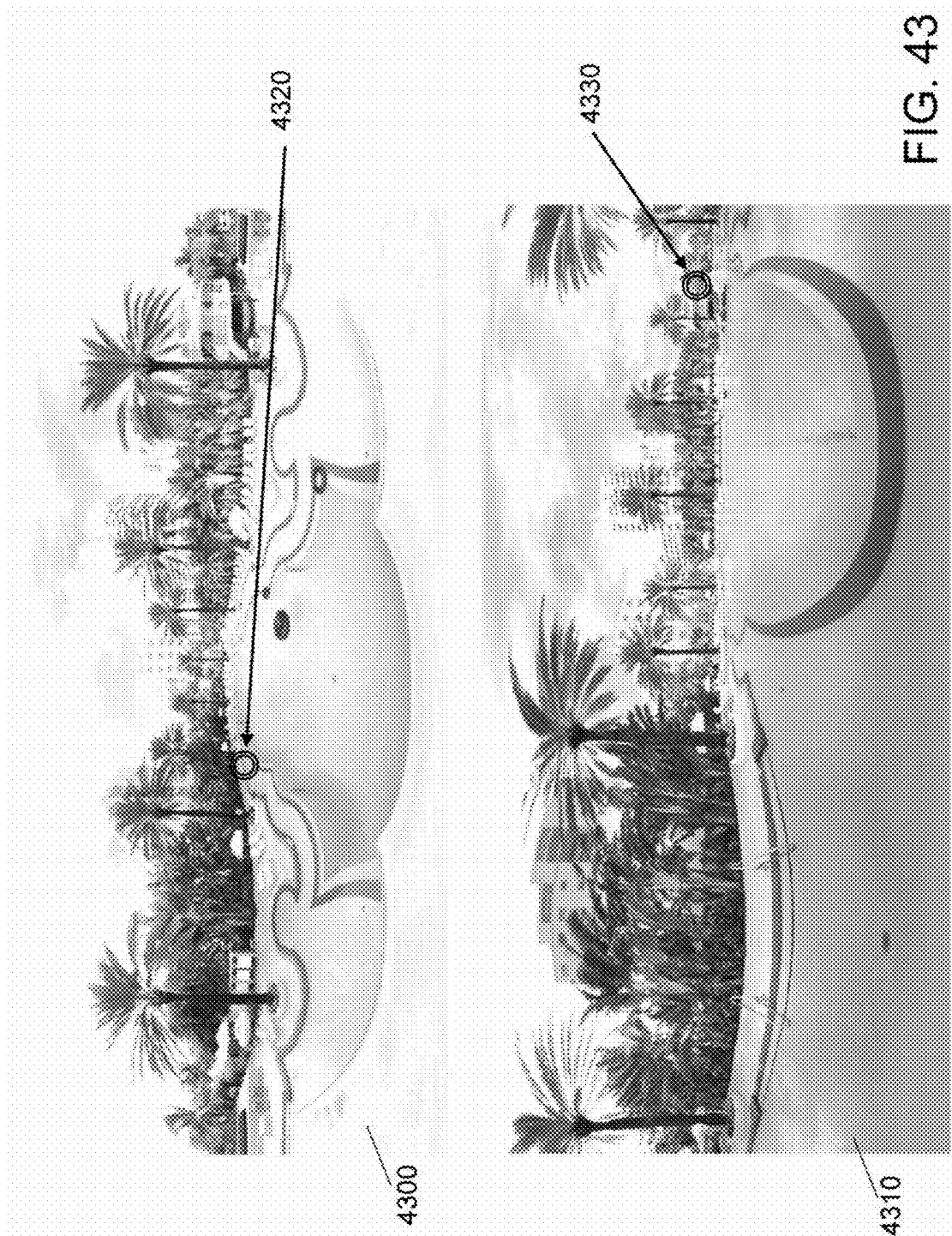

The final example is shown in FIGS. 43 and 44. The first scene 4300 has its acquisition point 4320 as shown and the second scene 4310 has its acquisition point 4330 as shown. In this example, there were almost no rectangular features for PRT correspondence, but the artist was able to adequately approximate the positions, as shown in 4420 as a bird's eye view of the transitional objects. With adequate transitional parameter adjustment, smooth and believable motion between scenes was created.

In embodiments of the invention, once the inter-scene motion has been created, the scenes may be populated with artificial entities that interact with the user—called "active elements." Typically, active elements are activated through a pointing device. Other methods of active element activation are described below.

Figure 45:
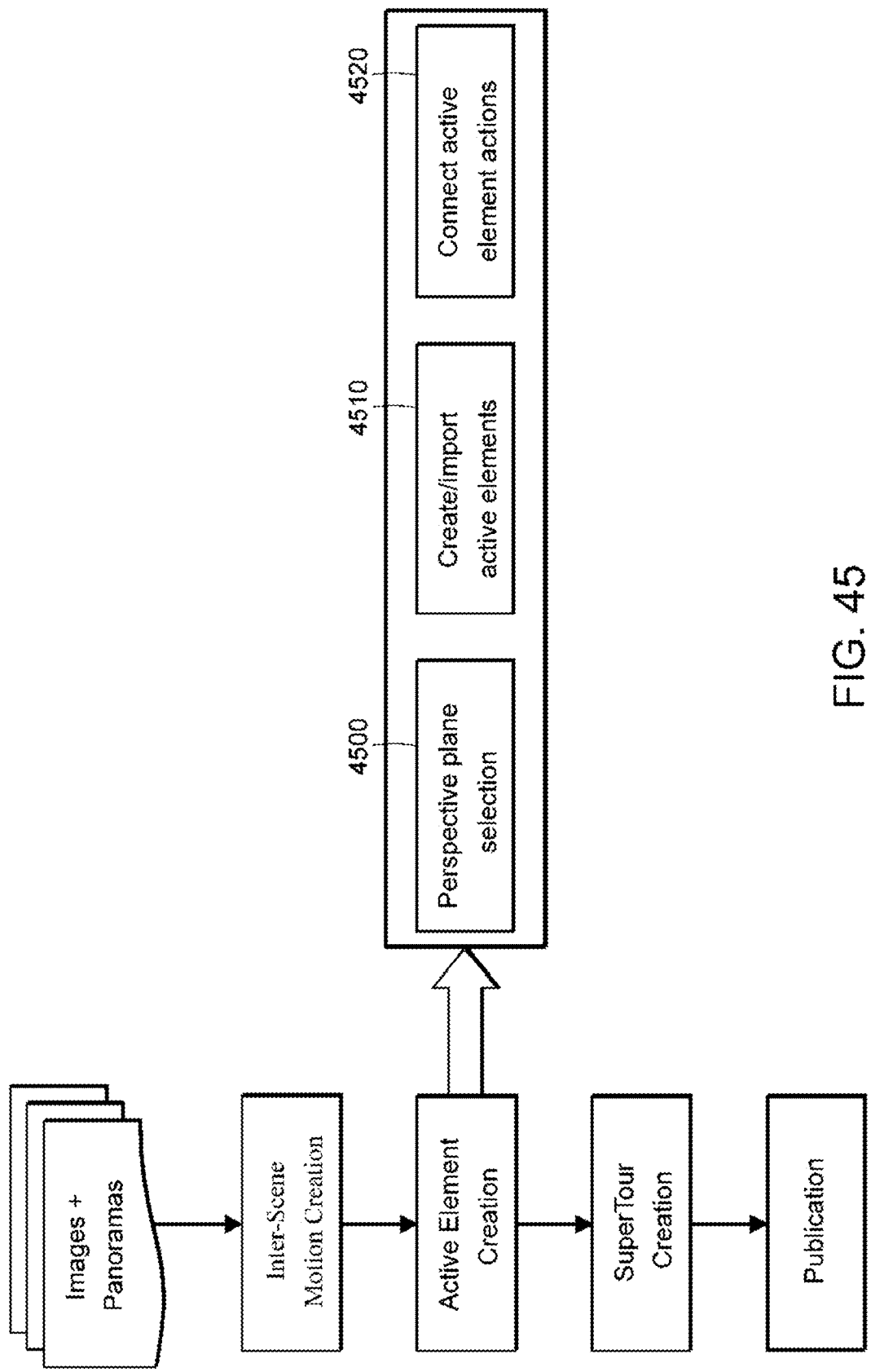
FIG. 45 shows an overview flow diagram for a method of creating active elements, according to an embodiment of the invention.

As shown in FIG. 45, there are three components to active element creation: perspective plane selection 4500, creating and/or importing active elements 4510, and connecting the active elements to their behavior when activated 4520.

Figure 46:
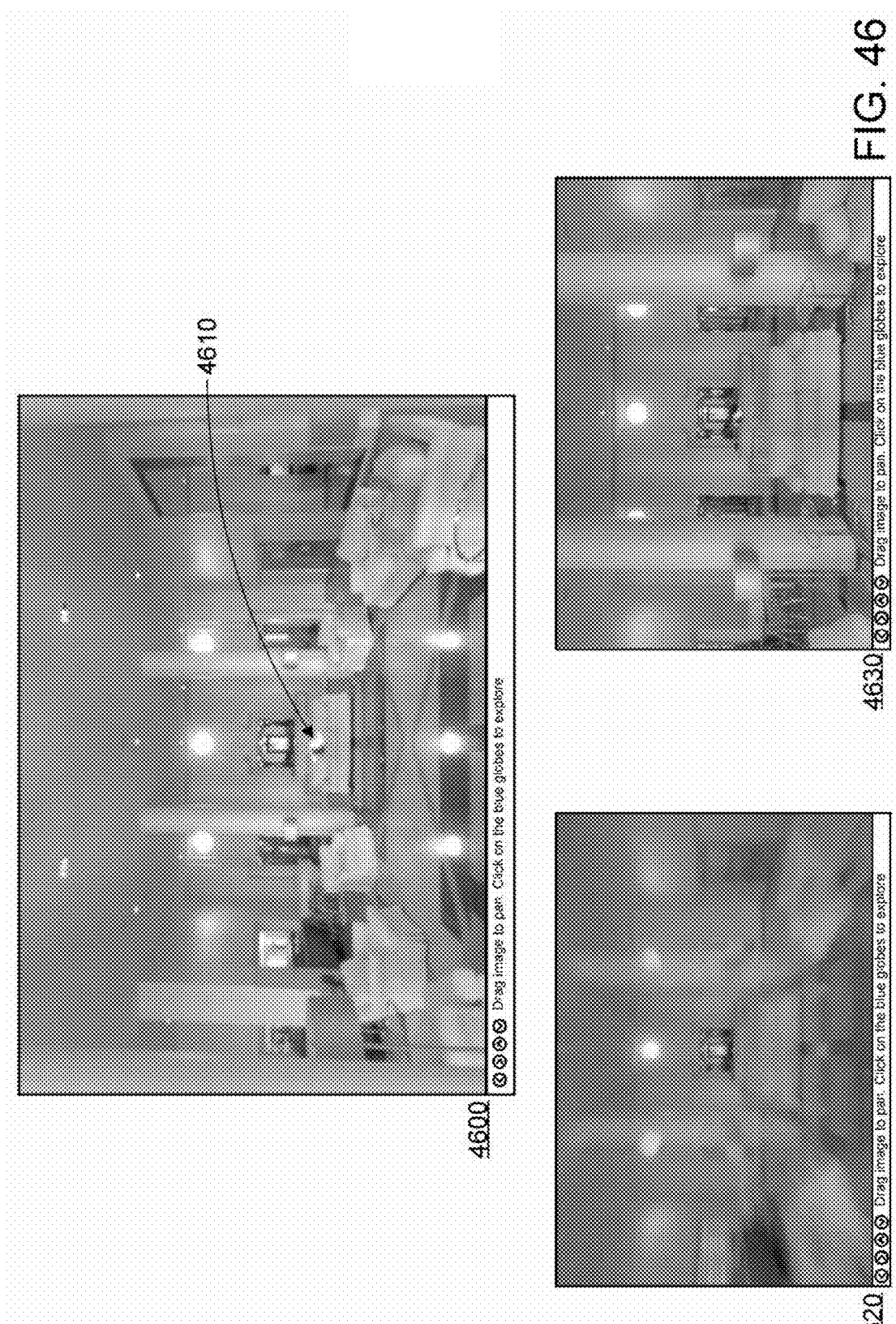
FIG. 46 shows a navigational icon active element, according to an embodiment of the invention.

One of the most important active elements is called a "navigational icon." A navigational icon activates motion within scenes, such as from a first scene to a second scene. As shown in FIG. 46, the viewer 4600 shows one form of navigational icon 4610. In this embodiment of the invention, the navigational icon is purposely colorful (although not visible in the black and white image) and small, so that the icon is visible but does not obstruct the visibility of the scene. Also, in a specific embodiment of the invention, as the user pans around the panorama, the navigational icon remains "sticky" to the environment, and therefore, pans along with the environment. As shown in 4620 and 4630, once the navigational icon is activated, the action enabled is the motion between the first scene and the second scene.

Navigational icons can play an important role in viewing scenes, enabling the user to visually understand that once a navigational icon is activated, inter-scene motion is triggered. This consistency in "visual language" is an important concept, especially in virtual environments. Furthermore, the navigational icon now enables a complex network of inter-scene motions, not only between two scenes in a one-directional way, but potentially among thousands of scenes interconnected multiply-directionally. An example of such a "supertour" at a city-scaled inter-scene connection is shown below.

Figure 47:
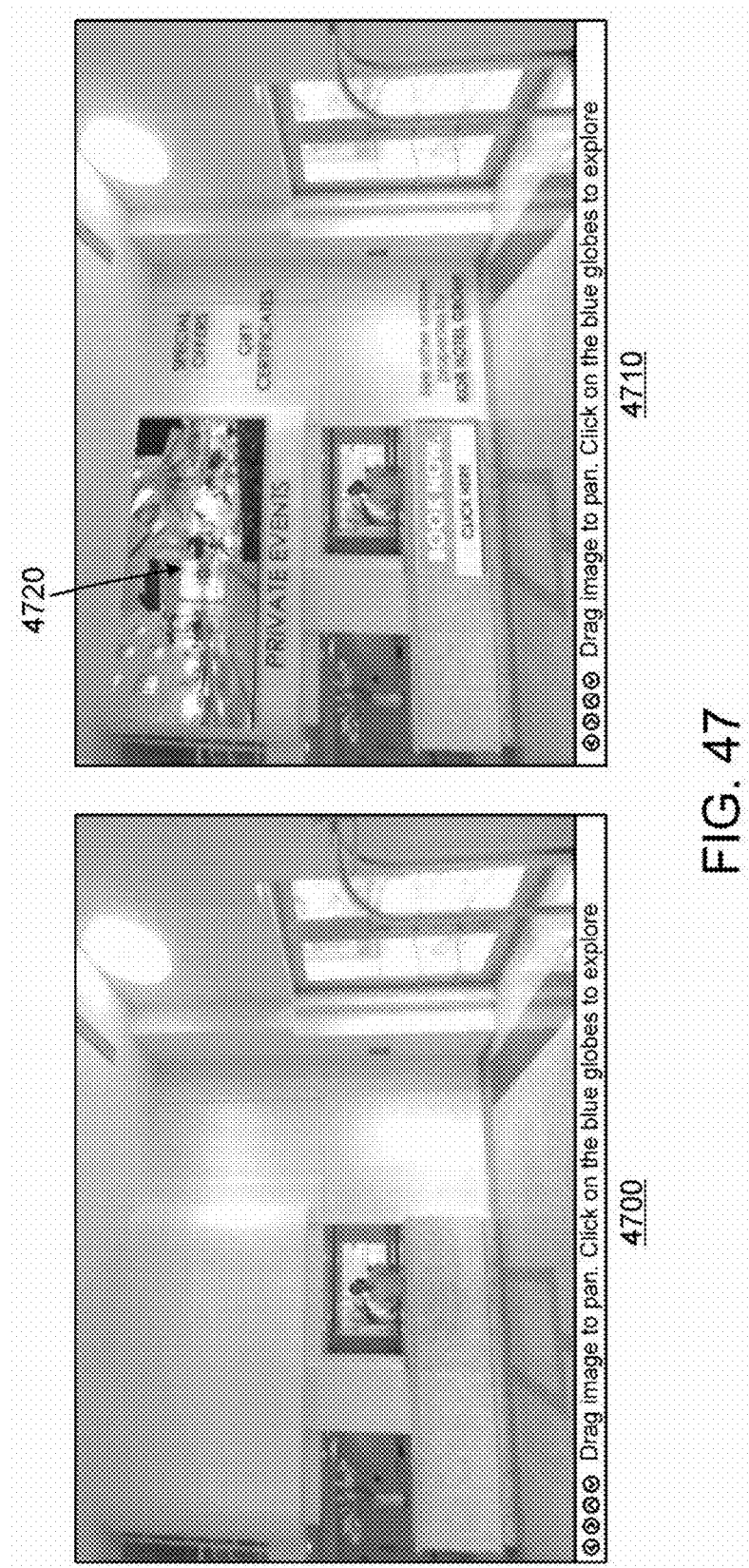
FIG. 47 shows an example of active elements embedded into scenes, according to an embodiment of the invention.

FIG. 47 shows an example of other types of active elements embedded into scenes. 4700 shows the "before", and 4710 shows the "after." In a specific embodiment of the invention, these active elements may be activated via a pointing device triggering web sites to appear with appropriate and related information. For instance, clicking on 4720, which is a "private events" advertisement above a hotel's reception area, will open up the hotel's website that contains private-event related information. Other active elements can be embedded in a "natural" manner. As the user pans around a scene panorama, these embedded active elements can also remain "sticky" to the environment.

Figure 48:
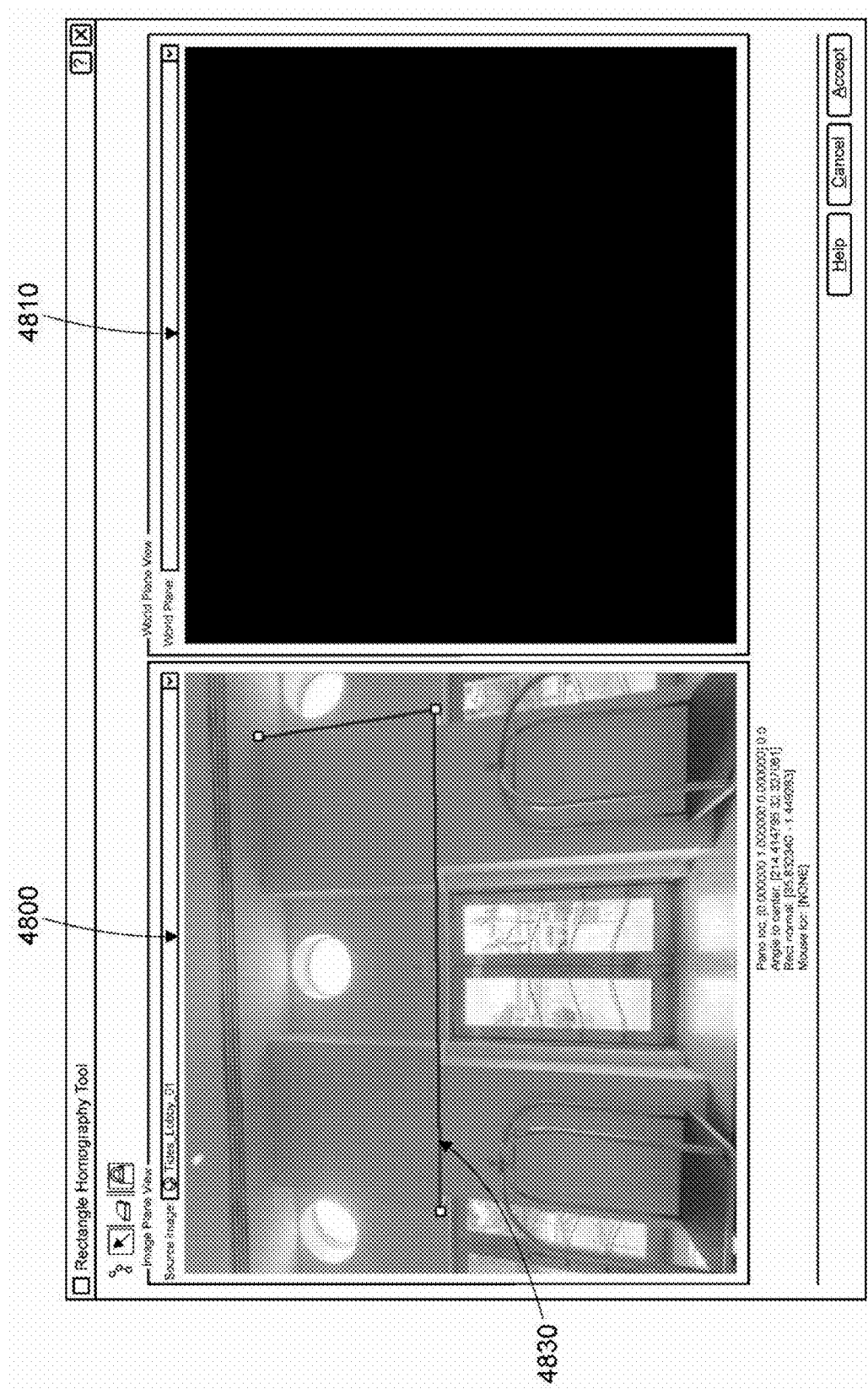
FIGS. 48-52 illustrate a process for creating active elements using an active element creator embodiment of the invention.

Active elements are inserted into the scene with correct perspectives. This is done via an embodiment of the invention called the "Active Element Creator" ("AEC") that enables the user to determine existing planar perspectives in the scene, and then create and edit layers of information into the scene. FIGS. 48-52 illustrate AEC. FIG. 48 shows the AEC user interface for determining a planar perspective, and then intuitively adding other visual layers to it. 4800 is the panorama viewing window—what we call an "image-plane view." 4810 is the "world-plane view" window (without an image yet in FIG. 48). Once a plane has been defined using the Perspective Rectangle Tool ("PRT"), a rectified image of the scene is shown. (See description of PRT above). Due to the interactive and projective nature of the panorama and its viewer, perspectives of the features in the scene continuously change as the user interactively pans around to view various directions in the scene. AEC enables the user to create sticky and perspective-corrected active elements embedded in the scene.

Figure 49:
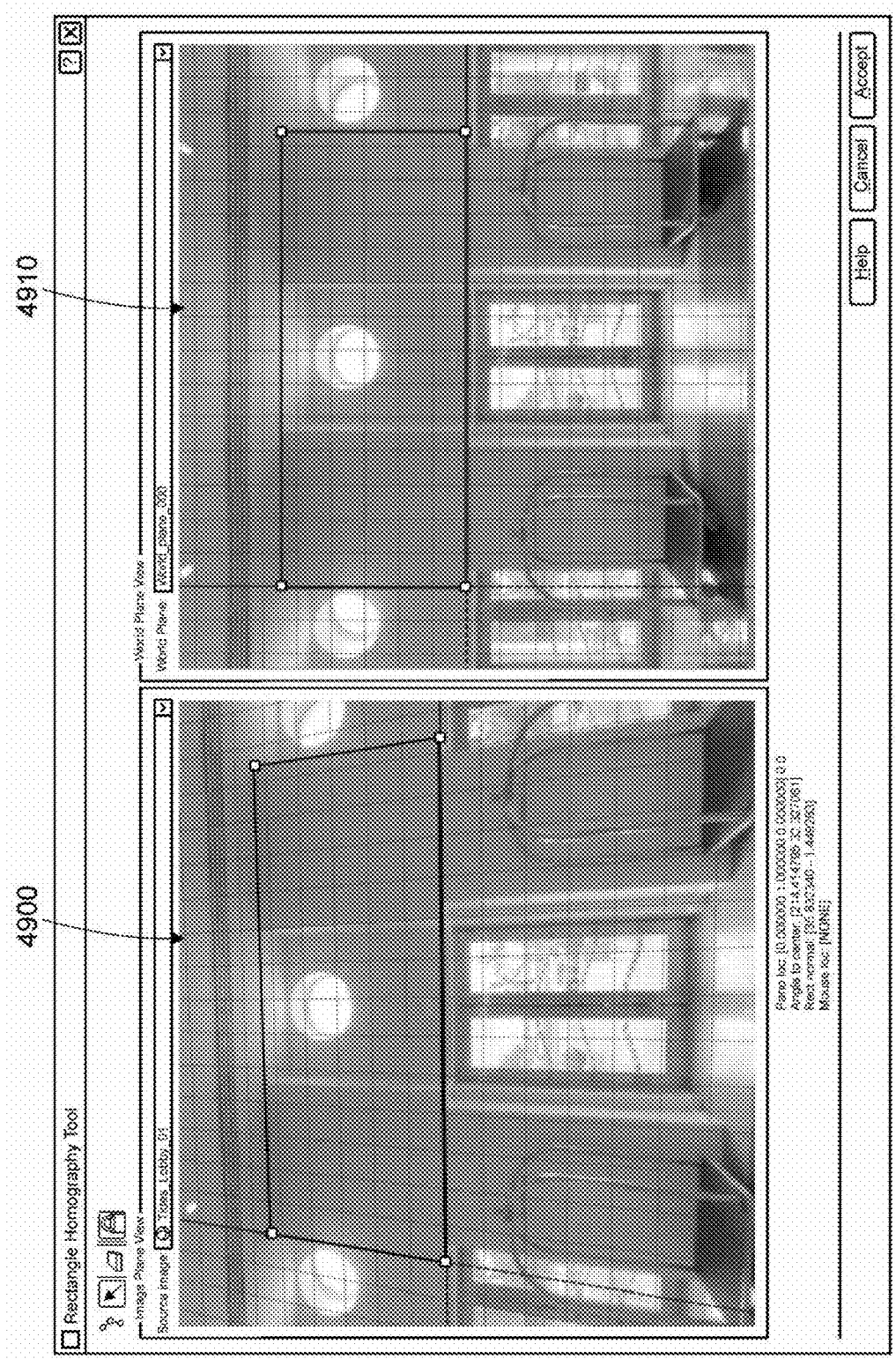
Figure 50:
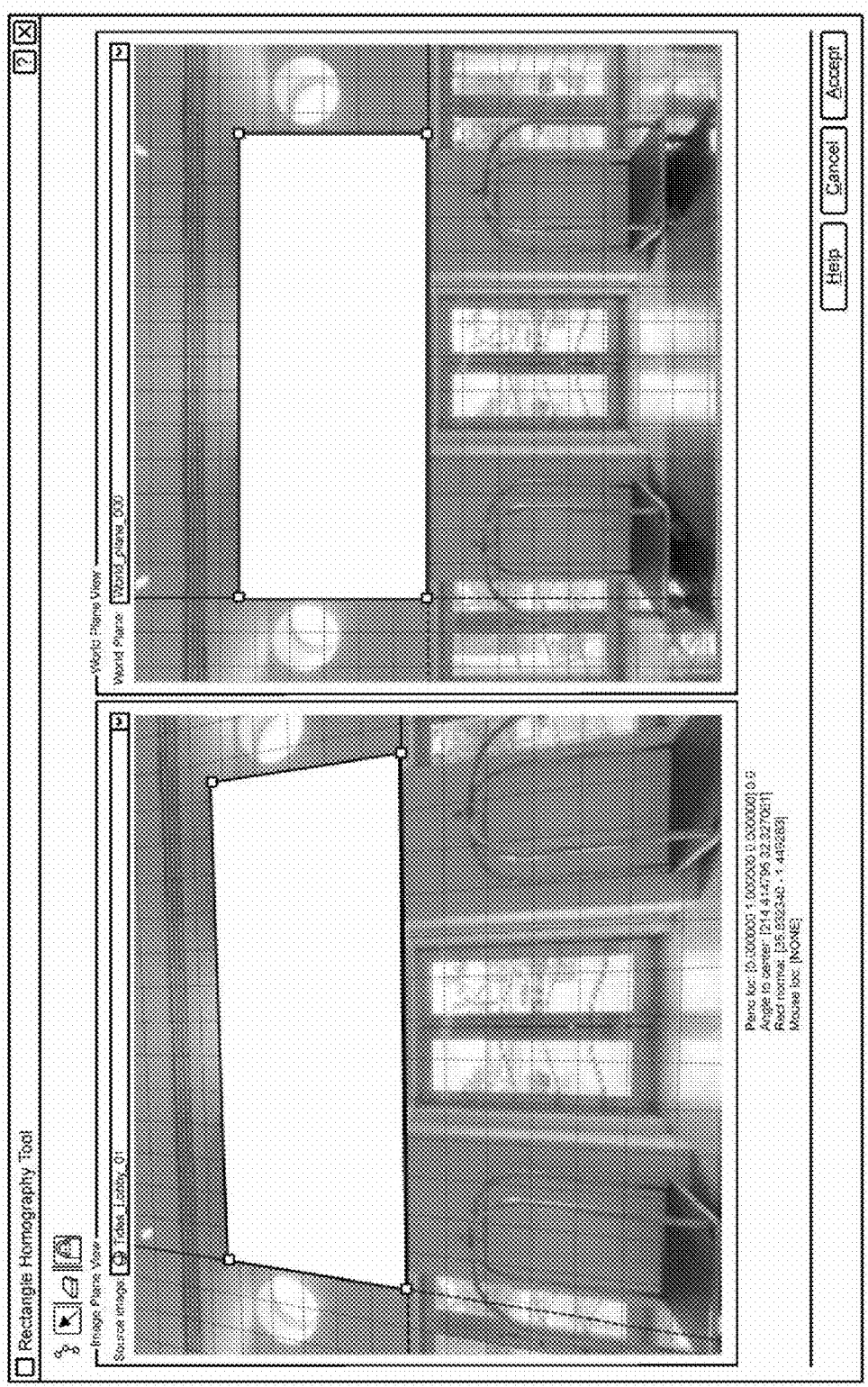
Figure 51:
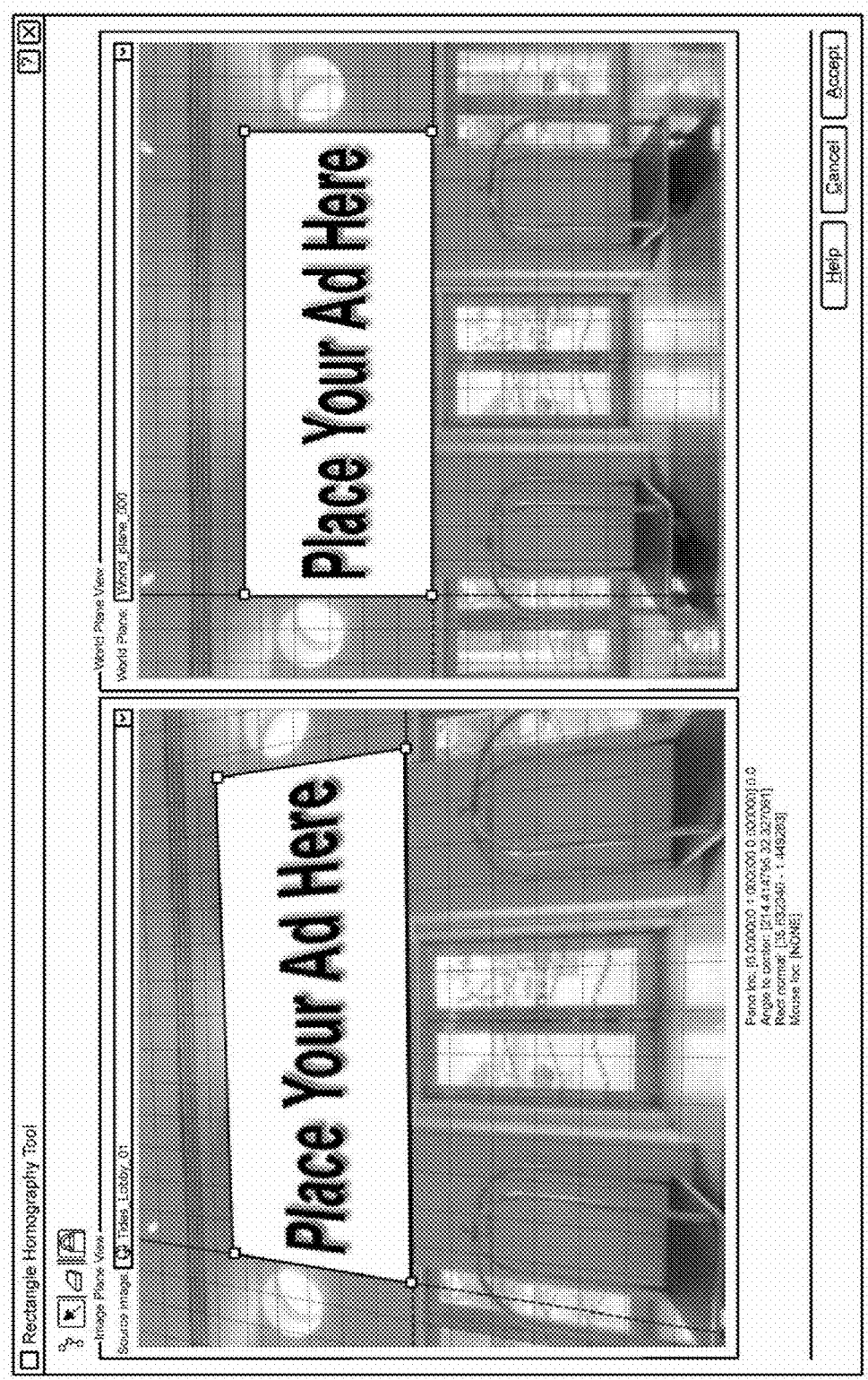
Figure 52:
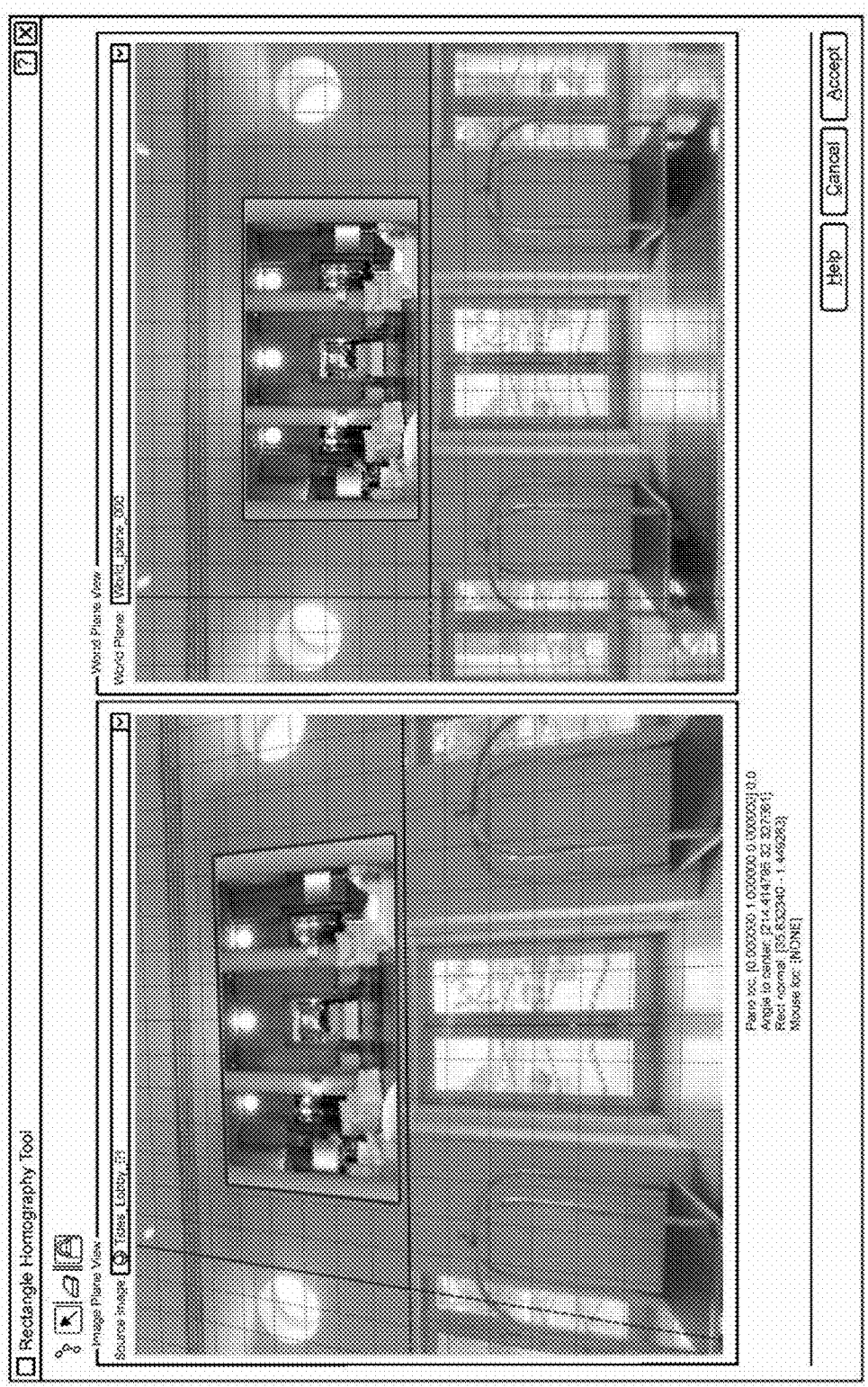

In FIG. 48, 4830 shows three points of a rectangle selected by the user to define a perspective rectangle using PRT. FIG. 49 shows the defined plane via PRT on the image-plane view on the left 4900, and the world-plane view on the right. 4910. Note that 4910 is a rectified view of the perspective plane defined in 4900. Once the world plane has been defined, it is easier to annotate, add visual layers, and modify, similar to two-dimensional drawing and image editing software. FIGS. 50-52 show how two-dimensional figures, text, images are added into the world-plane view, and reflected immediately on the panoramic scene on the left. These active elements may be then hyperlinked to web pages, applications, documents, etc.

Note that defining image-plane and world-plane rectangles that correspond to each other does not only create rectangles, but also create a one-to-one mapping between the two coordinate systems, x-y and x'-y' (FIG. 7) Therefore, editing and adding text or drawings or images in one coordinate system can be simply mapped to the other coordinate system. A 3×3 matrix, H, called the "homography" is defined, that maps a point in image plane to a corresponding point in world plane. (See, for example, J. G. Semple and G. T. Kneebone, "Algebraic Projective Geometry." Oxford University Press, 1952) Therefore, $xH=x'$, and $x'H^{-1}=x$.

Figure 53:
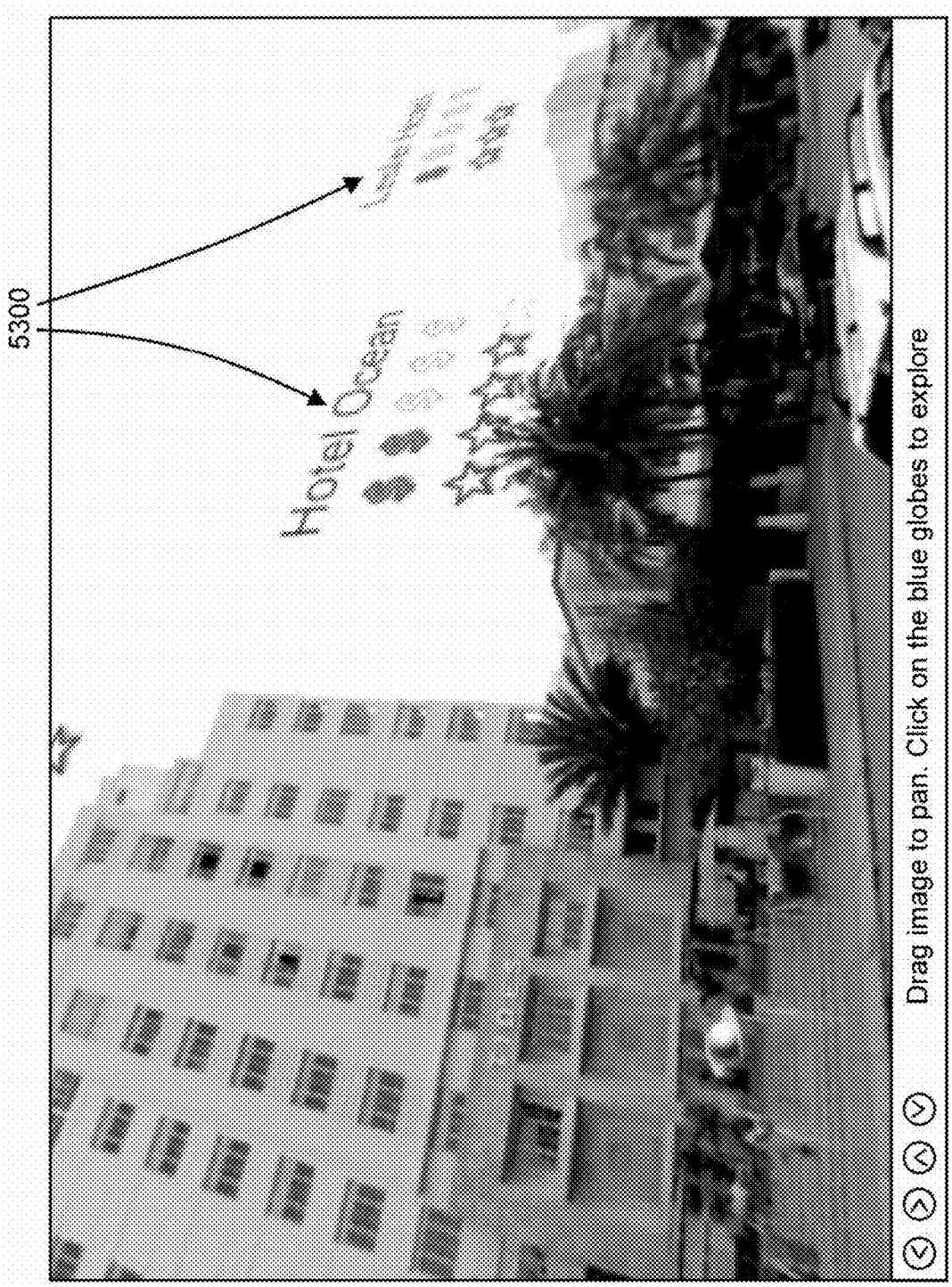
FIG. 53 shows a hotel banner active element, according to an embodiment of the invention.
Figure 54:
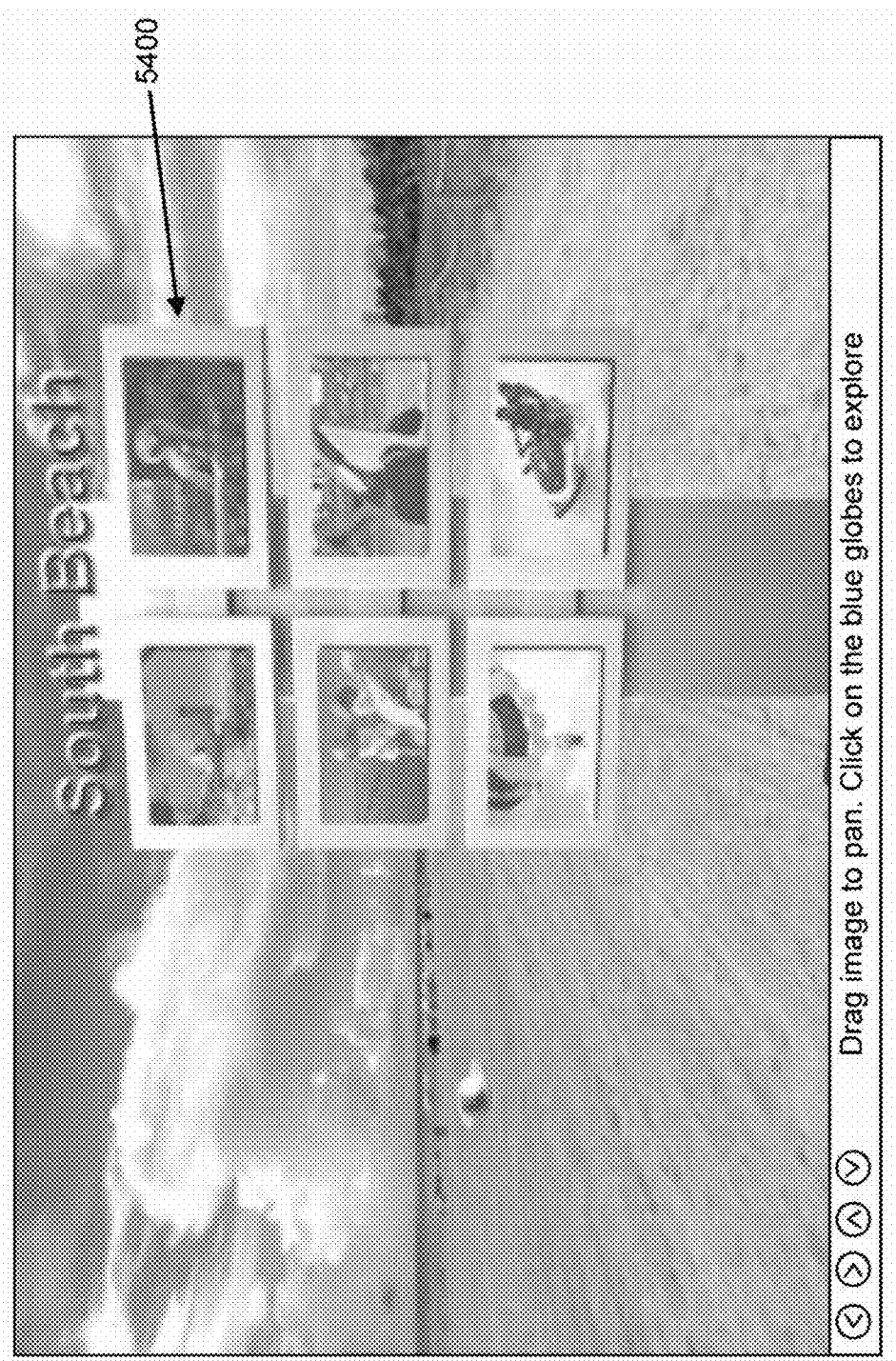
FIG. 54 shows a virtual kiosk active element, according to an embodiment of the invention.

FIGS. 53-54 show other examples of active elements, according to specific embodiments of the invention. In FIG. 53, one active element 5300 is shown that may be called a "hotel banner," where the name and other information regard the hotel is embedded into the scene as an active element. Clicking on a hotel banner triggers actions that open up web pages with relevant information regarding the hotel. In FIG. 54, 5400 is what we call a "virtual kiosk," that contains relevant information about a specific scene. It is a scene-specific informational icon. In this example, the virtual kiosk contains information about the beach and various activities.

Figure 55:
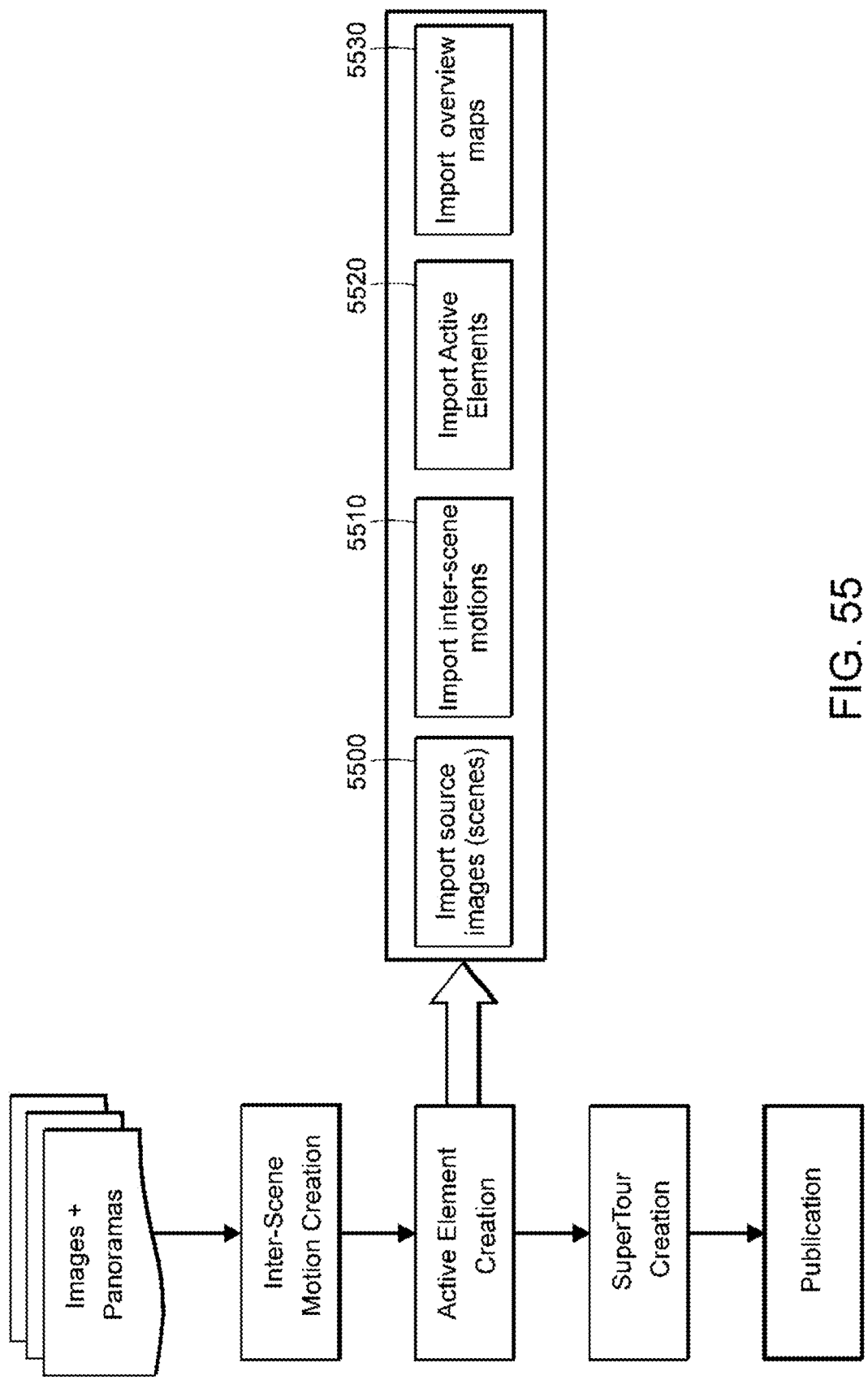
FIG. 55 is a flow diagram of a method for creating a supertour according to an embodiment of the invention.

In embodiments of the invention, a supertour is created including a complex network of scenes, inter-scene motions, active elements, and overview maps. FIG. 55 shows the overview flow diagram (see FIG. 4), and a flow diagram for the steps creating a supertour: importing the scenes 5500, the inter-scene motions 5510, active elements 5520, and overview maps 5530, according to a preferred embodiment of the invention. The "scenes," as mentioned before, are the source images, comprising panoramas and images. The "inter-scene motions" comprise transitional objects, transitional parameters, and a virtual camera that produces the transitional images. Transitional images include one or more transitional scenes that include a transitional object or objects. The active elements trigger specified actions, such as triggering an inter-scene motion via a navigational icon or display of amplifying information about a scene. Finally, there are overview maps to aid in an overall sense of position within an area. Overview maps are discussed further below.

Figure 56:
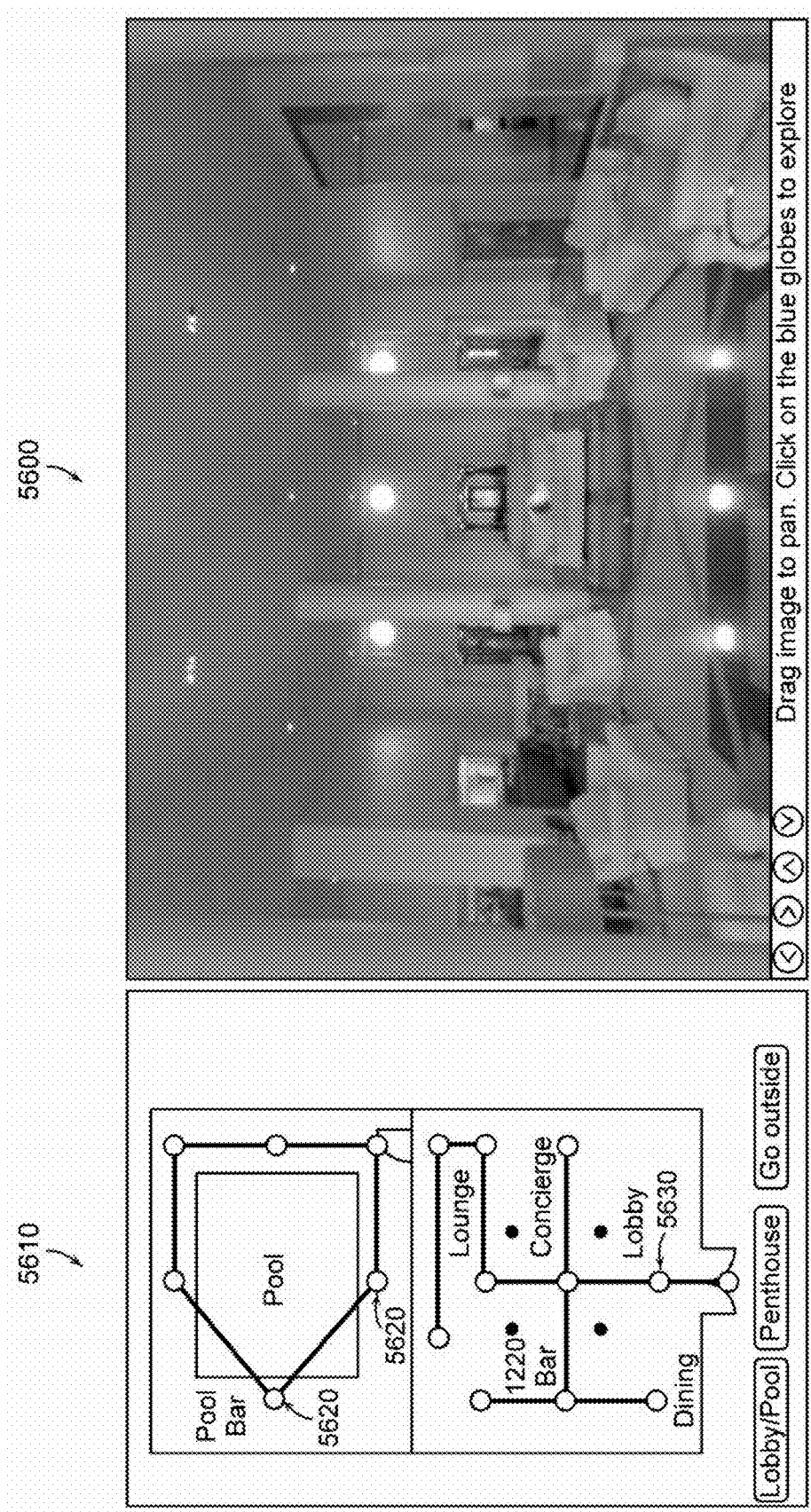
FIG. 56 shows a display combining an overview map with perspective view of corresponding locations in the supertour, according to an embodiment of the invention.

In some embodiments of the invention, a scene viewer, which shows perspective images or panoramas, is coupled with an overview map viewer. As shown in FIG. 56, the scene viewer is on the right 5600 and the overview map viewer is on the left 5610. The overview map shows a "bird's eye view" of the supertour. In a specific embodiment of the invention, navigational icons 5620 are placed for each acquisition position where the panoramas have been photographed. Because the navigational icons are a type of active element, activating the navigational icon via a pointing device triggers the scene viewer to navigate to that specific scene within the supertour, similar to triggering the active elements within the panorama viewer. The overview map viewer also moves and recenters automatically, synchronized with the scene viewer. 5630 is the "current" navigational icon which has a special highlight and an arrow that denotes the direction of the current view in the scene viewer 5600. As the user interactively changes view directions in the scene viewer, the arrow changes directions accordingly. As the viewer position moves in the supertour, the current navigational icon is also synchronized accordingly.

In various embodiments of the invention, a method provides a means to "script" a series of scenes and transitions to play in sequence. In a supertour, a user typically invokes a transition from one scene to another by activating a navigational icon using a pointing device. Scripting may be thought of as a means to "record" a supertour path through multiple scenes and their corresponding inter-scene motions, and "play" the pre-determined path once invoked by the user. The scripted path may be a user-recorded path, or may be algorithmically determined, e.g. a shortest driving direction between two points in a city, according to specific embodiments of the invention. This is different from using additional source images to create a transition; scripts may be dynamically customized on the fly.

For instance, assuming scenes "A" through "Z" exist in the supertour. Scene "A" is connected to "Z" only via intermediate scenes (corresponding to intermediate locations), "B" through "Y." If the current scene is "A," and when a user selects a navigational icon "Z" on the overview map, a script may be triggered that plays the scenes and the inter-scene motions from "A" through to "Z" automatically and sequentially, such that the user may have a continuous and connected experience.

In specific embodiments of the invention, for the automatic playing necessary for scripting, as well as for simple navigation through navigational icons, scene viewers provide, what we call, an "orientation matching." The scene viewer automatically aligns itself to the starting orientation of its connected inter-scene motion. For example, while traversing from scene "A" to scene "Z," the user comes to an intersection scene, where a turn is necessary. The orientation matching feature automatically turns the viewer to align to the next inter-scene motion, and then triggers the transition.

Also, in embodiments of the invention, at each given panoramic scene, the user can interactively change the viewing orientation using a pointing device. To smoothly and seamlessly transition from one scene to another, it is preferable that the user's viewing orientation first match the beginning of the transitional image, and then initiate the transition from the first to the second scene. This feature is especially useful for transitional images in the form of pre-rendered movies, since the panorama viewing orientation should be aligned to the first frame of the transitional movie to provide a seamless experience to the end user.

In an embodiment of the invention, a data structure is implemented for each pair of connected source images and their respective directional transitional image, where the orientation angles $(\theta,\varphi)_1$ are the zenith and azimuth angles of the first scene, and the orientation angles $(\theta,\varphi)_2$ are the zenith and azimuth angles of the second scene that match the first and last frames of the transitional image, respectively. These orientation-matching data are stored during the inter-scene motion authoring process. In accordance with an embodiment of the invention, the transitional images are created in a three-dimensional system, so it is easy to determine the exact view orientation of the virtual camera along the transitional image's path.

In an embodiment of the invention, once a transition from the first scene to the second scene has been triggered, e.g., via a navigational icon, a panorama viewer is provided that automatically reorients the view of the first scene from any given arbitrary viewpoint $(\theta',\varphi')_1$ to match $(\theta,\varphi)_1$ via interpolation of the view angles. Once $(\theta',\varphi')_1 = (\theta,\varphi)_1$ then the viewer renders the transitional image to simulate smooth motion to the second scene. Once reaching the second scene, the viewer transitions from displaying the transitional image to the second scene's panorama, which is oriented such that the viewing angle $(\theta,\varphi)_2$ for a smooth and seamless transition.

Figure 57:
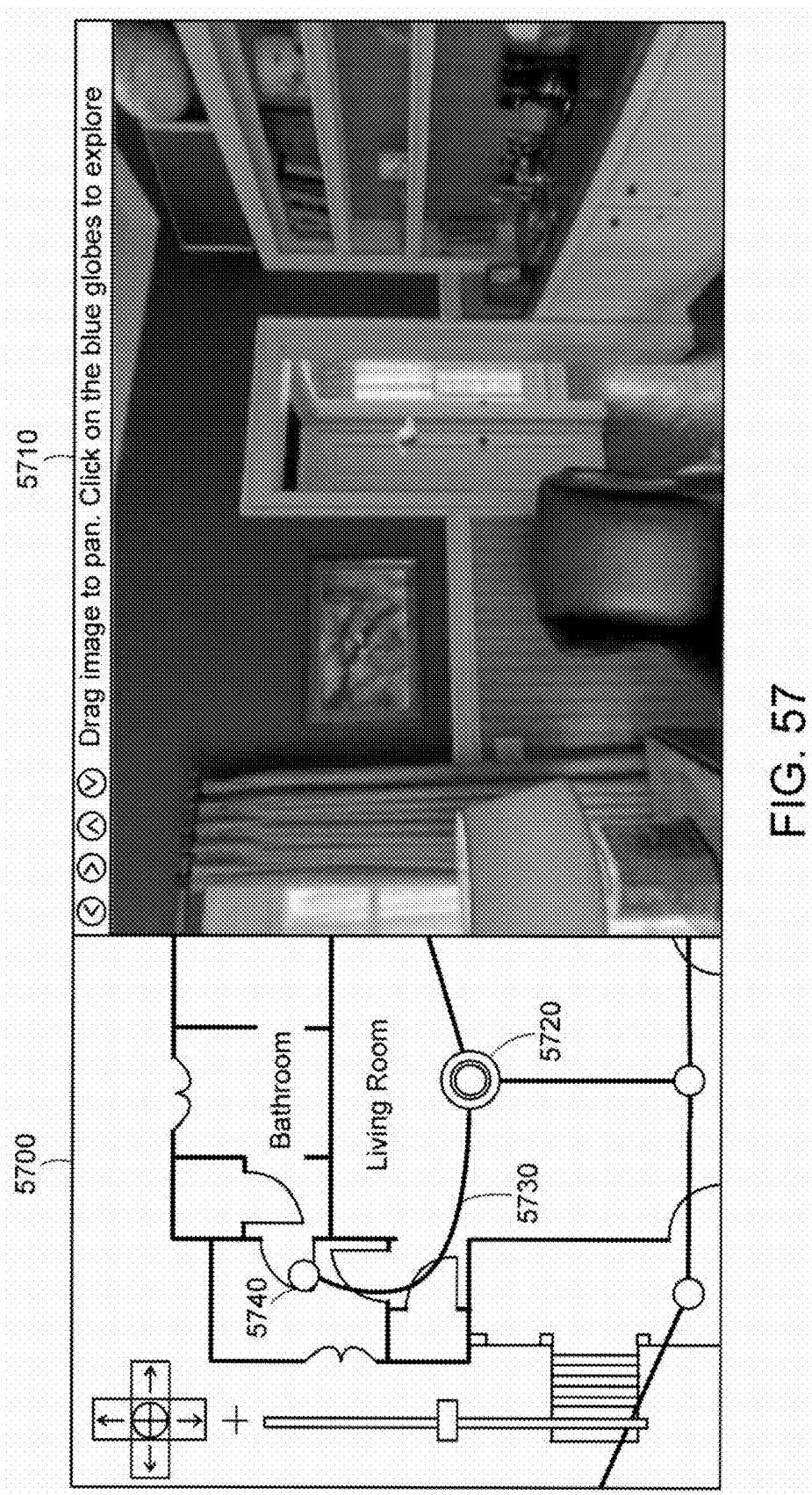
FIGS. 57-58 show scripting and orientation matching in a supertour, according to an embodiment of the invention.
Figure 58:
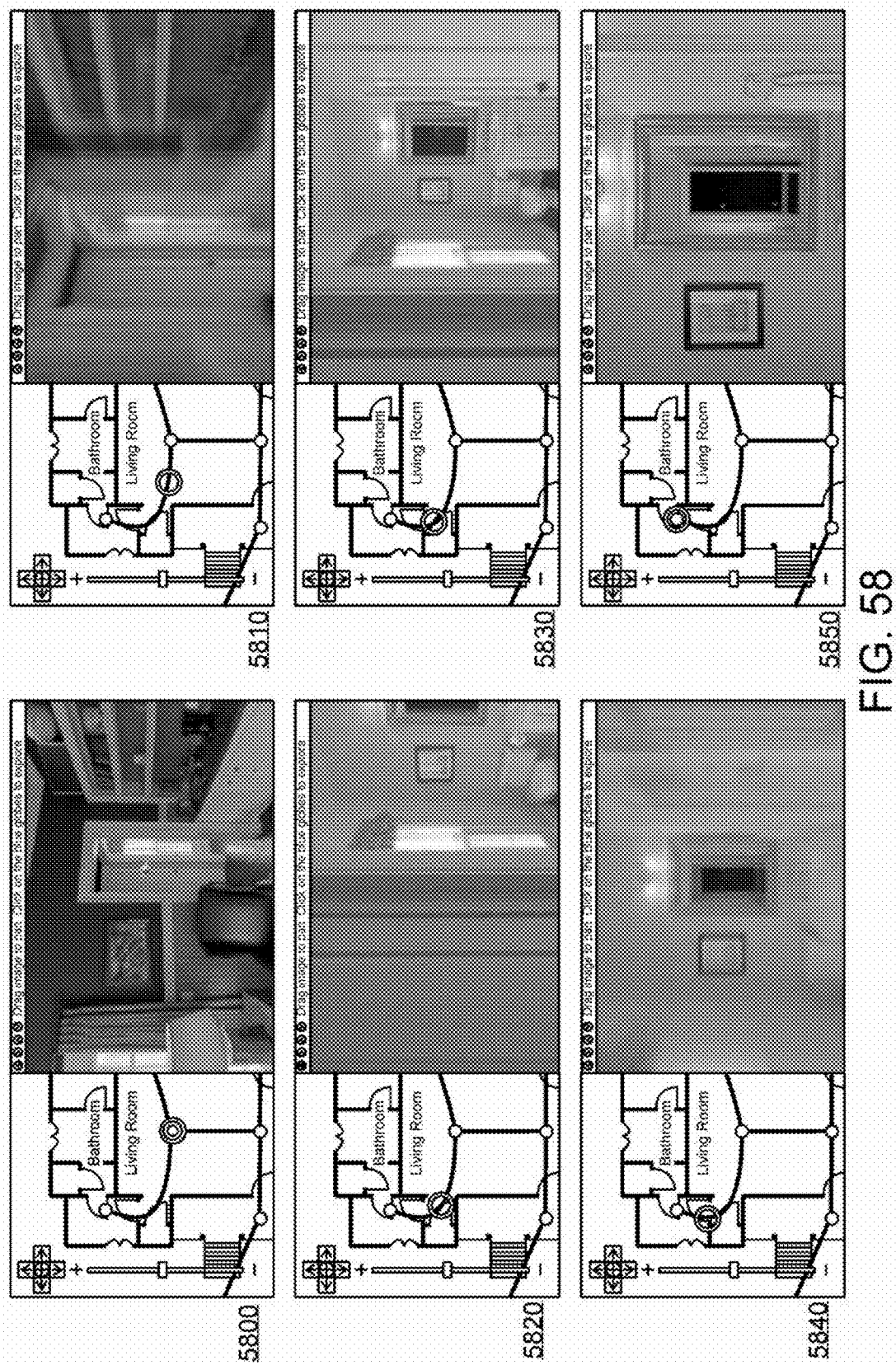
Figure 59:
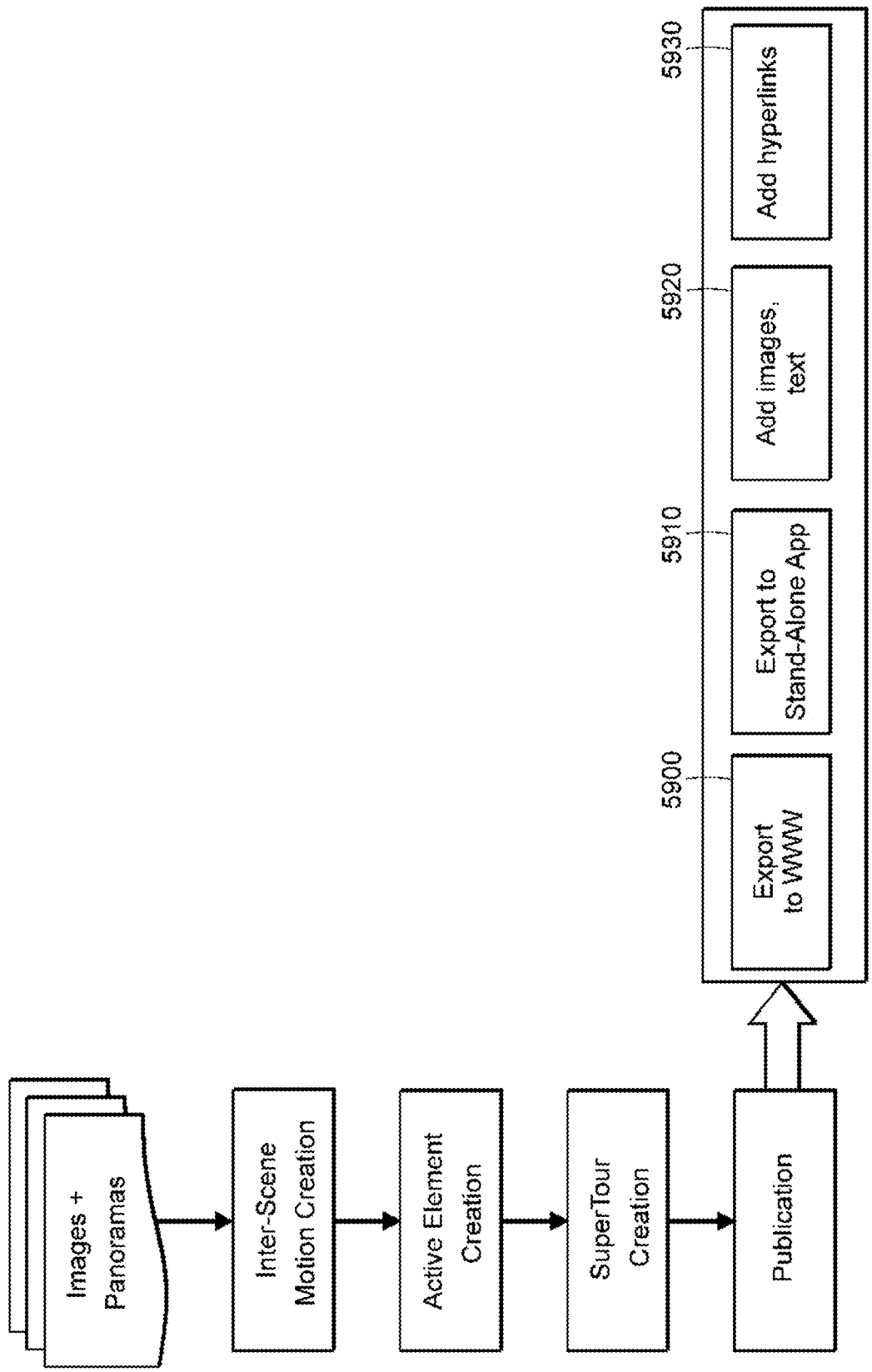
FIG. 59 is a flow diagram of a method for publishing a supertour according to an embodiment of the invention.

FIGS. 57-58 are an example that shows scripting as well as orientation matching. In FIG. 57, the overview map is on the left 5700, and the scene viewer is on the right 5710. The scene viewer is showing a doorway that eventually leads to a bathroom after a right hand turn. The bathroom is not visible from the current scene viewer, but the bathroom is shown in the overview map 5700. 5720 is a navigational icon signifying the current position of the scene; 5730 shows a curved path that will lead into the bathroom through an intermediate scene (via scripting); and 5740 is the final destination scene denoted by the navigational icon.

FIG. 58 shows the sequence of events that happen (5800, 5810, 5820, 5830, 5840, and 5850). 5800 is the initial view, which is the same as FIG. 57. Once the navigational icon (or some other means) triggers the transition, the intermediate transition is shown 5810. Note also that the overview map displays the "current" position and direction using the pointing icon (same as 5720). Once reaching the intermediate scene 5820, the automatic orientation-matching feature is triggered, such that the intermediate scene viewer is aligned with the next transitional image 5830. 5840 shows the actual transition from the intermediate to the final scene, 5850.

In these examples, it may seem as though all the scenes are connected to each other in an "absolute" sense. In other words, the multiple scenes displayed on the overview map and the scene viewer may seem like they are all positioned correctly with each other's position and orientation in world space. In embodiments of the present invention, supertours are created using only relative pose estimation between pairs of source images. This approach contrasts with many vision research and image-based modeling systems, in which it is important to compute as precise a pose estimation as possible via feature correspondences among source images. This is a complex optimization problem, and is more difficult and error-prone as the number of source images increases.

For example, in a simple scenario, assume there are three input source images, A, B, and C, that share corresponding features, e.g. the photographs are taken around a building; and each pair share common features, e.g. A-with-B, B-with-C, and C-with-A. Typical vision systems compute the camera pose of B relative to A, then compute the camera pose of C relative to B, etc. The computation error from A-to-B pose estimation would naturally propagate to the pose estimation of B-to-C, since all source images reside in the same "absolute" coordinate system. If there are feature correspondences between C and A, then it is necessary to have a global optimization algorithm to "spread" and lessen the error propagation. Note that due to A-to-B and B-to-C pose estimation, A and C already have their positions set in an absolute coordinate system. Trying to then compute the pose of A from C will naturally create more pose estimation errors. In more complex scenarios, e.g. real-world data, a system of complex optimization problem is a difficult problem to solve, often has problems with robustness, and once an error is introduced, it is difficult to "debug."

In embodiments of the present invention, supertours are created using relative pose estimation only between pairs of source images. In other words, pose estimation for each pair of source images resides in relative coordinate systems. There is no need for global optimization, since the pose estimation problem is determined for each pair of source images. For the simplistic scenario of input source images A, B, and C, supertour only requires approximate pose estimations between A-to-B, B-to-C, and C-to-A, all of which are computed separately regardless of the error in each computation. This embodiment allows the user to smoothly and continuously "move" from one source image to another. Therefore, from the viewpoint of scene A, the inter-scene transition simulates motion from A-to-B, and then ends up in scene B. Once reaching scene B, the coordinate system may change (which is seamless to the user). Then simulating motion from B-to-C may be performed separately from pose estimation of A-to-B, regardless of its computation errors. This approach advantageously reduces computing complexity and opportunities for errors, allowing supertour embodiments to scale up more easily as the number of nodes increase.

In preferred embodiments of the invention, the final process as shown in the overview flow diagram (FIG. 4) is the publication step. Once the supertour has been created that contains multiple scenes that are connected via inter-scene motions, and also have active elements, then the supertour may be published, either as a stand-alone application 5910 or delivered via the World Wide Web 5900 or any other communication systems as is known in the art. The published tour may also contain additional hyperlinks, images, text, etc. as necessary 5920, 5930.

Figure 60:
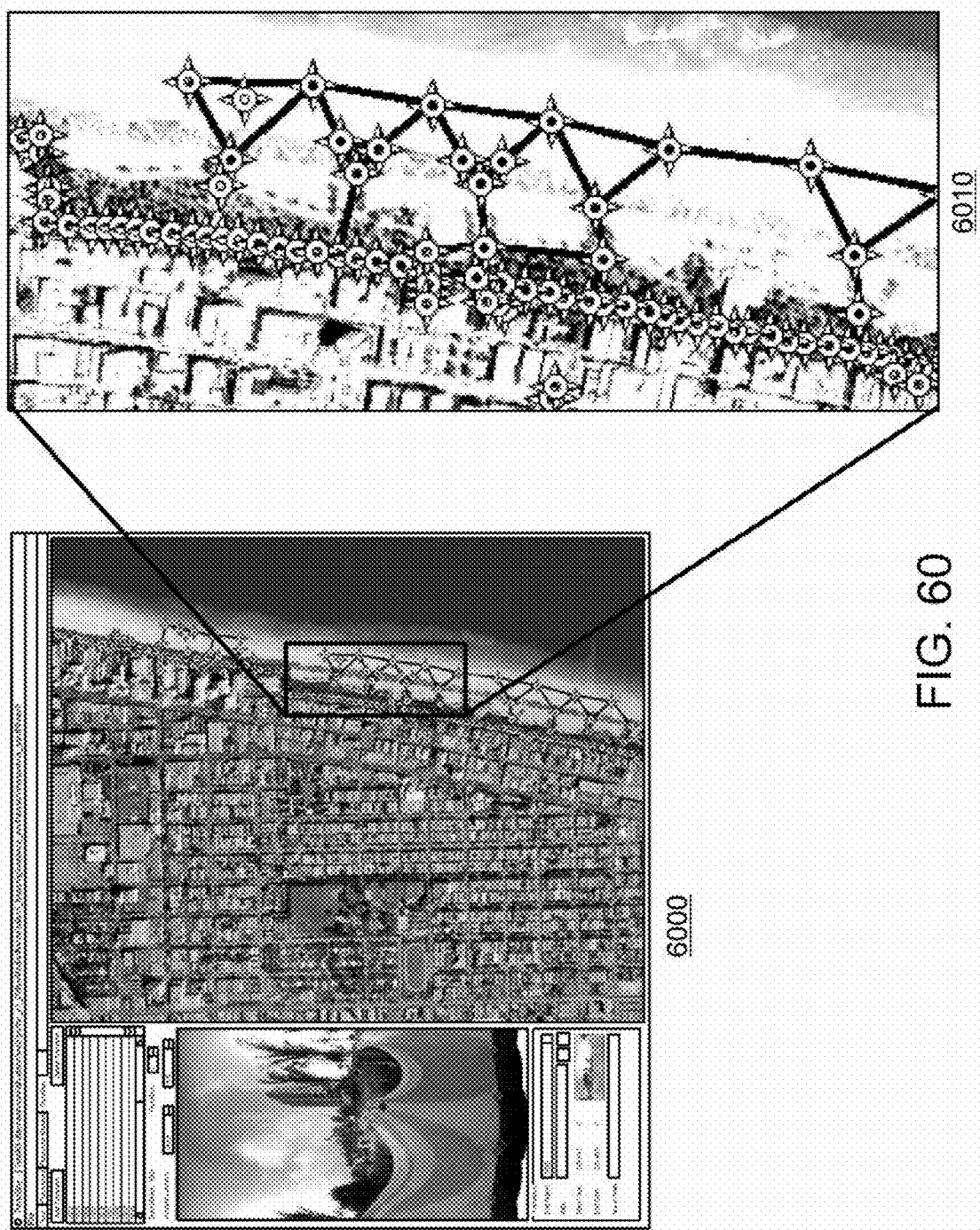
FIG. 60 shows publication of an exemplary supertour, according to an embodiment of the invention.
Figure 61:
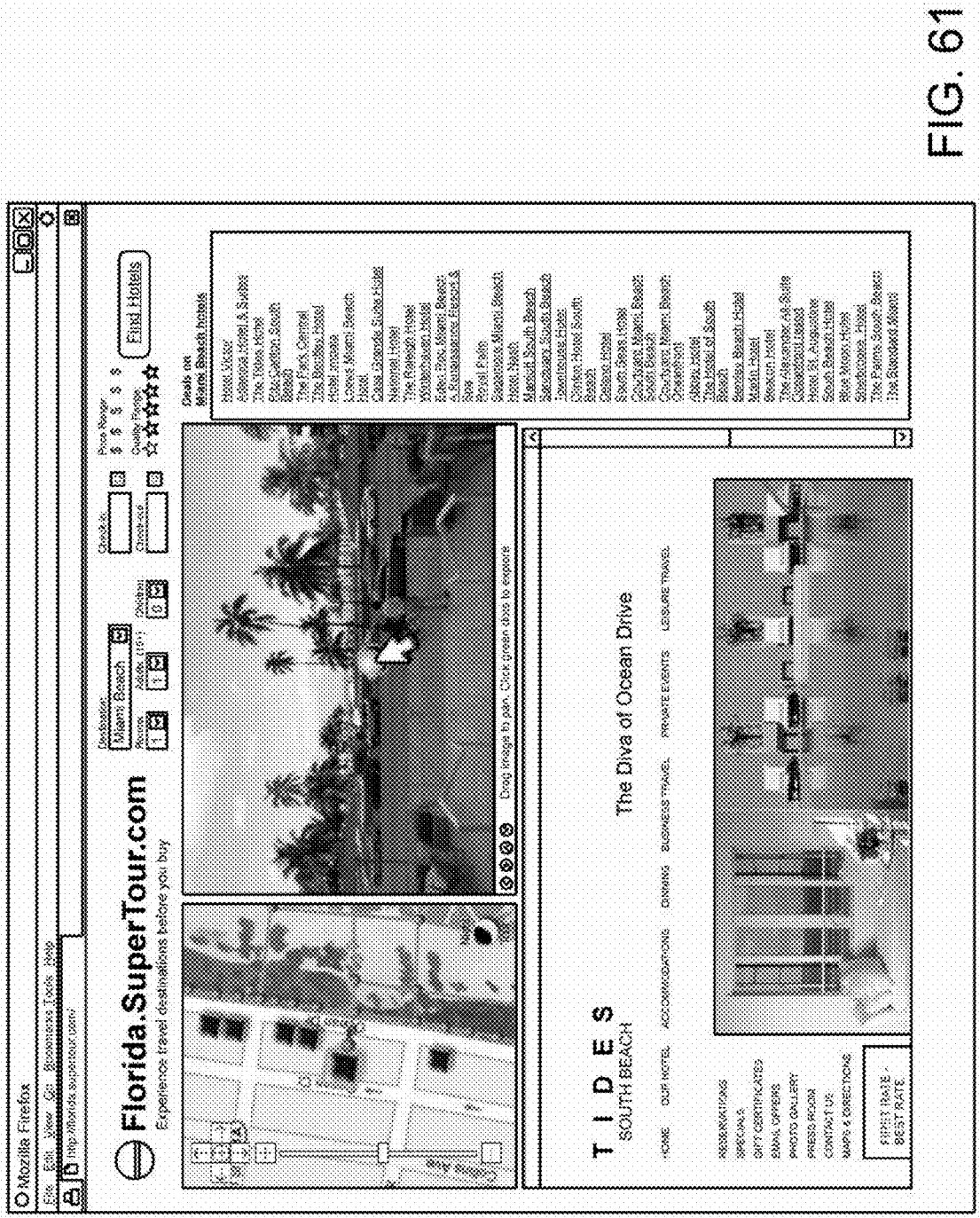
FIGS. 61-70 show displayed views from an exemplary supertour of Miami Beach, Fla. created according to an embodiment of the invention.
Figure 62:
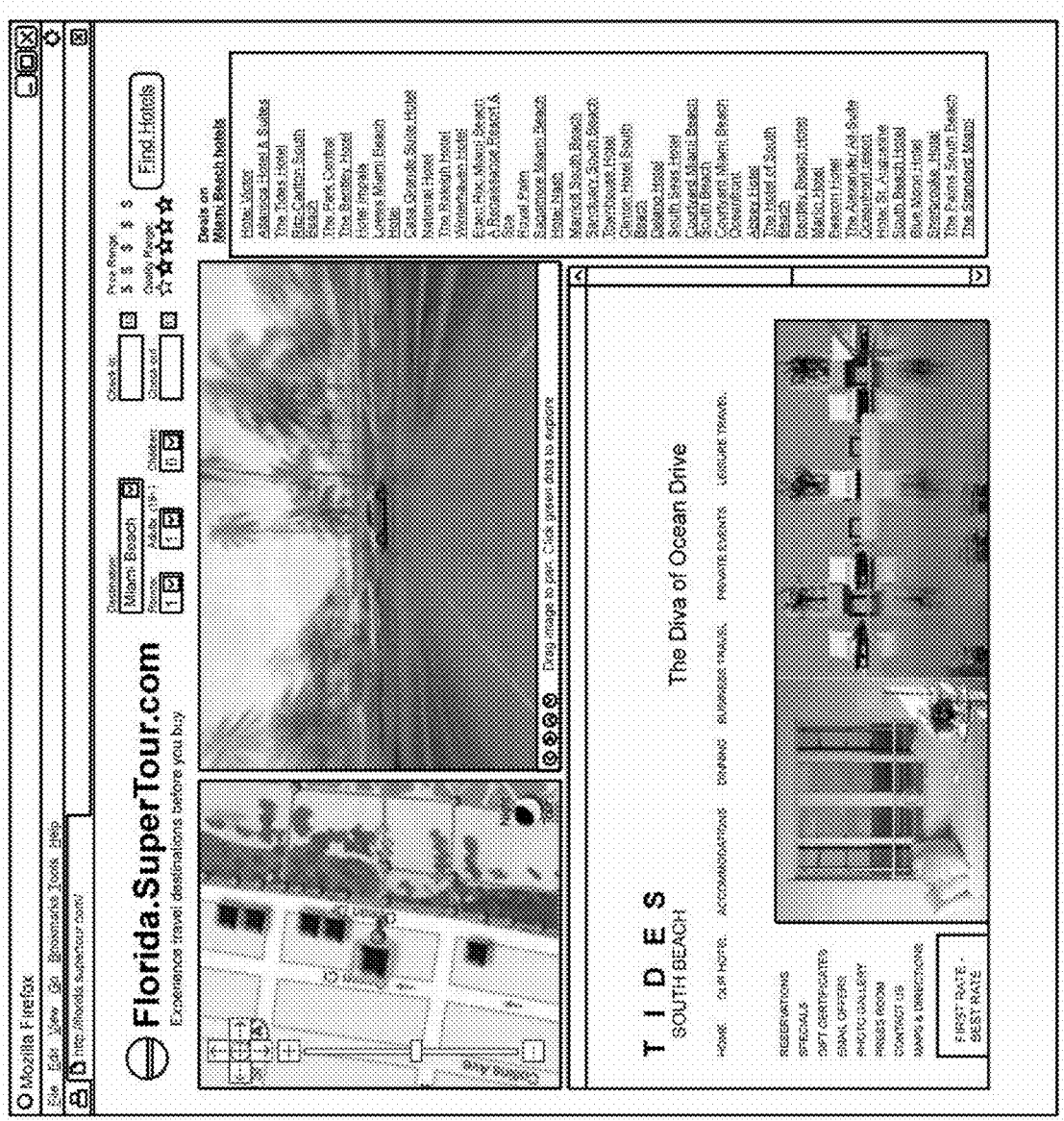
Figure 63:
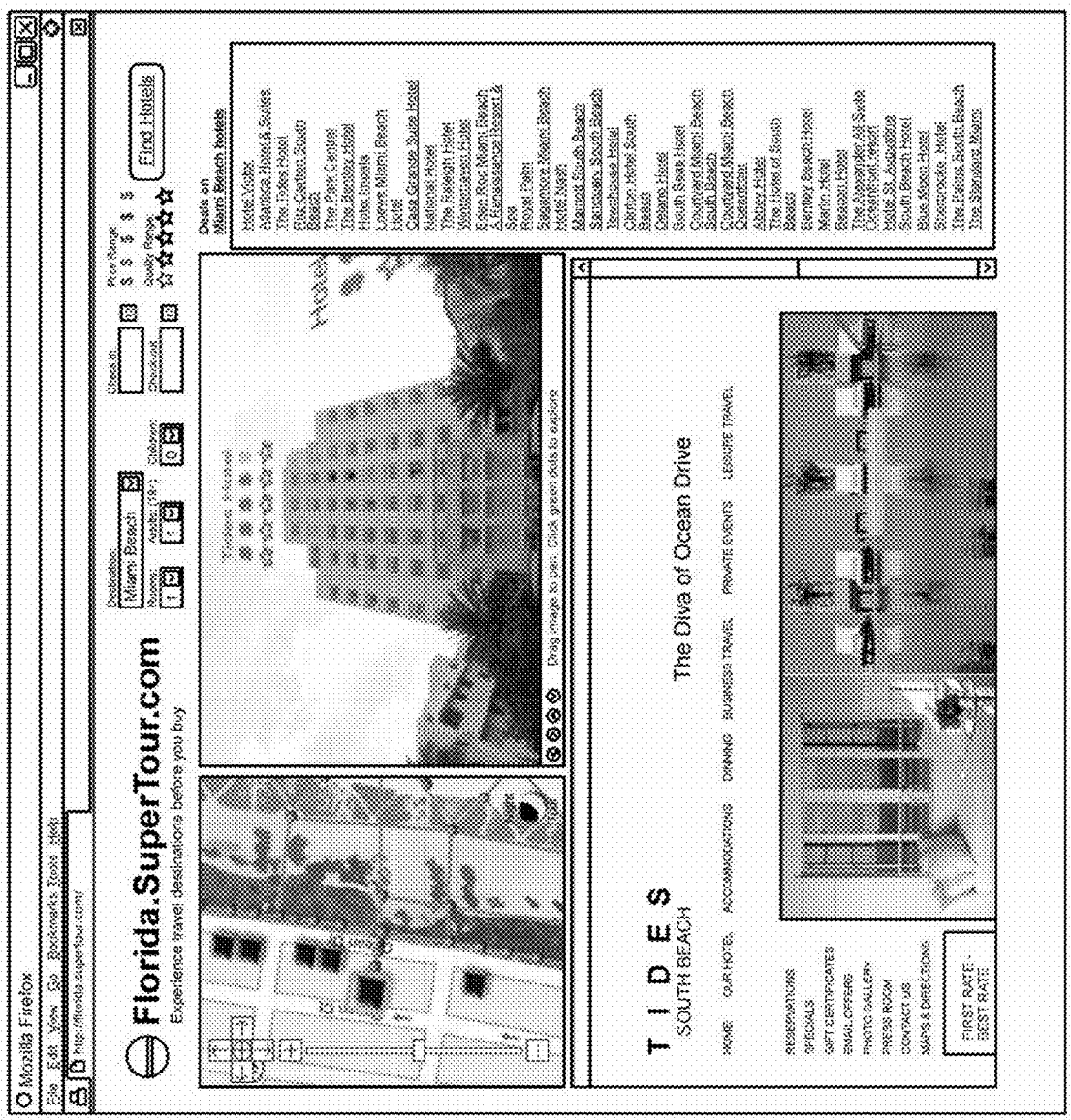
Figure 64:
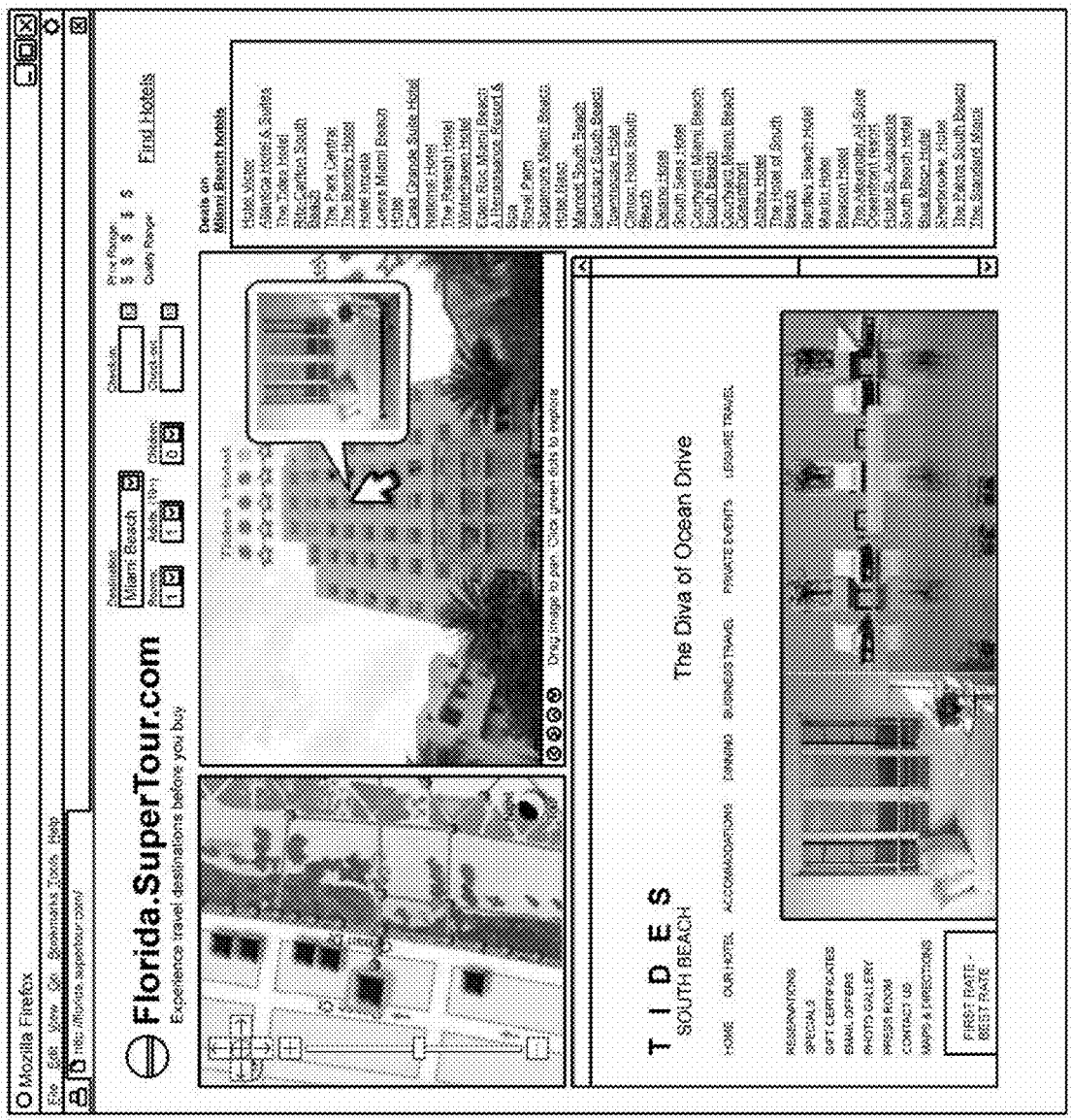
Figure 65:
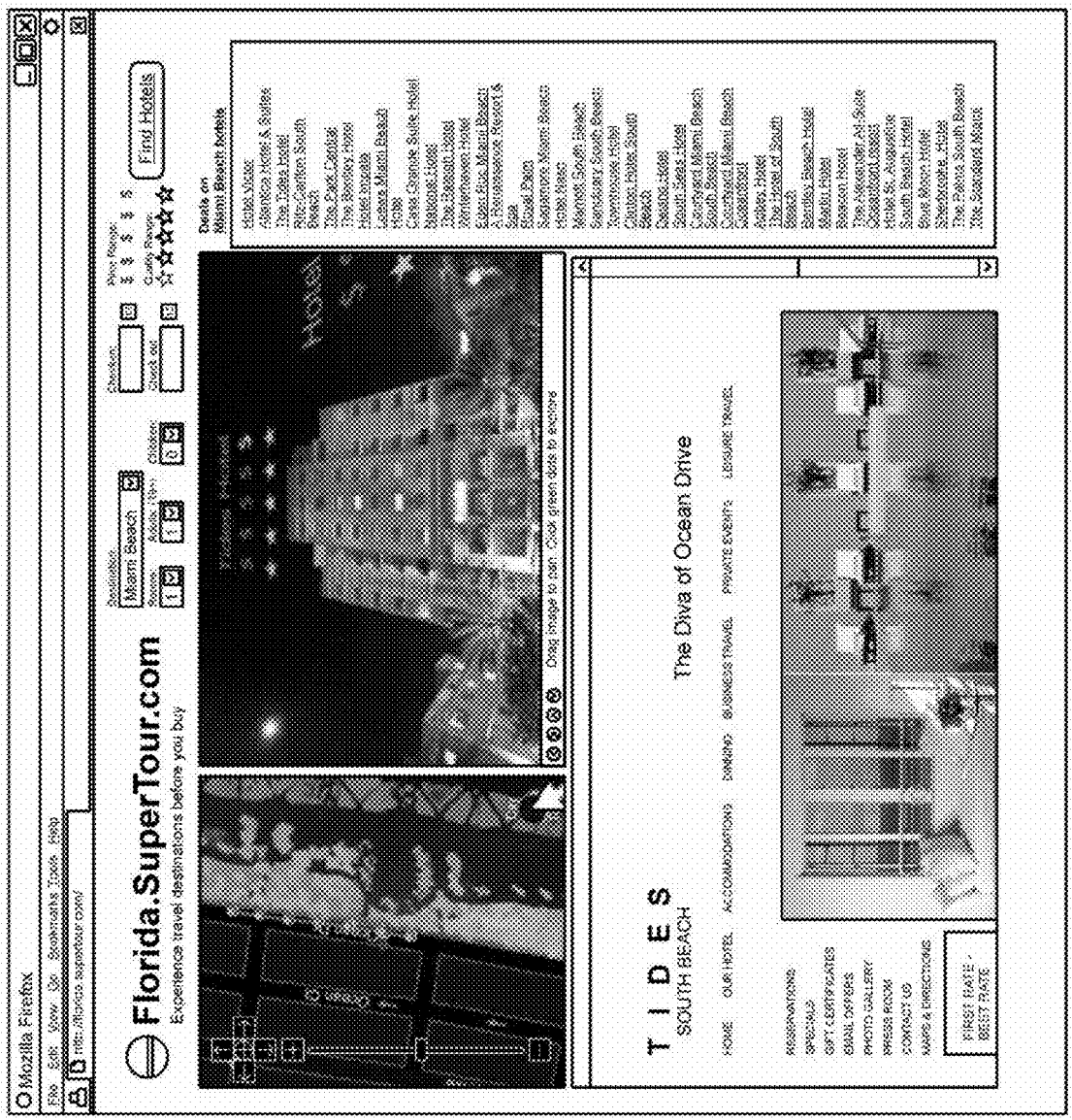
Figure 66:
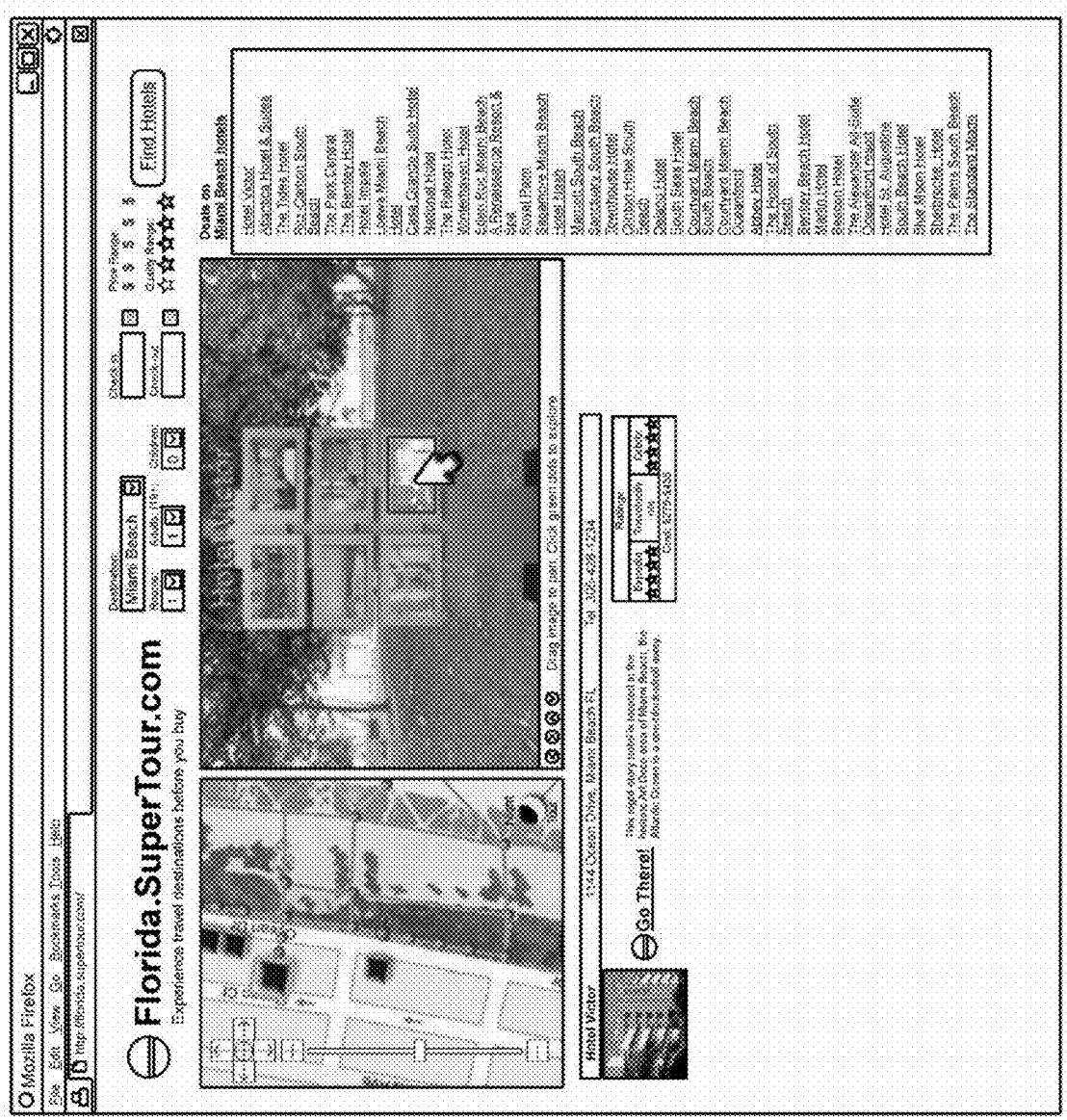
Figure 67:
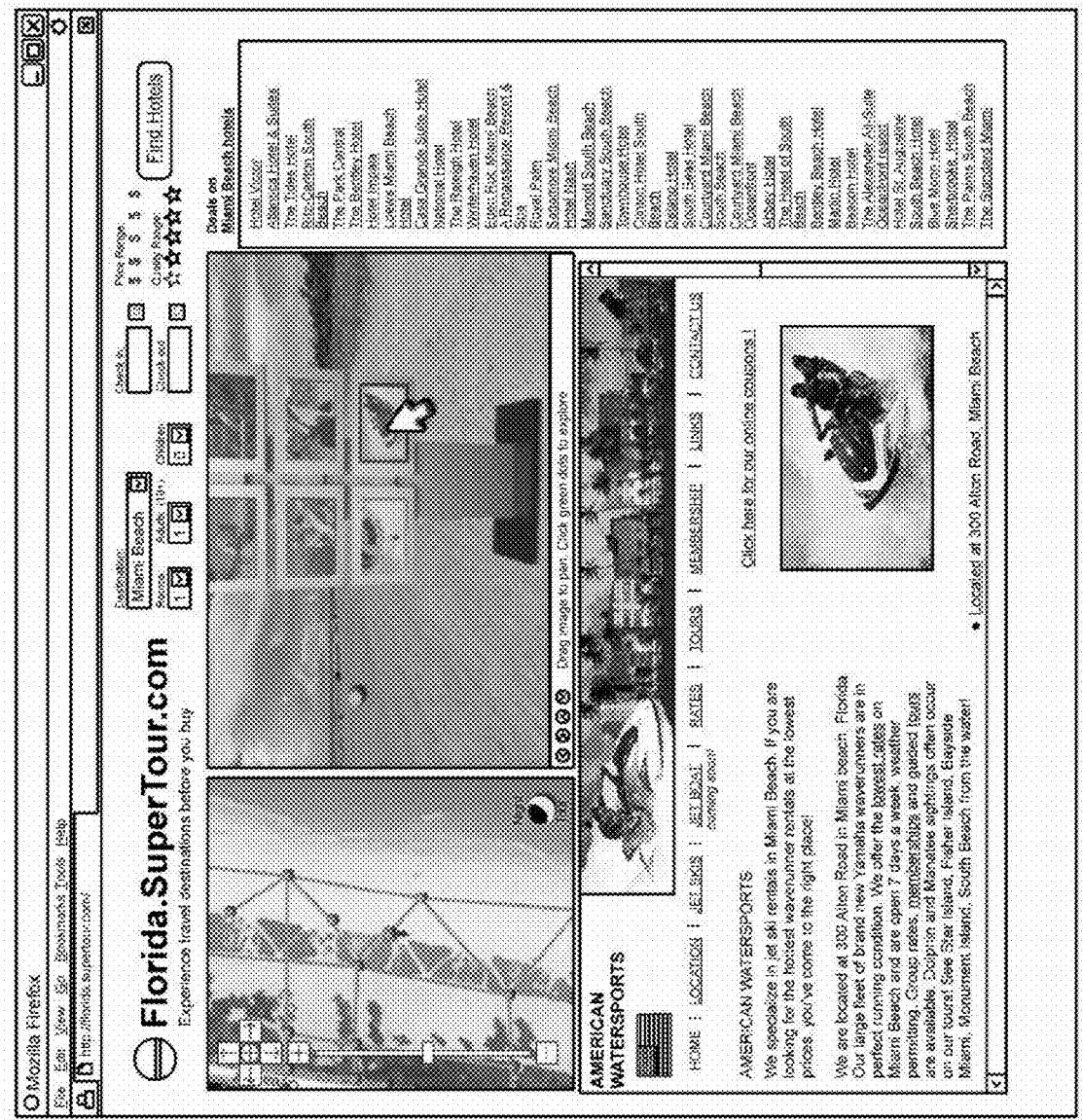
Figure 68:
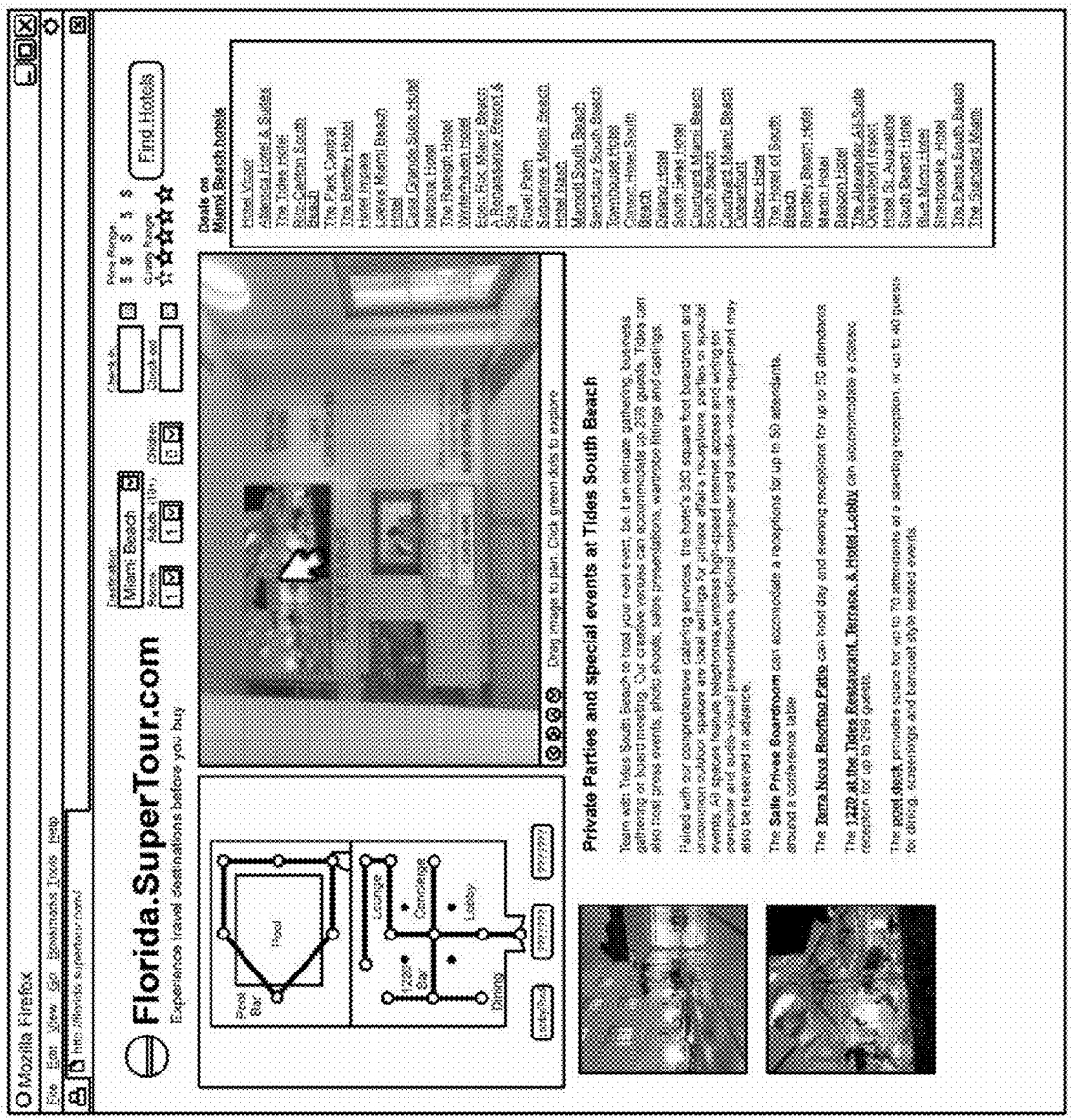
Figure 69:
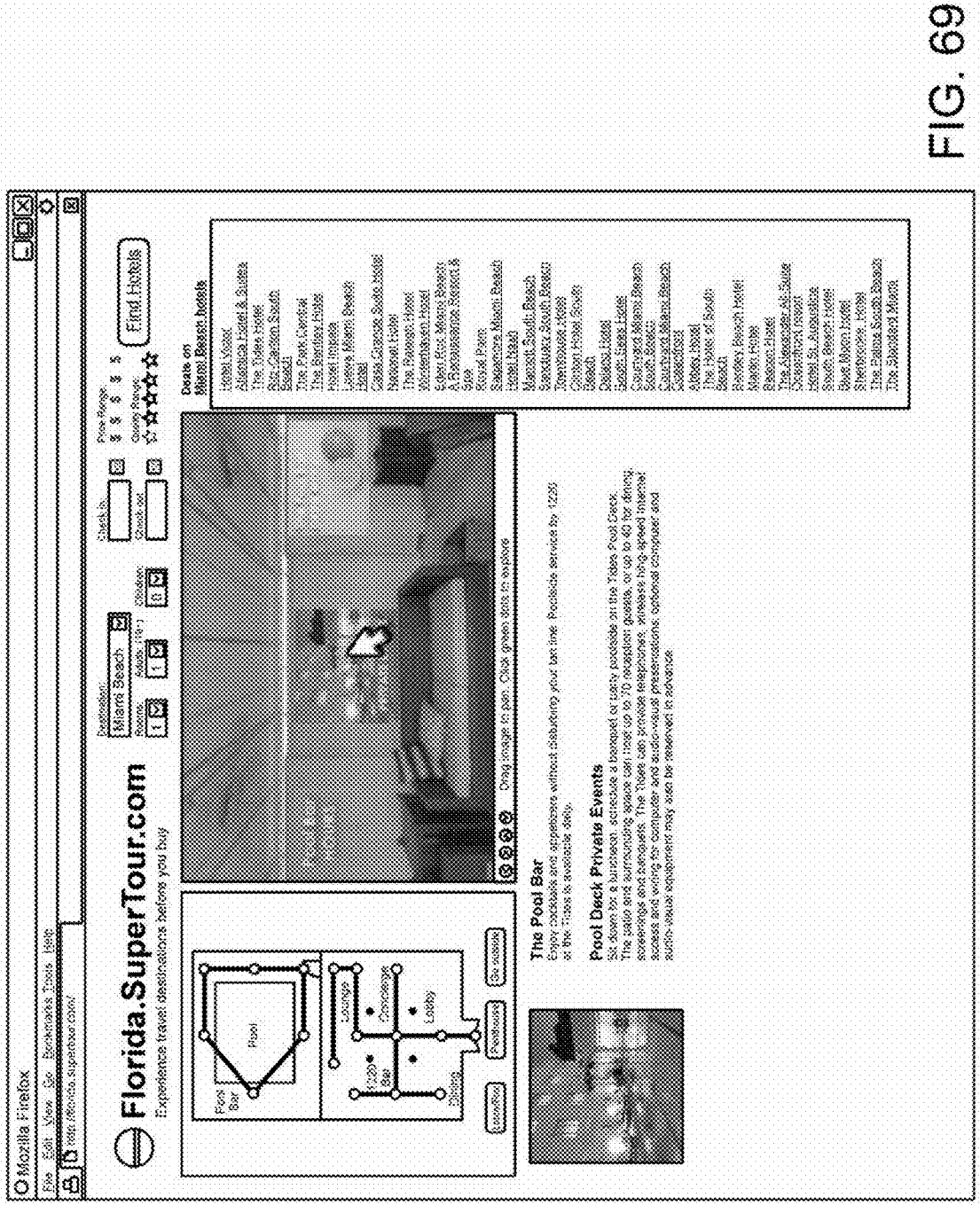
Figure 70:
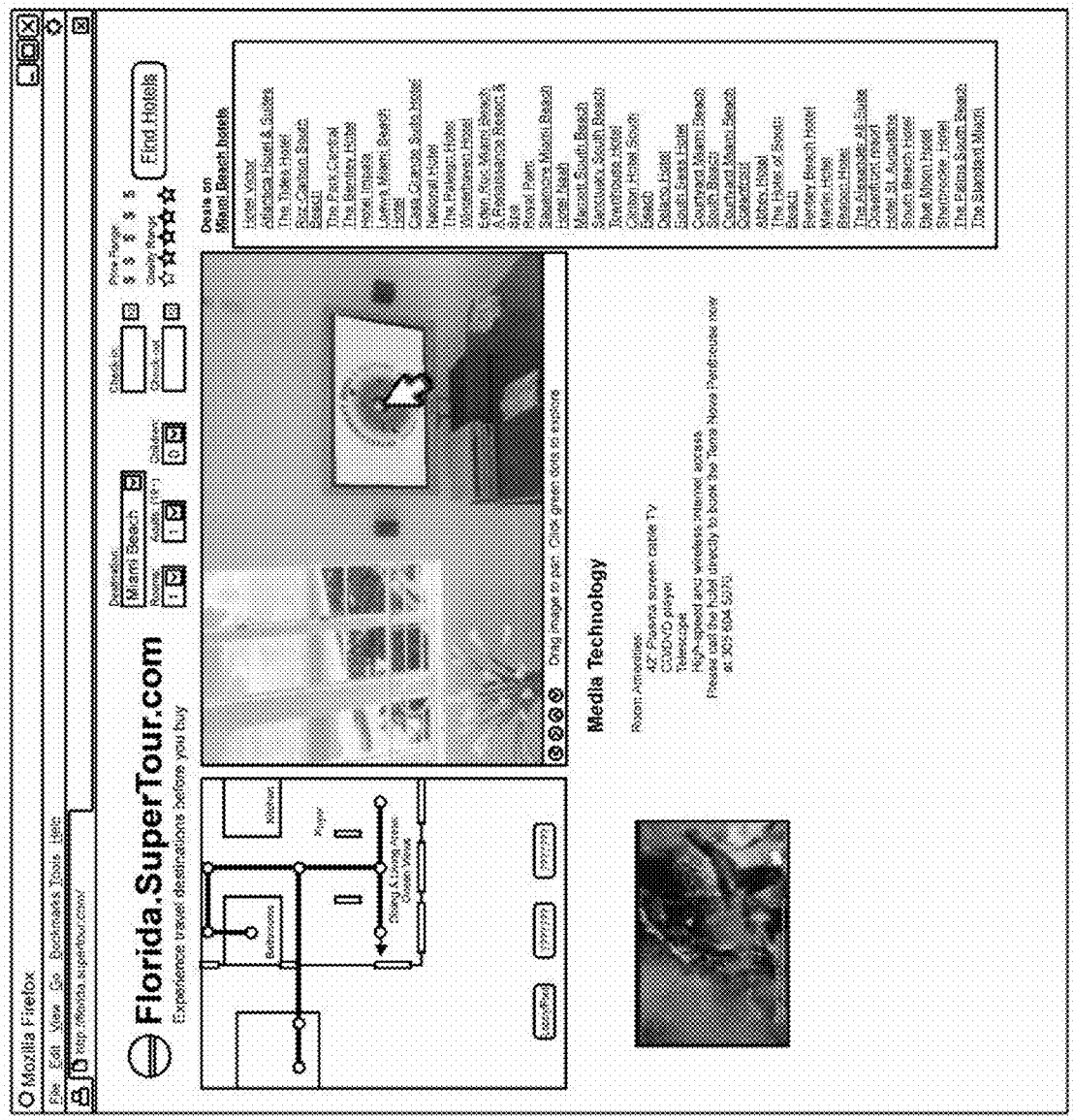

FIG. 60 shows an exemplary embodiment of the invention where the publication of supertour is made possible. It only shows a small slice of a supertour 6000. As shown in the map interface in 6000, there are over a thousand panoramic scenes covering Miami Beach, Fla. 6010 shows an enlargement of the map. Each of these panoramic scenes is inter-connected in this supertour. Furthermore, the exterior scenes are also inter-connected to the interior tours of buildings and hotels. The complexity of a published supertour, for an exemplary embodiment, is shown in FIGS. 61-70.

Figure 71:
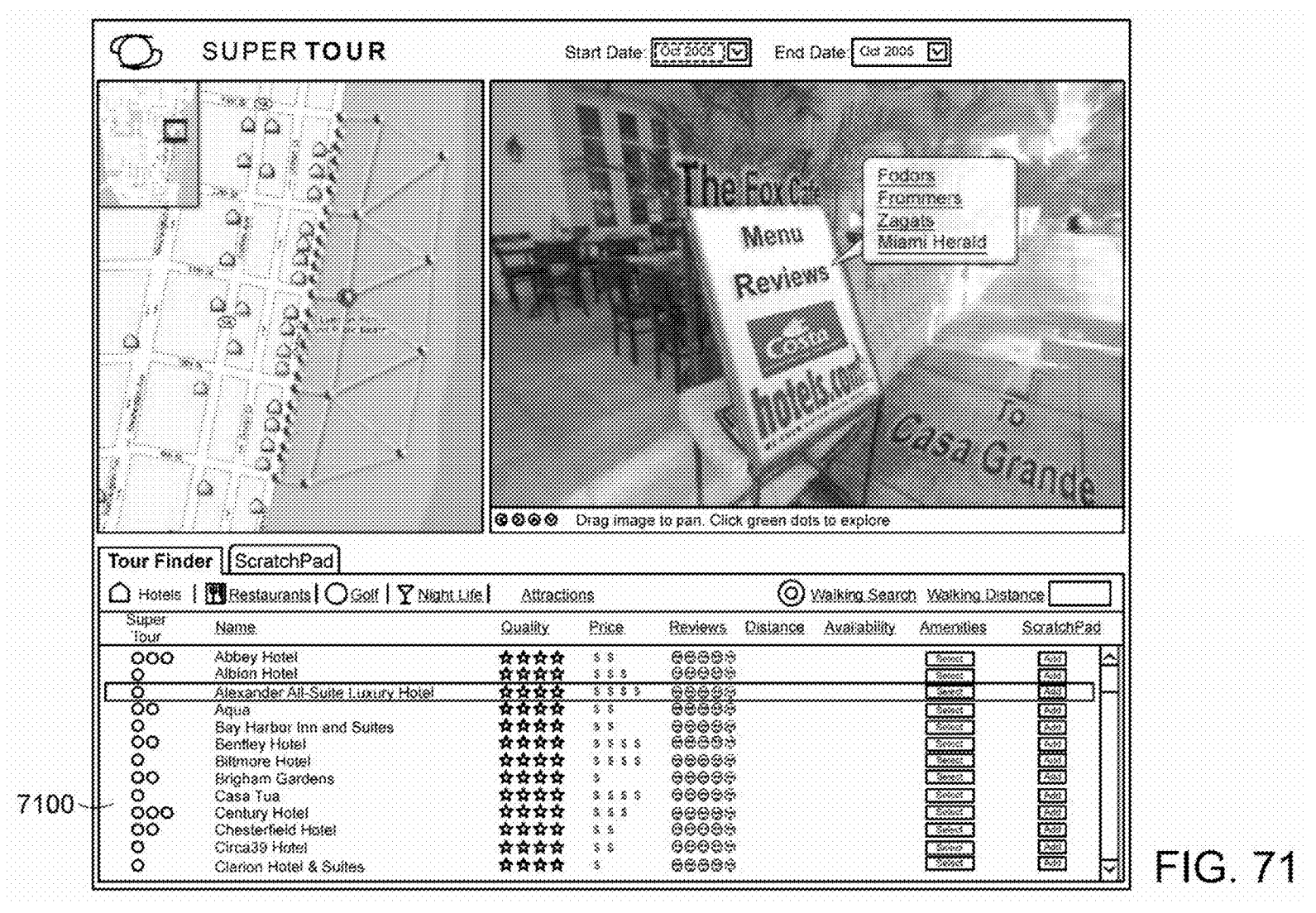

In various embodiments of the invention, a method provides a transition, in a computer system having a display that simulates motion between a first scene and a second scene. The method includes receiving an indication of a viewpoint in the second scene towards which a transition is to be made. The indication may be received from a variety of sources. For example, the indication may be produced by entering search parameters into a search engine and the search engine may identify the location. The indication may be received upon activation of an icon anywhere on the display—the icon need not be located on a plan view map or a panorama viewer. When the location is received, a transitional image or a series of such images are displayed simulating motion toward the location. In a further example, a list of locations may be presented on the screen and the indication is received based on selection of an item in the list as shown in FIG. 71.

Any of the above described embodiments of the invention may be implemented in a system that includes a computer or other type of processor. The computer or processor includes memory for instructions implementing the method steps. The computer or processor is coupled to a display device for displaying output and may be coupled to one or more input devices for receiving input from users. Instructions implementing the method may be executed on a single processor or multiple processors. Processors may be organized in a client-server fashion. Multiple processors may be connected by public or private communication systems of any type known in the art. Such communication systems may include, without limitation, data networks as are known in the art, such as the internet, using both wired and wireless link-level and physical media, point-to-point communication means, such as the public telephone system, satellite links, a Ti line, a microwave link, a wire line or a radio link, etc. Display devices used in the system may be of any type suitable for providing graphical displays. Displays may be directed from any processor to any display surface and multiple display surfaces may be employed in embodiments of the invention. Input devices for receiving inputs from users may take diverse forms including, without limitation, a keyboard, a pointing device, such as a trackball or mouse or touchpad, etc.

Systems according to embodiments of the invention may be described by the following clauses:

A system for creating a transition between a first scene and a second scene simulating motion, the first scene observed from a first viewpoint and including a first feature, and the second scene observed from a second viewpoint and including a second feature, the system comprising: a computer including a processor, memory and a display, the memory containing instructions that cause the computer to:

graphically identify on the display the first feature and the second feature and determine a transformation mapping the first scene into the second scene using the first feature and the second feature; and provide a transitional image that includes at least one transitional scene based on the first feature and on the second feature, such that there is simulated motion from the first scene to the second scene.

A system for creating a transition between a first scene and a second scene simulating motion, the first scene observed from a first viewpoint and including a first feature, and the second scene observed from a second viewpoint and including a second feature, the system comprising: a computer including a processor, memory and a display, the memory containing instructions that cause the computer to:
 display a first navigational icon embedded in the first scene; and
 when the first navigational icon is activated, display a transitional image that includes at least one transitional scene based on the first feature and on the second feature, such that there is simulated motion from the first scene to the second scene.

A system for creating a transition between a first scene and a selected scene simulating motion, the first scene observed from a first viewpoint and including a first feature, and the selected scene observed from a selected scene viewpoint and including a selected scene feature, the system comprising: a computer including a processor, memory and a display, the memory containing instructions that cause the computer to display the first scene;
 receive an indication of the location of the selected scene viewpoint; and
 when the indication of the location of the selected scene viewpoint is received, display a transitional image that includes at least one transitional scene based on the first feature and on the selected scene feature, such that there is simulated motion from the first scene to the selected scene.

A system for creating a first transition between a first scene and a second scene and a second transition between the second scene and a third scene simulating motion, the first scene observed from a first viewpoint and including a first feature, the second scene observed from a second viewpoint and including a second feature, the third scene observed from a third viewpoint and including a third feature, the system comprising: a computer including a processor, memory and a display, the memory containing instructions that cause the computer to
 provide a first transitional image that includes at least one transitional scene based on the first feature and on the second feature, such that there is simulated motion from the first scene to the second scene; and
 provide a second transitional image that includes at least one transitional scene based on the second feature and on the third feature, such that there is simulated motion from the second viewpoint to the third viewpoint,
 such that the first transitional image and the second transitional image are formed without determining the absolute positions and orientations in a frame of reference of each of the first, second and third scenes.

A system for creating a transition between a first scene and a selected scene simulating motion, the first scene observed from a first viewpoint and including a first feature, and the selected scene observed from a selected scene viewpoint and including a selected scene feature, the system comprising: a computer including a processor, memory and a display, the memory containing instructions that cause the computer to:
 display the first scene;
 receive an indication of the location of the selected scene viewpoint;
 determine a route from the first viewpoint to the selected scene viewpoint, the route including the second viewpoint; and
 when the indication of the location of the selected scene viewpoint is received, display a transitional image that includes at least one transitional scene based on the first feature and on the second feature, such that there is simulated motion from the first scene to the second scene.

Additional system embodiments of the invention may be described according to the below listed method claims by adding additional steps for the processor to execute.

Computer program products according to embodiments of the invention may be described by the following clauses:

A computer program product for use on a computer system for creating a transition between a first scene and a second scene simulating motion, the first scene observed from a first viewpoint and including a first feature, and the second scene observed from a second viewpoint and including a second feature, the computer program product comprising a computer usable medium having computer readable program code thereon, the computer readable program code including program code for:
 graphically identifying on the display the first feature and the second feature and determining a transformation mapping the first scene into the second scene using the first feature and the second feature; and
 providing a transitional image that includes at least one transitional scene based on the first feature and on the second feature, such that there is simulated motion from the first scene to the second scene.

A computer program product for use on a computer system for creating a transition between a first scene and a second scene simulating motion, the first scene observed from a first viewpoint and including a first feature, and the second scene observed from a second viewpoint and including a second feature, the computer program product comprising a computer usable medium having computer readable program code thereon, the computer readable program code including program code for:
 displaying a first navigational icon embedded in the first scene; and
 when the first navigational icon is activated, displaying a transitional image that includes at least one transitional scene based on the first feature and on the second feature, such that there is simulated motion from the first scene to the second scene.

A computer program product for use on a computer system for creating a transition between a first scene and a selected scene simulating motion, the first scene observed from a first viewpoint and including a first feature, and the selected scene observed from a selected scene viewpoint and including a selected scene feature, the computer program product comprising a computer usable medium having computer readable program code thereon, the computer readable program code including program code for:
 displaying the first scene;
 receiving an indication of the location of the selected scene viewpoint; and
 when the indication of the location of the selected scene viewpoint is received, displaying a transitional image that includes at least one transitional scene based on the first feature and on the selected scene feature, such that there is simulated motion from the first scene to the selected scene.

A computer program product for use on a computer system for creating a first transition between a first scene and a second scene and a second transition between the second scene and a third scene simulating motion, the first scene observed from a first viewpoint and including a first feature, the second scene observed from a second viewpoint and including a second feature, the third scene observed from a third viewpoint and including a third feature, the computer program product comprising a computer usable medium having computer readable program code thereon, the computer readable program code including program code for:

providing a first transitional image that includes at least one transitional scene based on the first feature and on the second feature, such that there is simulated motion from the first scene to the second scene; and providing a second transitional image that includes at least one transitional scene based on the second feature and on the third feature, such that there is simulated motion from the second viewpoint to the third viewpoint, such that the first transitional image and the second transitional image are formed without determining the absolute positions and orientations in a frame of reference of each of the first, second and third scenes.

A computer program product for use on a computer system for creating a transition between a first scene and a selected scene simulating motion, the first scene observed from a first viewpoint and including a first feature, and the selected scene observed from a selected scene viewpoint and including a selected scene feature, the computer program product comprising a computer usable medium having computer readable program code thereon, the computer readable program code including program code for:

displaying the first scene;

receiving an indication of the location of the selected scene viewpoint;

determining a route from the first viewpoint to the selected scene viewpoint, the route including the second viewpoint; and when the indication of the location of the selected scene viewpoint is received, displaying a transitional image that includes at least one transitional scene based on the first feature and on the second feature, such that there is simulated motion from the first scene to the second scene.

Additional computer program product embodiments of the invention may be described by adding program code steps according to the below listed method claims for the processor to execute.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

While the invention has been particularly shown and described with reference to specific embodiments, it will be understood by those skilled in the art that various changes in form and detail may be made therein without departing from the spirit and scope of the invention as defined by the appended claims. As will be apparent to those skilled in the art, techniques described above for panoramas may be applied to images that have been captured as non-panoramic images, and vice versa.

What is claimed is:

1. A system for creating a transition between a first scene and a second scene simulating motion, the first scene observed from a first viewpoint including a first digital image and the second scene observed from a second viewpoint including a second digital image, the system comprising:

a processor, the processor configured to:

determine, for each digital image, a directional vector corresponding to a pan and tilt of a camera that captured the digital image;

transform, for each digital image, corresponding digital image data to rotate the digital image so that the directional vector of the transformed digital image is parallel to one of the axes of a global coordinate system;

further transform digital image data of at least one of the transformed digital images so as to align the directional vectors of the transformed digital images, thereby achieving alignment of corresponding features in each of the transformed digital images;

define a common ground plane shared by the first transformed digital image and the second transformed digital image;

define a footprint of structures within the first transformed digital image and the second transformed digital image on the ground plane;

extrude geometries from the footprint, wherein the footprint and the extruded geometries define a three-dimensional geometry representative of the structures;

determine a view position along a path for a transitional image in relation to the three dimensional geometry; and projectively map data from the first digital image and the second digital image based on the three-dimensional geometry and the view position to create a transitional image.

2. The system according to claim 1, wherein the first digital image and the second digital image are representative of photographs.

3. The system according to claim 1, wherein the first digital image and the second digital image are panoramic images.

4. The system according to claim 3, wherein the first and second digital images represent a 360 degree view.

5. The system according to claim 1, the processor further configured to:

display on a display the first digital image, one or more transitional images, and the second digital image sequentially.

6. The system according to claim 1, wherein the geometries include at least one of a perspective rectangle and a perspective triangle.

7. The system according to claim 1 wherein a plurality of transitional images are created from different positions along the path.

8. The system according to claim 1, the processor further configured to:

display on a display the first digital image with a first navigational icon embedded; and when the first navigational icon is activated, display the transitional image, such that there is simulated motion from the first digital image to the second digital image.

9. The system according to claim 8, wherein displaying a transitional image includes at least one of alpha-blending, morphing and motion-blurring the first digital image and the second digital image.

10. The system according to claim 1, the processor further configured to:

display the first scene;

receive an indication of the view position; and when the indication of the view position is received, display the transitional image that includes at least one transitional scene, such that there is simulated motion from the first scene to the second scene.

11. A system for creating a transition between a first scene and a second scene simulating motion, the first scene observed from a first viewpoint including a first digital image and the second scene observed from a second viewpoint including a second digital image, the system comprising:

means for determining, for each digital image, a directional vector corresponding to a pan and tilt of a camera that captured the digital;

means for transforming, for each digital image, corresponding digital image data to rotate the digital image so that the directional vector of the transformed digital image is parallel to one of the axes of a global coordinate system;

means for further transforming digital image data of at least one of the transformed digital images so as to align the directional vectors of the transformed digital images, thereby achieving alignment of corresponding features in each of the transformed digital images;

means for defining a common ground plane shared by the first transformed digital image and the second transformed digital image;

means for defining a footprint of structures within the first transformed digital image and the second transformed digital image on the ground plane;

means for extruding geometries from the footprint, wherein the footprint and the extruded geometries define a three-dimensional geometry representative of the structures;

means for determining a view position along a path for a transitional image in relation to the three-dimensional geometry; and means for projectively mapping data from the first digital image and the second digital image based on the three-dimensional geometry and the view position to create a transitional image.

12. The system according to claim 11, wherein the first digital image and the second digital image are representative of photographs.

13. The system according to claim 11, wherein the first digital image and the second digital image are panoramic images.

14. The system according to claim 13, wherein the first and second digital images represent a 360 degree view.

15. The system according to claim 11, the system further comprising:

means for displaying on a display the first digital image, one or more transitional images, and the second digital image sequentially.

16. The system according to claim 11, wherein the geometries include at least one of a perspective rectangle and perspective triangle.

17. The system according to claim 11, wherein a plurality of transitional images are created from different positions along the path.

18. The system according to claim 11, the system further comprising:

means for displaying on a display the first digital image with a first navigational icon embedded; and means for displaying the transitional image, such that there is simulated motion from the first digital image to the second digital image when the first navigational icon is activated.

19. The system according to claim 18, wherein displaying a transitional image includes at least one of alpha-blending, morphing and motion-blurring the first digital image and the second digital image.

20. The system according to claim 11, the system further comprising:

means for displaying the image of the first scene;

means for receiving an indication of the view position; and means for displaying the transitional image that includes at least one transitional scene, such that there is simulated motion from the first scene to the second scene when the indication of the view position is received.

* * * * *